United States Patent
Kim et al.

(10) Patent No.: US 12,247,162 B2
(45) Date of Patent: Mar. 11, 2025

(54) METHODS FOR HYDROCARBON RECOVERY

(71) Applicant: CHEVRON U.S.A. INC., San Ramon, CA (US)

(72) Inventors: Do Hoon Kim, Katy, TX (US); Dennis Arun Alexis, Richmond, VA (US); Varadarajan Dwarakanath, Houston, TX (US); David Espinosa, Houston, TX (US); Taimur Malik, Houston, TX (US); Logan Jackson, Norcross, GA (US); Tom Lynch, Roswell, GA (US); Ronald Robinson, Newnan, GA (US); Frances Fournier, Marietta, GA (US); Hong Yang, Atlanta, GA (US); Sukhjit Aujla, The Woodlands, TX (US)

(73) Assignee: CHEVRON U.S.A. INC., San Ramon, CA (US)

( * ) Notice: Subject to any disclaimer, the term of this patent is extended or adjusted under 35 U.S.C. 154(b) by 0 days.

(21) Appl. No.: 18/437,986

(22) Filed: Feb. 9, 2024

(65) Prior Publication Data

US 2024/0182779 A1 Jun. 6, 2024

Related U.S. Application Data

(63) Continuation of application No. 18/336,457, filed on Jun. 16, 2023, now abandoned, which is a
(Continued)

(51) Int. Cl.
*C09K 8/588* (2006.01)
*C09K 8/584* (2006.01)
*E21B 43/20* (2006.01)

(52) U.S. Cl.
CPC .............. *C09K 8/588* (2013.01); *C09K 8/584* (2013.01); *E21B 43/20* (2013.01)

(58) Field of Classification Search
CPC ...................................................... E21B 43/00
See application file for complete search history.

(56) References Cited

U.S. PATENT DOCUMENTS

| 3,624,019 A | 11/1971 | Anderson et al. |
| 3,734,873 A | 5/1973 | Anderson et al. |

(Continued)

FOREIGN PATENT DOCUMENTS

| BR | 112017007484 A2 | 1/2018 |
| CA | 832277 A | 1/1970 |

(Continued)

OTHER PUBLICATIONS

Office Action in European Patent Application No. 16873783.1 dated Feb. 19, 2024.
(Continued)

*Primary Examiner* — William D Hutton, Jr.
*Assistant Examiner* — Avi T Skaist
(74) *Attorney, Agent, or Firm* — Meunier Carlin & Curfman LLC

(57) ABSTRACT

Provided herein are liquid polymer (LP) compositions comprising a synthetic (co)polymer (e.g., an acrylamide (co)polymer), as well as methods for preparing inverted polymer solutions by inverting these LP compositions in an aqueous fluid. The resulting inverted polymer solutions can have a concentration of a synthetic (co)polymer (e.g., an acrylamide (co)polymer) of from 50 to 15,000 ppm, and a filter ratio of 1.5 or less at 15 psi using a 1.2 μm filter. Also provided are methods of using these inverted polymer solutions in oil and gas operations, including enhanced oil recovery.

27 Claims, 16 Drawing Sheets

Related U.S. Application Data continuation of application No. 17/981,733, filed on Nov. 7, 2022, now abandoned, which is a continuation of application No. 17/395,933, filed on Aug. 6, 2021, now abandoned, which is a continuation of application No. 16/851,875, filed on Apr. 17, 2020, now Pat. No. 11,084,973, which is a continuation of application No. 15/372,168, filed on Dec. 7, 2016, now Pat. No. 10,626,320.

(60) Provisional application No. 62/264,776, filed on Dec. 8, 2015.

(56) References Cited

U.S. PATENT DOCUMENTS

| | | | |
|---|---|---|---|
| 3,852,234 | A | 12/1974 | Venema |
| 3,893,510 | A | 7/1975 | Elphingstone et al. |
| 4,034,809 | A | 7/1977 | Phillips et al. |
| 4,052,353 | A | 10/1977 | Scanley et al. |
| 4,115,340 | A | 9/1978 | Ellwanger |
| 4,331,787 | A | 5/1982 | Fairchok et al. |
| 4,421,656 | A | 12/1983 | Donatelli et al. |
| 4,439,332 | A | 3/1984 | Frank et al. |
| 4,473,689 | A | 9/1984 | Login et al. |
| 4,505,828 | A | 3/1985 | Lipowski et al. |
| 4,528,321 | A | 7/1985 | Allen et al. |
| 4,622,356 | A | 11/1986 | Jarovitzky et al. |
| 4,670,550 | A | 6/1987 | Bleeker |
| 5,067,508 | A | 11/1991 | Lee et al. |
| 5,190,374 | A | 3/1993 | Harms et al. |
| 5,216,070 | A | 6/1993 | Plochocka et al. |
| 5,470,150 | A | 11/1995 | Pardikes |
| 5,763,530 | A | 6/1998 | Chen et al. |
| 5,942,469 | A | 8/1999 | Juprasert et al. |
| 6,217,828 | B1 | 4/2001 | Bretscher et al. |
| 6,365,656 | B1 | 4/2002 | Green et al. |
| 6,392,596 | B1 | 5/2002 | Lin et al. |
| 6,485,651 | B1 | 11/2002 | Branning |
| 6,833,406 | B1 | 12/2004 | Green et al. |
| 7,186,673 | B2 * | 3/2007 | Varadaraj .............. C09K 8/58 166/305.1 |
| 7,595,284 | B2 | 9/2009 | Crews |
| 7,770,641 | B2 | 8/2010 | Dwarakanath et al. |
| 7,776,181 | B2 | 8/2010 | Mori et al. |
| 7,939,472 | B2 | 5/2011 | Crews |
| 8,357,724 | B2 | 1/2013 | Deroo et al. |
| 8,360,152 | B2 | 1/2013 | Defosse et al. |
| 8,383,560 | B2 | 2/2013 | Pich et al. |
| 8,841,240 | B2 | 9/2014 | Kakadjian et al. |
| 8,865,632 | B1 | 10/2014 | Parnell et al. |
| 8,946,132 | B2 | 2/2015 | Chang et al. |
| 8,973,668 | B2 | 3/2015 | Sanders et al. |
| 9,580,639 | B2 | 2/2017 | Chang et al. |
| 9,701,890 | B2 | 7/2017 | Reichenbach-Klinke et al. |
| 9,988,571 | B2 | 6/2018 | Salazar et al. |
| 10,442,980 | B2 | 10/2019 | Li et al. |
| 10,626,320 | B2 | 4/2020 | Kim et al. |
| 2002/0190005 | A1 | 12/2002 | Branning |
| 2005/0239957 | A1 | 10/2005 | Pillsbury et al. |
| 2007/0012447 | A1 | 1/2007 | Fang et al. |
| 2008/0045422 | A1 | 2/2008 | Hanes et al. |
| 2008/0217013 | A1 | 9/2008 | Stokes et al. |
| 2011/0118153 | A1 * | 5/2011 | Pich ...................... E21B 21/062 507/225 |
| 2011/0140292 | A1 | 6/2011 | Chang et al. |
| 2011/0151517 | A1 | 6/2011 | Therre et al. |
| 2012/0071316 | A1 | 3/2012 | Voss et al. |
| 2013/0005616 | A1 | 1/2013 | Gaillard et al. |
| 2013/0197108 | A1 | 8/2013 | Koczo et al. |
| 2014/0024731 | A1 | 1/2014 | Blanc et al. |
| 2014/0221549 | A1 | 8/2014 | Webster et al. |
| 2014/0287967 | A1 | 9/2014 | Favero et al. |
| 2014/0326457 | A1 | 11/2014 | Favero |
| 2015/0148269 | A1 | 5/2015 | Tamsilian et al. |
| 2015/0197439 | A1 | 7/2015 | Zou et al. |
| 2015/0376998 | A1 | 12/2015 | Dean et al. |
| 2016/0032170 | A1 | 2/2016 | Li et al. |
| 2016/0122622 | A1 | 5/2016 | Dwarakanath et al. |
| 2016/0122623 | A1 | 5/2016 | Dwarakanath et al. |
| 2016/0122624 | A1 | 5/2016 | Dwarakanath et al. |
| 2016/0122626 | A1 | 5/2016 | Dwarakanath et al. |
| 2016/0289526 | A1 | 10/2016 | Alwattari et al. |
| 2017/0037298 | A1 | 2/2017 | Li et al. |
| 2017/0037299 | A1 | 2/2017 | Li et al. |
| 2017/0121588 | A1 | 5/2017 | Chang et al. |
| 2017/0158947 | A1 | 6/2017 | Kim et al. |
| 2017/0158948 | A1 | 6/2017 | Kim et al. |
| 2017/0321111 | A1 | 11/2017 | Velez et al. |
| 2018/0155505 | A1 | 6/2018 | Kim et al. |
| 2018/0362833 | A1 | 12/2018 | Jackson et al. |
| 2019/0002754 | A1 | 1/2019 | Yang et al. |
| 2020/0116613 | A1 | 4/2020 | Linnemeyer et al. |

FOREIGN PATENT DOCUMENTS

| | | |
|---|---|---|
| CA | 2545464 A1 | 6/2005 |
| CA | 2950810 A1 | 6/2017 |
| DE | 2419764 A1 | 12/1975 |
| EP | 2283915 A1 | 2/2011 |
| GB | 1384470 A | 2/1975 |
| WO | 2009053029 A1 | 4/2009 |
| WO | 2011113470 A1 | 9/2011 |
| WO | 2012069438 A1 | 5/2012 |
| WO | 2012069477 A1 | 5/2012 |
| WO | 2012136613 A1 | 10/2012 |
| WO | 2012170373 A2 | 12/2012 |
| WO | 2013108173 A1 | 7/2013 |
| WO | 2014075964 A1 | 5/2014 |
| WO | 2014/149824 A1 | 9/2014 |
| WO | 2016030341 A1 | 3/2016 |
| WO | 2016069937 A1 | 5/2016 |
| WO | 2016183335 A1 | 11/2016 |
| WO | 2017100327 A1 | 6/2017 |
| WO | 2017100329 A1 | 6/2017 |
| WO | 2017100331 A1 | 6/2017 |
| WO | 2017100344 A1 | 6/2017 |
| WO | 2017121669 A1 | 7/2017 |
| WO | 2017177475 A1 | 10/2017 |
| WO | 2017177476 A1 | 10/2017 |
| WO | 2018045282 A1 | 3/2018 |
| WO | 2018106913 A1 | 6/2018 |
| WO | 2019006305 A1 | 1/2019 |
| WO | 2019006307 A1 | 1/2019 |
| WO | 2019006369 A1 | 1/2019 |
| WO | 2019/152467 A1 | 8/2019 |

OTHER PUBLICATIONS

File history of U.S. Pat. No. 10,626,320 (excerpts), presented in Inter Partes Review of U.S. Pat. No. 10,626,320 (Case No. IPR2022-01534) on Sep. 19, 2022, 58 pages.

Koh, H., "Experimental Investigation of the Effect of Polymers on Residual Oil Saturation," Dissertation Presented to the Faculty of the Graduate School of The University of Texas at Austin in Partial Fulfillment of the Requirements for the Degree of Doctor of Philosophy, Jan. 2015, 279 pages.

Levitt, D.B., "The Optimal Use of Enhanced Oil Recovery Polymers Under Hostile Conditions," Dissertation Presented to the Faculty of the Graduate School of The University of Texas at Austin in Partial Fulfillment of the Requirements for the Degree of Doctor of Philosophy, May 2009, 195 pages.

Magbagbeola, O.A., "Quantification of the Viscoelastic Behavior of High Molecular Weight Polymers used for Chemical Enhanced Oil Recovery," Thesis Presented to the Faculty of the Graduate School of The University of Texas at Austin in Partial Fulfillment of the Requirements for the Degree of Master of Science in Engineering, Dec. 2008, 206 pages.

MSDS for Exxsol D80, dated Jan. 26, 2017, 11 pages.

MSDS for Exxsol D100, dated Dec. 1, 2021, 11 pages.

(56) References Cited

OTHER PUBLICATIONS

Declaration of Reza Barati, PhD in Support of Petitioner SNF S.A.'s Petition for Inter Partes Review, presented in Inter Partes Review of U.S. Pat. No. 10,626,320 (Case No. IPR2022-01534) on Sep. 19, 2022, 290 pages.
Petition for Inter Partes Review of U.S. Pat. No. 10,626,320 (Case No. IPR2022-01534), dated Sep. 19, 2022, 76 pages.
Patent Owner's Preliminary Response to Petition for Inter Partes Review of U.S. Pat. No. 10,626,320 (Case No. IPR2022-01534), dated Jan. 20, 2023, 57 pages.
Declaration of Gary A. Pope, Ph.D., presented in Inter Partes Review of U.S. Pat. No. 10,626,320 (Case No. IPR2022-01534) on Jan. 20, 2023, 35 pages.
Jouenne, S. et al., "Tradeoffs between Emulsion and Powder Polymers for EOR," Society of Petroleum Engineers Improved Oil Recovery Conference, 2016, 14 pages.
Transcript of Conference Call held Feb. 16, 2023 in Inter Partes Review of U.S. Pat. No. 10,626,320 (Case No. IPR2022-01534), 25 pages.
Request for Authorization for Reply to Patent Owner's Preliminary Response, presented in Inter Partes Review of U.S. Pat. No. 10,626,320 (Case No. IPR2022-01534), dated Feb. 9, 2023, 2 pages.
Order Denying Petitioner's Request for Pre-Institution Additional Briefing, presented in Inter Partes Review of U.S. Pat. No. 10,626,320 (Case No. IPR2022-01534) on Mar. 14, 2023, 7 pages.
Decision Granting Institution of Inter Partes Review, presented in Inter Partes Review of U.S. Pat. No. 10,626,320 (Case No. IPR2022-01534) on Apr. 19, 2023, 7 pages.
Petitioner's Objections to Patent Owner's Exhibits, presented in Inter Partes Review of U.S. Pat. No. 10,626,320 (Case No. IPR2022-01534) on May 3, 2023, 4 pages.
Patent Owner's Objections to Petitioner's Exhibits, presented in Inter Partes Review of U.S. Pat. No. 10,626,320 (Case No. IPR2022-01534) on May 3, 2023, 4 pages.
Transcript of Board Teleconference, dated Jun. 21, 2023, presented in Inter Partes Review of U.S. Pat. No. 10,626,320 (Case No. IPR2022-01534), 40 pages.
Patent Owner's Motion to Compel Routine Discovery and For Additional Discovery, presented in Inter Partes Review of U.S. Pat. No. 10,626,320 (Case No. IPR2022-01534), dated Jul. 7, 2023, 17 pages.
Thomas, A., Chemical Enhanced Oil Recovery (CEOR)—A Practical Overview, Chapter 2—Polymer Flooding, available at http://dx.doi.org/10.5772/64623, 45 pages.
PDF File Titled "SNF0003.pdf" Sent from Christopher Roth to Michael Wolfe on Jun. 2, 2023, 10 pages.
Printout of Excel File Titled "SNF0001.xlsx" Sent from Christopher Roth to Michael Wolfe on Jun. 2, 2023, 5 pages.
Printout of Excel File Titled "SNF0002.xlsx" Sent from Christopher Roth to Michael Wolfe on Jun. 2, 2023, 5 pages.
Printout of Excel File Titled "SNF00013.xlsx" Sent from Carlos Goldie to Michael Wolfe on Jun. 14, 2023, 3 pages.
Deposition Transcript of Reza Barati, Ph.D. (Jun. 23, 2023) in Inter Partes Review of U.S. Pat. No. 10,626,320 (Case No. IPR2022-01534), 369 pages.
Patent Owner's Discovery Requests, presented in Inter Partes Review of U.S. Pat. No. 10,626,320 (Case No. IPR2022-01534) on Jul. 7, 2023, 5 pages.
E-mail from Michael Wolfe to Robert Altherr (May 3, 2023, 16:36 EST), 1 page.
Petitioner's Opposition to Patent Owner's Motion to Compel Routine Discovery and For Additional Discovery, presented in Inter Partes Review of U.S. Pat. No. 10,626,320 (Case No. IPR2022-01534) on Jul. 17, 2023, 15 pages.
Order Denying Patent Owner's Motion to Compel Routine Discovery and For Additional Discovery, presented in Inter Partes Review of U.S. Pat. No. 10,626,320 (Case No. IPR2022-01534) on Aug. 8, 2023, 12 pages.
Patent Owner's Response to Petition for Inter Partes Review of U.S. Pat. No. 10,626,320 (Case No. IPR2022-01534), dated Aug. 16, 2023, 71 pages.
Declaration of Gary A. Pope, Ph.D., presented in Inter Partes Review of U.S. Pat. No. 10,626,320 (Case No. IPR2022-01534) on Aug. 16, 2023, 67 pages.
Polyacrylamide Emulsions Handbook, SNF Floerger (Altavia Connexion 2013), available at https://us.snf.com/wpcontent/uploads/2014/08/Polyacrylamide-EmulsionHandbook.pdf, 14 pages.
Petitioner's Objections to Patent Owner's Exhibits, presented in Inter Partes Review of U.S. Pat. No. 10,626,320 (Case No. IPR2022-01534) on Aug. 23, 2023, 4 pages.
Petitioner's Reply to Patent Owner's Response, presented in Inter Partes Review of U.S. Pat. No. 10,626,320 (Case No. IPR2022-01534) on Nov. 8, 2023, 29 pages.
Wreath, D.G., "A Study of Polymerflooding and Residual Oil Saturation," Thesis Presented to the Faculty of the Graduate School of The University of Texas at Austin in Partial Fulfillment of the Requirements for the Degree of Master of Science in Engineering, Dec. 1989, 519 pages.
Deposition Transcript of Gary A. Pope, Ph.D (Oct. 20, 2023), presented in Inter Partes Review of U.S. Pat. No. 10,626,320 (Case No. IPR2022-01534), 278 pages.
Petitioner's Request for Oral Argument, presented in Inter Partes Review of U.S. Pat. No. 10,626,320 (Case No. IPR2022-01534) on Dec. 6, 2023, 4 pages.
Patent Owner's Request for Oral Argument, presented in Inter Partes Review of U.S. Pat. No. 10,626,320 (Case No. IPR2022-01534) on Dec. 6, 2023, 4 pages.
Patent Owner's Sur-Reply, presented in Inter Partes Review of U.S. Pat. No. 10,626,320 (Case No. IPR2022-01534) on Dec. 13, 2023, 35 pages.
Deposition Transcript of Carrie Gardner, Ph.D. (Dec. 5, 2023), presented in Inter Partes Review of U.S. Pat. No. 10,626,320 (Case No. IPR2022-01534), 104 pages.
Petitioner's Motion to Exclude Evidence, presented in Inter Partes Review of U.S. Pat. No. 10,626,320 (Case No. IPR2022-01534) on Jan. 3, 2024, 5 pages.
Patent Owner's Opposition to Petitioner's Motion to Exclude Evidence, presented in Inter Partes Review of U.S. Pat. No. 10,626,320 (Case No. IPR2022-01534) on Jan. 10, 2024, 9 pages.
Petitioner's Reply in Support of Motion to Exclude Evidence, presented in Inter Partes Review of U.S. Pat. No. 10,626,320 (Case No. IPR2022-01534) on Jan. 17, 2024, 7 pages.
Patent Owner's Demonstrative Exhibits, presented in Inter Partes Review of U.S. Pat. No. 10,626,320 (Case No. IPR2022-01534) on Jan. 22, 2024, 88 pages.
Petitioner's Objections to Patent Owner's Demonstrative Exhibits, presented in Inter Partes Review of U.S. Pat. No. 10,626,320 (Case No. IPR2022-01534) on Jan. 22, 2024, 4 pages.
Petitioner's Hearing Demonstratives, presented in Inter Partes Review of U.S. Pat. No. 10,626,320 (Case No. IPR2022-01534) on Jan. 22, 2024, 33 pages.
Record of Oral Hearing Held Jan. 5, 2024 in Inter Partes Review of U.S. Pat. No. 10,626,320 (Case No. IPR2022-01534), 64 pages.
Argentine Patent Application No. P20160103761, Argentine Office Action mailed Aug. 20, 2020.
Brazilian Patent No. BR112018011616-5, Brazilian Office Action mailed Dec. 22, 2020.
Brazilian Patent No. BR112018011616-5, Brazilian Office Action mailed Jun. 9, 2020.
Indonesian Application Patent No. P00201804879, Indonesian Office Action mailed Jul. 15, 2020.
U.S. Appl. No. 16/709,872, Non-final Office Action mailed Mar. 12, 2020.
U.S. Appl. No. 15/372,170, Non-final Office Action mailed Jun. 7, 2019.
U.S. Appl. No. 15/372,170, Notice of Allowance mailed Dec. 3, 2019.
U.S. Appl. No. 15/835,020, Notice of Allowance mailed Feb. 21, 2019.
U.S. Appl. No. 16/709,872, Notice of Allowance mailed Jun. 26, 2020.
U.S. Appl. No. 15/372,168, Non-Final Office Action mailed Apr. 9, 2019.

(56) References Cited

OTHER PUBLICATIONS

U.S. Appl. No. 15/372,168, Notice of Allowance mailed Dec. 3, 2019.
"Petroleum, Enhanced Oil Recovery", Kirk-Othmer, Encyclopedia of Chemical Technology, 2005, John Wiley and Sons, vol. 18, pp. 1-29.
U.S. Appl. No. 16/441,851, Non-Final Office Action mailed Dec. 20, 2019.
U.S. Appl. No. 16/441,851, Notice of Allowance mailed Apr. 28, 2020.
U.S. Appl. No. 16/441,851, Notice of Allowance mailed Aug. 18, 2020.
Brazilian Patent No. BR112018011616-5, Brazilian Office Action mailed Feb. 11, 2020.
Croda, Hypermer 2296-LQ-(MV), MSDS. 2017.
Dwarakanath, et al., "Permeability reduction due to use of liquid polymers and development of remediation options", SPE 179657, Society of Petroleum Engineers, SPE Improved Oil Recovery Conference, Apr. 11-13, Tulsa, Oklahoma, USA, 2016.
Extended European Search Report mailed May 7, 2019 in European Application No. 16873783.1.
Hibbert, et al., "Effect of mixing energy levels during batch mixing of cement slurries", SPE 25147-PA, Society of Petroleum Engineers, SPE Drilling & Completion, Mar. 1995, 10(01), 49-52.
Liu, et al., "Experimental Evaluation of Surfactant Application to Improve Oil Recovery", Dissertation. Univ of Kansas, 2011 [Retrieved from the internet on Jan. 16, 2016], kuscholarworks.ke.eduhandle/1808/8378; abstract; table 5.1; p. 40,para. 4; p. 46, para. 2, 2011.
Orban, et al., "Specific mixing energy: A key factor for cement slurry quality", SPE-15578, Society of Petroleum Engineers, SPE Annual Technical Conference and Exhibition, Oct. 5-8, New Orleans, Louisiana, USA, 1986.
International Search Report and Written Opinion issued in International Application No. PCT/US16/65391, dated Feb. 21, 2017.
International Search Report and Written Opinion issued in International Application No. PCT/US16/65394, dated Feb. 6, 2017.
International Search Report and Written Opinion issued in International Application No. PCT/US16/65397, dated Apr. 4, 2017.
International Preliminary Report on Patentability issued in International Application No. PCT/US16/65421, dated Jun. 21, 2018.
International Search Report and Written Opinion issued in International Application No. PCT/US16/65421, dated Feb. 16, 2017.
International Search Report and Written Opinion in International Application No. PCT/US18/040401, dated Sep. 20, 2018.
International Search Report and Written Opinion in International Application No. PCT/US2017/065106, dated Feb. 13, 2018.
International Preliminary Report on Patentability issued in International Application No. PCT/US2017/065106, dated Jun. 20, 2019.
International Search Report and Written Opinion issued in Application No. PCT/US2018/040300, dated Sep. 20, 2018.
International Search Report and Written Opinion issued in Application No. PCT/US2018/040302, dated Sep. 21, 2018.
European Patent Application No. 17878963.2, "Extended European Search Report", Jul. 23, 2020.
European Patent Application No. 18822716.9, "Extended European Search Report", Feb. 22, 2021.
Non-Final Office Action in U.S. Appl. No. 16/024,147 dated Mar. 16, 2021.
Office Action in Brazilian Patent Application No. BR112018011616-5 dated Jun. 8, 2021.
Notice of Allowance issued for U.S. Appl. No. 15/372,170, dated Feb. 6, 2019.
Office Action issued for U.S. Appl. No. 16/024,147, dated Jul. 9, 2020.
International Preliminary Report on Patentability issued for Application No. PCT/US2018/040401, dated Jan. 9, 2020.
Non-Final Office Action in U.S. Appl. No. 17/572,046 dated May 11, 2023.
Final Office Action in U.S. Appl. No. 17/572,046 dated Nov. 22, 2023.
Office Action in European Patent Application No. 18822716.9 dated Mar. 2, 2023.
Office Action in Canadian Patent Application No. 3,008,721 dated Dec. 12, 2022.
Office Action in Mexican Patent Application No. MX/a/2018/007008 dated Oct. 3, 2023.
Office Action in Canadian Patent Application No. 2,950,810 dated Dec. 16, 2022.
Notice of Allowance issued for U.S. Appl. No. 17/121,325, dated Oct. 20, 2021.
Office Action in Canadian Patent Application No. 3,046,084 dated Mar. 7, 2023.
Office Action in Brazilian Patent Application No. 1120190117458 dated Apr. 1, 2022.
Non-Final Office Action in U.S. Appl. No. 16/386,592 dated Sep. 18, 2019.
Final Office Action in U.S. Appl. No. 16/386,592 dated Mar. 9, 2020.
Non-Final Office Action in U.S. Appl. No. 16/386,592 dated Jul. 16, 2020.
Final Office Action in U.S. Appl. No. 16/386,592 dated Dec. 23, 2020.
Non-Final Office Action in U.S. Appl. No. 16/386,592 dated Jun. 9, 2021.
Final Office Action in U.S. Appl. No. 16/386,592 dated Feb. 7, 2022.
Final Office Action in U.S. Appl. No. 16/386,592 dated Sep. 14, 2022.
Final Office Action in U.S. Appl. No. 16/386,592 dated Nov. 6, 2023.
International Search Report and Written Opinion in International Application No. PCT/US2016/065391, dated Feb. 21, 2017.
Non-Final Office Action in U.S. Appl. No. 15/781,808 dated Nov. 27, 2019.
Non-Final Office Action in U.S. Appl. No. 15/781,811 dated Jan. 27, 2020.
Non-Final Office Action in U.S. Appl. No. 16/386,602 dated Oct. 2, 2019.
Final Office Action in U.S. Appl. No. 16/386,602 dated Mar. 9, 2020.
Non-Final Office Action in U.S. Appl. No. 16/386,602 dated Jul. 16, 2020.
Final Office Action in U.S. Appl. No. 16/386,602 dated Dec. 23, 2020.
Non-Final Office Action in U.S. Appl. No. 16/386,602 dated Jun. 9, 2021.
Final Office Action in U.S. Appl. No. 16/386,602 dated Feb. 7, 2022.
Notice of Allowance issued for U.S. Appl. No. 16/386,602, dated Apr. 27, 2023.
International Search Report and Written Opinion in International Application No. PCT/US2016/065394, dated Feb. 6, 2017.
Non-Final Office Action in U.S. Appl. No. 16/627,481 dated Sep. 1, 2021.
Non-Final Office Action in U.S. Appl. No. 16/627,481 dated May 17, 2022.
Final Office Action in U.S. Appl. No. 16/627,481 dated Jan. 24, 2023.
Final Office Action in U.S. Appl. No. 16/627,481 dated Aug. 1, 2023.
Notice of Allowance issued for U.S. Appl. No. 16/627,481 dated Dec. 20, 2023.
International Search Report and Written Opinion in International Application No. PCT/US2018/040302, dated Sep. 21, 2018.
International Search Report and Written Opinion in International Application No. PCT/US2018/040300, dated Sep. 20, 2018.
International Search Report and Written Opinion in International Application No. PCT/US2016/065397, dated Apr. 4, 2017.
Non-Final Office Action in U.S. Appl. No. 15/781,893 dated May 21, 2020.
Final Office Action in U.S. Appl. No. 15/781,893 dated Nov. 17, 2020.

(56) References Cited

OTHER PUBLICATIONS

Non-Final Office Action in U.S. Appl. No. 15/781,893 dated Jun. 7, 2021.
Notice of Allowance issued for U.S. Appl. No. 15/781,893 dated Jan. 5, 2022.
Notice of Allowance issued for U.S. Appl. No. 15/781,893 dated Dec. 24, 2021.
"Surrogate." Merriam-Webster.com Dictionary, Merriam-Webster, https://www.merriam-webster.com/dictionary/surrogate. Accessed Oct. 2, 2024.
"Texas Core Samples and Core Sampling and Research Services at Kocurek Industries." Kocurek Industries Inc., 2024, kocurekindustries.com/core-sampling-services.
Richard M. Felder et al., 3rd Edition, 2005, Chapter 4, pp. 83-186.
Fundamentals of Reservoir Engineering by L.P. Dake, 1978, Chapter 5, pp. 133-137.
Final Written Decision issued for U.S. Pat. No. 10,626,320, dated Apr. 18, 2024.
Office Action issued for U.S. Appl. No. 18/336,457, dated Mar. 20, 2024.
Office Action issued for U.S. Appl. No. 18/437,915, dated May 22, 2024.
Office Action issued for U.S. Appl. No. 18/437,942, dated Jun. 6, 2024.
Office Action issued for U.S. Appl. No. 18/437,955, dated May 22, 2024.
Office Action issued for Canadian Application No. 3,008,721, dated Aug. 19, 2024.
Office Action issued for Mexican Application No. MX/a/2018/007008, dated May 21, 2024.
Office Action issued for Argentine Application No. 20210100021, dated May 21, 2024.

* cited by examiner

METHODS FOR HYDROCARBON RECOVERY

CROSS-REFERENCE TO RELATED APPLICATIONS

This application is a continuation of U.S. application Ser. No. 18/336,457 filed Jun. 16, 2023, which is a continuation of U.S. application Ser. No. 17/981,733 filed Nov. 7, 2022, which is a continuation of U.S. application Ser. No. 17/395,933 filed Aug. 6, 2021, which is a continuation of U.S. application Ser. No. 16/851,875 filed Apr. 17, 2020 issued as U.S. Pat. No. 11,084,973 on Aug. 10, 2021, which is a continuation of U.S. application Ser. No. 15/372,168 filed Dec. 7, 2016 issued as U.S. Pat. No. 10,626,320 on Apr. 21, 2020, which claims benefit of U.S. Provisional Application No. 62/264,776, filed Dec. 8, 2015, which is hereby incorporated herein by reference in its entirety.

BACKGROUND

Water-soluble polymers such as polyacrylamide and copolymers of acrylamide with other monomers are known to exhibit superior thickening properties when said polymers are dissolved in aqueous media. Particularly well-known for this purpose are the anionic carboxamide polymers such as acrylamide/acrylic acid copolymers, including those prepared by hydrolysis of polyacrylamide. Such polymers can be used as fluid mobility control agents in enhanced oil recovery (EOR) processes.

In the past, these polymers were made available commercially as powders or finely divided solids which were subsequently dissolved in an aqueous medium at their time of use. Because such dissolution steps are sometimes time consuming and often require rather expensive mixing equipment, such polymers are sometimes provided in water-in-oil emulsions wherein the polymer is dissolved in the dispersed aqueous phase. The water-in-oil emulsions can then be inverted to form oil-in-water emulsions at their time of use. Unfortunately for many applications, existing water-in-oil emulsions do not invert as readily as desired. Furthermore, the resulting inverted emulsions are often unable to pass through porous structures. This significantly limits their utility as, for example, fluid mobility control agents in EOR applications. In addition, existing water-in-oil emulsions often cannot be efficiently inverted using an aqueous medium containing dissolved salts, as is often the case for enhanced oil recovery practices.

SUMMARY

Provided herein are methods for preparing inverted polymer solutions. Methods for preparing inverted polymer solutions can comprise inverting an LP composition comprising one or more synthetic (co)polymers (e.g., one or more acrylamide (co)polymers) dispersed or emulsified in one or more hydrophobic liquids to provide an inverted polymer solution having a concentration of one or more synthetic (co)polymers (e.g., one or more acrylamide (co)polymers) of from 50 to 15,000 ppm.

For example, in some embodiments, methods for preparing inverted polymer solutions can comprise providing a liquid polymer (LP) composition comprising one or more hydrophobic liquids having a boiling point at least 100° C.; at least 39% (e.g., greater than or equal to 39%) by weight of one or more synthetic (co)polymers (e.g., one or more acrylamide (co)polymers); one or more emulsifier surfactants; and one or more inverting surfactants; and inverting the LP composition in an aqueous fluid to provide an inverted polymer solution having a concentration of synthetic (co)polymer of from 50 to 15,000 ppm (e.g., from 500 to 5000 ppm). In other embodiments, methods for preparing inverted polymer solutions can comprise providing a liquid polymer (LP) composition in the form of an inverse emulsion comprising one or more hydrophobic liquids having a boiling point at least 100° C.; up to 35% by weight of one or more synthetic (co)polymers (e.g., one or more acrylamide (co)polymers); one or more emulsifier surfactants; and one or more inverting surfactants; and inverting the LP composition in an aqueous fluid to provide an inverted polymer solution having a concentration of synthetic (co) polymer of from 50 to 15,000 ppm (e.g., from 500 to 5000 ppm). In other embodiments, methods for preparing inverted polymer solutions can comprise providing a liquid polymer (LP) composition in the form of an inverse emulsion comprising one or more hydrophobic liquids having a boiling point at least 100° C.; up to 38% by weight of one or more synthetic (co)polymers (e.g., one or more acrylamide (co) polymers); one or more emulsifier surfactants; and one or more inverting surfactants; and inverting the LP composition in an aqueous fluid to provide an inverted polymer solution having a concentration of synthetic (co)polymer of from 50 to 15,000 ppm (e.g., from 500 to 5000 ppm). The inverted polymer solutions can exhibit a filter ratio of 1.5 or less (e.g., a filter ratio of 1.2, a filter ratio of 1.2 or less, and/or a filter ratio of from 1.1 to 1.3) at 15 psi using a 1.2 μm filter.

In some embodiments, inversion of the LP composition comprises a single step. For example, in some cases, the inversion of the LP composition can comprise diluting the LP composition in the aqueous fluid in an in-line mixer to provide the inverted polymer solution. The in-line mixer can be a static mixer or a dynamic mixer (e.g., an electrical submersible pump, a hydraulic submersible pump, or a progressive cavity pump). In certain embodiments, the in-line mixer is positioned on the surface, subsurface, subsea, or downhole.

In other embodiments, inversion of the LP composition can comprises two or more steps. For example, in some cases, the inversion of the LP composition can comprise as a first step, inverting the LP composition in the aqueous fluid in a first in-line mixer to provide a concentrated polymer composition having a concentration of synthetic (co)polymer (e.g., one or more acrylamide (co)polymers) of up to 15,000 ppm; and as a second step, diluting the concentrated polymer composition in the aqueous fluid in a second in-line mixer to provide the inverted polymer solution. The first in-line mixer and the second in-line mixer can each individually be a static mixer or a dynamic mixer (e.g., an electrical submersible pump, a hydraulic submersible pump, or a progressive cavity pump). In certain embodiments, the second in-line mixer is positioned on the surface, subsurface, subsea, or downhole.

Also provided herein are method for hydrocarbon recovery. The methods for hydrocarbon recovery can comprise providing a subsurface reservoir containing hydrocarbons there within; providing a wellbore in fluid communication with the subsurface reservoir; preparing an inverted polymer solution according to the methods described herein; and injecting the inverted polymer solution through the wellbore into the subsurface reservoir. The wellbore in the second step can be an injection wellbore associated with an injection well, and the method can further comprise providing a production well spaced apart from the injection well a predetermined distance and having a production wellbore in fluid communication with the subsurface reservoir. In these embodiments, injection of the inverted polymer solution can increase the flow of hydrocarbons to the production wellbore. In some embodiments, the wellbore in the second step can be a wellbore for hydraulic fracturing that is in fluid communication with the subsurface reservoir.

DETAILED DESCRIPTION

Figure 1:
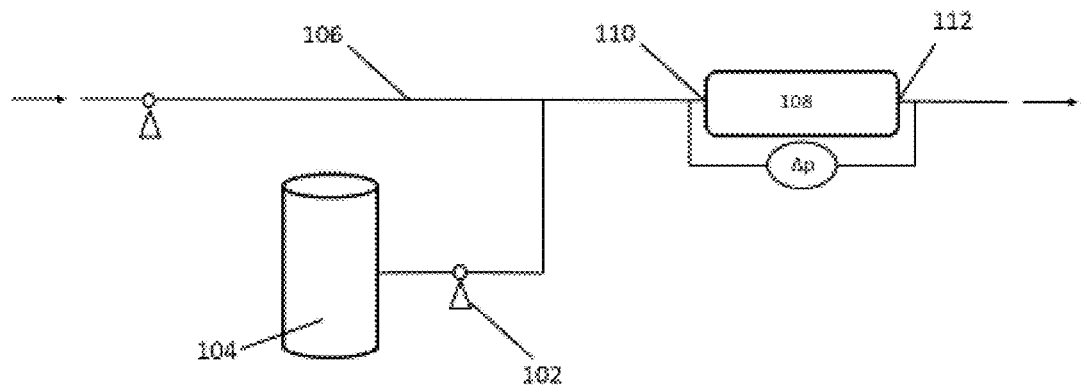
FIG. 1 is a process flow diagram illustrating a single step process for preparing an inverted polymer solution.

Provided herein are liquid polymer (LP) compositions comprising a synthetic polymer, such as an acrylamide (co)polymer, as well as methods for preparing inverted polymer solutions by inverting these LP compositions in an aqueous fluid. Also provided are methods of using these inverted polymer solutions in oil and gas operations, including enhanced oil recovery (EOR).

The term "enhanced oil recovery" refers to techniques for increasing the amount of unrefined petroleum (e.g., crude oil) that may be extracted from an oil reservoir (e.g., an oil field). Using EOR, 40-60% of the reservoir's original oil can typically be extracted compared with only 20-40% using primary and secondary recovery (e.g., by water injection or natural gas injection). Enhanced oil recovery may also be referred to as improved oil recovery or tertiary oil recovery (as opposed to primary and secondary oil recovery). Examples of EOR operations include, for example, miscible gas injection (which includes, for example, carbon dioxide flooding), chemical injection (sometimes referred to as chemical enhanced oil recovery (CEOR), and which includes, for example, polymer flooding, alkaline flooding, surfactant flooding, conformance control operations, as well as combinations thereof such as alkaline-polymer flooding or alkaline-surfactant-polymer flooding), microbial injection, and thermal recovery (which includes, for example, cyclic steam, steam flooding, and fire flooding). In some embodiments, the EOR operation can include a polymer (P) flooding operation, an alkaline-polymer (AP) flooding operation, a surfactant-polymer (SP) flooding operation, an alkaline-surfactant-polymer (ASP) flooding operation, a conformance control operation, or any combination thereof. The terms "operation" and "application" may be used interchangeability herein, as in EOR operations or EOR applications.

For purposes of this disclosure, including the claims, the filter ratio (FR) can be determined using a 1.2 micron filter at 15 psi (plus or minus 10% of 15 psi) at ambient temperature (e.g., 25° C. The 1.2 micron filter can have a diameter of 47 mm or 90 mm, and the filter ratio can be calculated as the ratio of the time for 180 to 200 ml of the inverted polymer solution to filter divided by the time for 60 to 80 ml of the inverted polymer solution to filter.

$$FR = \frac{t200 \text{ ml} - t180 \text{ ml}}{t80 \text{ ml} - t60 \text{ ml}}$$

For purposes of this disclosure, including the claims, the inverted polymer solution is required to exhibit a FR of 1.5 or less.

The inversion of conventional inverse emulsion polymers can be challenging. For use in many applications, rapid and complete inversion of the inverse emulsion polymer composition is required. For example, for many applications, rapid and continuous inversion and dissolution (e.g., complete inversion and dissolution in five minutes or less) is required. For certain applications, including many oil and gas applications, it can be desirable to completely invert and dissolve the emulsion or LP to a final concentration of from 500 to 5000 ppm in an in-line system in a short period of time (e.g., less than five minutes).

For certain applications, including many enhanced oil recovery (EOR) applications, it can be desirable that the inverted composition flows through a hydrocarbon-bearing formation without plugging the formation. Plugging the formation can slow or inhibit oil production. This is an especially large concern in the case of hydrocarbon-bearing formations that have a relatively low permeability prior to tertiary oil recovery.

One test commonly used to determine performance of the emulsion or LP in such conditions involves measuring the time taken for given volumes/concentrations of solution to flow through a filter, commonly called a filtration quotient or Filter Ratio ("FR"). For example, U.S. Pat. No. 8,383,560 describes a filter ratio test method which measures the time taken by given volumes of a solution containing 1000 ppm of active polymer to flow through a filter. The solution is contained in a cell pressurized to 2 bars and the filter has a diameter of 47 mm and a pore size of 5 microns. The times required to obtain 100 ml (t100 ml), 200 ml (t200 ml), and 300 ml (t300 ml) of filtrate were measured. These values were used to calculate the FR, expressed by the formula below:

$$FR = \frac{t300 \text{ ml} - t200 \text{ ml}}{t200 \text{ ml} - t100 \text{ ml}}$$

The FR generally represents the capacity of the polymer solution to plug the filter for two equivalent consecutive volumes. Generally, a lower FR indicates better performance. U.S. Pat. No. 8,383,560, which is incorporated herein by reference, explains that a desirable FR using this method is less than 1.5.

However, polymer compositions that provide desirable results using this test method, have not necessarily provided acceptable performance in the field. In particular, many polymers that have an FR (using a 5 micron filter) lower than 1.5 exhibit poor injectivity—i.e., when injected into a formation, they tend to plug the formation, slowing or inhibiting oil production. A modified filter ratio test method using a smaller pore size (i.e., the same filter ratio test method except that the filter above is replaced with a filter having a diameter of 47 mm and a pore size of 1.2 microns) and lower pressure (15 psi) provides a better screening method. Inverted polymer solutions prepared by the methods described herein can provide a FR using the 1.2 micron filter of 1.5 or less. In field testing, these compositions can exhibit improved injectivity over commercially-available polymer compositions—including other polymer compositions having an FR (using a 5 micron filter) of less than 1.5. As such, the inverted compositions described herein are suitable for use in a variety of oil and gas applications, including EOR.

LP Compositions

LP compositions can comprise one or more synthetic (co)polymers (e.g., one or more acrylamide (co)polymers) dispersed or emulsified in one or more hydrophobic liquids. In some embodiments, the LP compositions can further comprise one or more emulsifying surfactants and one or more inverting surfactants. In some embodiments, the LP compositions can further comprise a small amount of water. For example, the LP compositions can further comprise less than 10% by weight (e.g., less than 5% by weight, less than 4% by weight, less than 3% by weight, less than 2.5% by weight, less than 2% by weight, or less than 1% by weight) water, based on the total weight of all the components of the LP composition. In certain embodiments, the LP compositions can be water-free or substantially water-free (i.e., the composition can include less than 0.5% by weight water, based on the total weight of the composition). The LP compositions can optionally include one or more additional components which do not substantially diminish the desired performance or activity of the composition. It will be understood by a person having ordinary skill in the art how to appropriately formulate the LP composition to provide necessary or desired features or properties.

In some embodiments, the LP composition can comprise one or more hydrophobic liquids having a boiling point at least 100° C.; at least 39% by weight of one or more synthetic co-polymers (e.g., acrylamide-(co)polymers); one or more emulsifier surfactants; and one or more inverting surfactants.

In some embodiments, the LP composition can comprise one or more hydrophobic liquids having a boiling point at least 100° C.; at least 39% by weight of particles of one or more acrylamide-(co)polymers; one or more emulsifier surfactants; and one or more inverting surfactants. In certain embodiments, when the composition is fully inverted in an aqueous fluid, the composition affords an inverted polymer solution having a filter ratio (FR) (1.2 micron filter) of 1.5 or less. In certain embodiments, the inverted polymer solution can comprise from 500 to 5000 ppm (e.g., from 500 to 3000 ppm) active polymer, and have a viscosity of at least 20 cP at 30° C.

In some embodiments, the LP compositions can comprise less than 10% by weight (e.g., less than 7% by weight, less than 5% by weight, less than 4% by weight, less than 3% by weight, less than 2.5% by weight, less than 2% by weight, or less than 1% by weight) water prior to inversion, based on the total weight of all the components of the LP composition. In certain embodiments, the LP composition, prior to inversion, comprises from 1% to 10% water by weight, or from 1% to 5% water by weight, based on the total amount of all components of the composition.

In some embodiments, the solution viscosity (SV) of a 0.1% solution of the LP composition can be greater than 3.0 cP, or greater than 5 cP, or greater than 7 cP. The SV of the LP composition can be selected based, at least in part, on the intended actives concentration of the inverted polymer solution, to provide desired performance characteristics in the inverted polymer solution. For example, in certain embodiments, where the inverted composition is intended to have an actives concentration of about 2000 ppm, it is desirable that the SV of a 0.1% solution of the LP composition is in the range of from 7.0 to 8.6, because at this level, the inverted solution has desired FR1.2 and viscosity properties. A liquid polymer composition with a lower or higher SV range may still provide desirable results, but may require changing the actives concentration of the inverted composition to achieve desired FR1.2 and viscosity properties. For example, if the liquid polymer composition has a lower SV range, it may be desirable to increase the actives concentration of the inverted composition.

In some embodiments, the LP composition can comprise one or more synthetic (co)polymers (e.g., one or more acrylamide (co)polymers) dispersed in one or more hydrophobic liquids. In these embodiments, the LP composition can comprise at least 39% polymer by weight (e.g., at least 40% by weight, at least 45% by weight, at least 50% by weight, at least 55% by weight, at least 60% by weight, at least 65% by weight, at least 70% by weight, or at least 75% by weight), based on the total amount of all components of the composition. In some embodiments, the LP composition can comprise 80% by weight or less polymer (e.g., 75% by weight or less, 70% by weight or less, 65% by weight or less, 60% by weight or less, 55% by weight or less, 50% by weight or less, 45% by weight or less, or 40% by weight or less), based on the total amount of all components of the composition.

The these embodiments, the LP composition can comprise an amount of polymer ranging from any of the minimum values described above to any of the maximum values described above. For example, in some embodiments, the LP composition can comprise from 39% to 80% by weight polymer (e.g., from 39% to 60% by weight polymer, or from 39% to 50% by weight polymer), based on the total weight of the composition.

In some embodiments, the LP composition can comprise one or more synthetic (co)polymers (e.g., one or more acrylamide (co)polymers) emulsified in one or more hydrophobic liquids. In these embodiments, the LP composition can comprise at least 10% polymer by weight (e.g., at least 15% by weight, at least 20% by weight, at least 25% by weight, or at least 30% by weight), based on the total amount of all components of the composition. In some embodiments, the LP composition can comprise less than 38% by weight polymer (e.g., less than 35% by weight, less than 30% by weight, less than 25% by weight, less than 20% by weight, or less than 15% by weight), based on the total amount of all components of the composition.

The these embodiments, the LP composition can comprise an amount of polymer ranging from any of the minimum values described above to any of the maximum values described above. For example, in some embodiments, the LP composition can comprise from 10% to 38% by weight polymer (e.g., from 10% to 35% by weight polymer, from 15% to 30% by weight polymer, from 15% to 35% by weight polymer, from 15% to 38% by weight polymer, from 20% to 30% by weight polymer, from 20% to 35% by weight polymer, or from 20% to 38% by weight polymer), based on the total weight of the composition.

Hydrophobic Liquid

In some embodiments, the LP composition can include one or more hydrophobic liquids. In some cases, the one or more hydrophobic liquids can be organic hydrophobic liquids. In some embodiments, the one or more hydrophobic liquids each have a boiling point at least 100° C. (e.g., at least 135° C., or at least 180° C.). If the organic liquid has a boiling range, the term "boiling point" refers to the lower limit of the boiling range.

In some embodiments, the one or more hydrophobic liquids can be aliphatic hydrocarbons, aromatic hydrocarbons, or mixtures thereof. Examples of hydrophobic liquids include but are not limited to water-immiscible solvents, such as paraffin hydrocarbons, naphthene hydrocarbons, aromatic hydrocarbons, olefins, oils, stabilizing surfactants, and mixtures thereof. The paraffin hydrocarbons can be saturated, linear, or branched paraffin hydrocarbons. Examples of suitable aromatic hydrocarbons include, but are not limited to, toluene and xylene. In certain embodiments, the hydrophobic liquid can comprise an oil, for example, a vegetable oil, such as soybean oil, rapeseed oil, canola oil, or a combination thereof, and any other oil produced from the seed of any of several varieties of the rape plant.

In some embodiments, the amount of the one or more hydrophobic liquids in the inverse emulsion or LP composition is from 20% to 60%, from 25% to 54%, or from 35% to 54% by weight, based on the total amount of all components of the LP composition.

Synthetic (Co)Polymers

In some embodiments, the LP composition includes one or more synthetic (co)polymers, such as one or more acrylamide containing (co)polymers. As used herein, the terms "polymer," "polymers," "polymeric," and similar terms are used in their ordinary sense as understood by one skilled in the art, and thus may be used herein to refer to or describe a large molecule (or group of such molecules) that contains recurring units. Polymers may be formed in various ways, including by polymerizing monomers and/or by chemically modifying one or more recurring units of a precursor polymer. A polymer may be a "homopolymer" comprising substantially identical recurring units formed by, e.g., polymerizing a particular monomer. A polymer may also be a "copolymer" comprising two or more different recurring units formed by, e.g., copolymerizing two or more different monomers, and/or by chemically modifying one or more recurring units of a precursor polymer. The term "terpolymer" may be used herein to refer to polymers containing three or more different recurring units. The term "polymer" as used herein is intended to include both the acid form of the polymer as well as its various salts.

In some embodiments, the one or more synthetic (co) polymers can be a polymer useful for enhanced oil recovery applications. The term "enhanced oil recovery" or "EOR" (also known as tertiary oil recovery), refers to a process for hydrocarbon production in which an aqueous injection fluid comprising at least a water soluble polymer is injected into a hydrocarbon bearing formation.

In some embodiments, the one or more synthetic (co) polymers comprise water-soluble synthetic (co)polymers. Examples of suitable synthetic (co)polymers include acrylic polymers, such as polyacrylic acids, polyacrylic acid esters, partly hydrolyzed acrylic esters, substituted polyacrylic acids such as polymethacrylic acid and polymethacrylic acid esters, polyacrylamides, partly hydrolyzed polyacrylamides, and polyacrylamide derivatives such as acrylamide tertiary butyl sulfonic acid (ATBS); copolymers of unsaturated carboxylic acids, such as acrylic acid or methacrylic acid, with olefins such as ethylene, propylene and butylene and their oxides; polymers of unsaturated dibasic acids and anhydrides such as maleic anhydride; vinyl polymers, such as polyvinyl alcohol (PVA), N-vinylpyrrolidone, and polystyrene sulfonate; and copolymers thereof, such as copolymers of these polymers with monomers such as ethylene, propylene, styrene, methylstyrene, and alkylene oxides. In some embodiments, the one or more synthetic (co)polymer can comprise polyacrylic acid (PAA), polyacrylamide (PAM), acrylamide tertiary butyl sulfonic acid (ATBS) (or AMPS, 2-acrylamido-2-methylpropane sulfonic acid), N-vinylpyrrolidone (NVP), polyvinyl alcohol (PVA), or a blend or copolymer of any of these polymers. Copolymers may be made of any combination above, for example, a combination of NVP and ATBS. In certain examples, the one or more synthetic (co)polymers can comprise acrylamide tertiary butyl sulfonic acid (ATBS) (or AMPS, 2-acrylamido-2-methylpropane sulfonic acid) or a copolymer thereof.

In some embodiments, the one or more synthetic (co) polymers can comprise acrylamide (co)polymers. In some embodiments, the one or more acrylamide (co)polymers comprise water-soluble acrylamide (co)polymers. In various embodiments, the acrylamide (co)polymers comprise at least 30% by weight, or at least 50% by weight acrylamide units with respect to the total amount of all monomeric units in the (co)polymer.

Optionally, the acrylamide-(co)polymers can comprise, besides acrylamide, at least one additional co-monomer. In example embodiments, the acrylamide-(co)polymer may comprise less than about 50%, or less than about 40%, or less than about 30%, or less than about 20% by weight of the at least one additional co-monomer. In some embodiments, the additional comonomer can be a water-soluble, ethylenically unsaturated, in particular monoethylenically unsaturated, comonomer. Suitable additional water-soluble comonomers include comonomers that are miscible with water in any ratio, but it is sufficient that the monomers dissolve sufficiently in an aqueous phase to copolymerize with acrylamide. In some cases, the solubility of such additional monomers in water at room temperature can be at least 50 g/L (e.g., at least 150 g/L, or at least 250 g/L).

Other suitable water-soluble comonomers can comprise one or more hydrophilic groups. The hydrophilic groups can be, for example, functional groups that comprise one or more atoms selected from the group of O-, N-, S-, and P-atoms. Examples of such functional groups include carbonyl groups >C—O, ether groups —O—, in particular polyethylene oxide groups —(CH$_2$—CH$_2$—O—)$_n$—, where n is preferably a number from 1 to 200, hydroxy groups —OH, ester groups —C(O)O—, primary, secondary or tertiary amino groups, ammonium groups, amide groups —C(O)—NH— or acid groups such as carboxyl groups —COOH, sulfonic acid groups —SO$_3$H, phosphonic acid groups —PO$_3$H$_2$ or phosphoric acid groups —OP(OH)$_3$.

Examples of monoethylenically unsaturated comonomers comprising acid groups include monomers comprising —COOH groups, such as acrylic acid or methacrylic acid, crotonic acid, itaconic acid, maleic acid or fumaric acid, monomers comprising sulfonic acid groups, such as vinylsulfonic acid, allylsulfonic acid, 2-acrylamido-2-methylpropanesulfonic acid, 2-methacrylamido-2-methylpropanesulfonic acid, 2-acrylamidobutanesulfonic acid, 3-acrylamido-3-methylbutanesulfonic acid or 2-acrylamido-2,4,4-trimethylpentanesulfonic acid, or monomers comprising phosphonic acid groups, such as vinylphosphonic acid, allylphosphonic acid, N-(meth)acrylamidoalkylphosphonic acids or (meth)acryloyloxyalkyl-phosphonic acids. Of course the monomers may be used as salts.

The —COOH groups in polyacrylamide-copolymers may not only be obtained by copolymerizing acrylic amide and monomers comprising —COOH groups but also by hydrolyzing derivatives of —COOH groups after polymerization. For example, the amide groups —CO—NH$_2$ of acrylamide may hydrolyze thus yielding —COOH groups.

Also to be mentioned are derivatives of acrylamide thereof, such as, for example, N-methyl(meth)acrylamide, N,N'-dimethyl(meth)acrylamide, and N-methylolacrylamide, N-vinyl derivatives such as N-vinylformamide, N-vinylacetamide, N-vinylpyrrolidone or N-vinylcaprolactam, and vinyl esters, such as vinyl formate or vinyl acetate. N-vinyl derivatives can be hydrolyzed after polymerization to vinylamine units, vinyl esters to vinyl alcohol units.

Other example comonomers include monomers comprising hydroxy and/or ether groups, such as, for example, hydroxyethyl(meth)acrylate, hydroxypropyl(meth)acrylate, allyl alcohol, hydroxyvinyl ethyl ether, hydroxyl vinyl propyl ether, hydroxyvinyl butyl ether or polyethyleneoxide (meth)acrylates.

Other example comonomers are monomers having ammonium groups, i.e monomers having cationic groups. Examples comprise salts of 3-trimethylammonium propylacrylamides or 2-trimethylammonium ethyl(meth)acrylates, for example the corresponding chlorides, such as 3-trimethylammonium propylacrylamide chloride (DIMAPAQUAT) and 2-trimethylammonium ethyl methacrylate chloride (MADAME-QUAT).

Other example monoethylenically unsaturated monomers include monomers which may cause hydrophobic association of the (co)polymers. Such monomers comprise besides the ethylenic group and a hydrophilic part also a hydrophobic part. Such monomers are disclosed for instance in WO 2012/069477, which is incorporated herein by reference in its entirety.

Other example comonomers include N-alkyl acrylamides and N-alkyl quarternary acrylamides, where the alkyl group comprises, for example, a C2-C28 alkyl group.

In certain embodiments, each of the one or more acrylamide-(co)polymers can optionally comprise crosslinking monomers, i.e. monomers comprising more than one polymerizable group. In certain embodiments, the one or more acrylamide-(co)polymers may optionally comprise crosslinking monomers in an amount of less than 0.5%, or 0.1%, by weight, based on the amount of all monomers.

In an embodiment, each of the one or more acrylamide-(co)polymers comprises at least one monoethylenically unsaturated comonomer comprising acid groups, for example monomers which comprise at least one group selected from —COOH, —SO$_3$H or —PO$_3$H$_2$. Examples of such monomers include but are not limited to acrylic acid, methacrylic acid, vinylsulfonic acid, allylsulfonic acid or 2-acrylamido-2-methylpropanesulfonic acid, particularly preferably acrylic acid and/or 2-acrylamido-2-methylpropanesulfonic acid and most preferred acrylic acid or the salts thereof. The amount of such comonomers comprising acid groups can be from 0.1% to 70%, from 1% to 50%, or from 10% to 50% by weight based on the amount of all monomers.

In an embodiment, each of the one or more acrylamide-(co)polymers comprise from 50% to 90% by weight of acrylamide units and from 10% to 50% by weight of acrylic acid units and/or their respective salts, based on the total weight of all the monomers making up the copolymer. In an embodiment, each of the one or more acrylamide-(co)polymers comprise from 60% to 80% by weight of acrylamide units and from 20% to 40% by weight of acrylic acid units, based on the total weight of all the monomers making up the copolymer.

In some embodiments, the one or more synthetic (co)polymers (e.g., the one or more acrylamide (co)polymers) are in the form of particles, which are dispersed in the emulsion or LP. In some embodiments, the particles of the one or more synthetic (co)polymers can have an average particle size of from 0.4 µm to 5 µm, or from 0.5 µm to 2 µm. Average particle size refers to the dso value of the particle size distribution (number average) as measured by laser diffraction analysis.

In some embodiments, the one or more synthetic (co)polymers (e.g., the one or more acrylamide (co)polymers) can have a weight average molecular weight ($M_w$) of from 5,000,000 g/mol to 30,000,000 g/mol; from 10,000,000 g/mol to 25,000,000 g/mol; or from 15,000,000 g/mol to 25,000,000 g/mol.

In some embodiments, the LP composition can comprise one or more synthetic (co)polymers (e.g., one or more acrylamide (co)polymers) dispersed in one or more hydrophobic liquids. In these embodiments, the amount of the one or more synthetic (co)polymers (e.g., one or more acrylamide (co)polymers) in the LP composition can be at least 39% by weight, based on the total weight of the composition. In some of these embodiments, the amount of the one or more synthetic (co)polymers (e.g., one or more acrylamide-(co)polymers) in the LP composition can be from 39% to 80% by weight, or from 40% to 60% by weight, or from 45% to 55% by weight, based on the total amount of all components of the composition (before dilution). In some embodiments, the amount of the one or more synthetic (co)polymers (e.g., one or more acrylamide-(co)polymers) in the LP composition is 39%, 40%, 41%, 42%, 43%, 44%, 45%, 46%, 47%, 48%, 49%, 50%, 51%, 52%, 53%, 54%, 55%, 56%, 57%, 58%, 59%, 60%, or higher, by weight, based on the total amount of all components of the composition (before dilution).

In some embodiments, the LP composition can comprise one or more synthetic (co)polymers (e.g., one or more acrylamide (co)polymers) emulsified in one or more hydrophobic liquids. In these embodiments, the amount of the one or more synthetic (co)polymers (e.g., one or more acrylamide (co)polymers) in the LP composition can be less than 38% by weight, less than 35% by weight, or less than 30% by weight based on the total weight of the composition. In some of these embodiments, the amount of the one or more synthetic (co)polymers (e.g., one or more acrylamide-(co)polymers) in the LP composition can be from 10% to 35% by weight, from 10% to 38% by weight, from 15% to 30% by weight, from 15% to 38% by weight, from 20% to 38% by weight, or from 20% to 30% by weight, based on the total amount of all components of the composition (before dilution). In some embodiments, the amount of the one or more synthetic (co)polymers (e.g., one or more acrylamide-(co) polymers) in the LP composition is 38%, 37%, 36%, 35%, 34%, 33%, 32%, 31%, 30%, 29%, 28%, 27%, 26%, 25%, 24%, 23%, 22%, 21%, 20%, 19%, 18%, 17%, 16%, 15%, 14%, 13%, 12%, 11%, or less, by weight, based on the total amount of all components of the composition (before dilution).

Emulsifying Surfactants

In some embodiments, the LP composition can include one or more emulsifying surfactants. In some embodiments, the one or more emulsifying surfactants are surfactants capable of stabilizing water-in-oil-emulsions. Emulsifying surfactants, among other things, in the emulsion, lower the interfacial tension between the water and the water-immiscible liquid so as to facilitate the formation of a water-in-oil polymer emulsion. It is known in the art to describe the capability of surfactants to stabilize water-in-oil-emulsions or oil-in-water emulsions by using the so called "HLB-value" (hydrophilic-lipophilic balance). The HLB-value usually is a number from 0 to 20. In surfactants having a low HLB-value the lipophilic parts of the molecule predominate and consequently they are usually good water-in-oil emulsifiers. In surfactants having a high HLB-value the hydrophilic parts of the molecule predominate and consequently they are usually good oil-in-water emulsifiers. In some embodiments, the one or more emulsifying surfactants are surfactants having an HLB-value of from 2 to 10, or a mixture of surfactant having an HLB-value of from 2 to 10.

Examples of suitable emulsifying surfactants include, but are not limited to, sorbitan esters, in particular sorbitan monoesters with C12-C18-groups such as sorbitan monolaurate (HLB approx. 8.5), sorbitan monopalmitate (HLB approx. 7.5), sorbitan monostearate (HLB approx. 4.5), sorbitan monooleate (HLB approx. 4); sorbitan esters with more than one ester group such as sorbitan tristearate (HLB approx. 2), sorbitan trioleate (HLB approx. 2); ethoxylated fatty alcohols with 1 to 4 ethyleneoxy groups, e.g. polyoxyethylene (4) dodecylether ether (HLB value approx. 9), polyoxyethylene (2) hexadecyl ether (HLB value approx. 5), and polyoxyethylene (2) oleyl ether (HLB value approx. 4).

Exemplary emulsifying surfactants include, but are not limited to, emulsifiers having HLB values of from 2 to 10 (e.g., less than 7). Suitable such emulsifiers include the sorbitan esters, phthalic esters, fatty acid glycerides, glycerine esters, as well as the ethoxylated versions of the above and any other well known relatively low HLB emulsifier. Examples of such compounds include sorbitan monooleate, the reaction product of oleic acid with isopropanolamide, hexadecyl sodium phthalate, decyl sodium phthalate, sorbitan stearate, ricinoleic acid, hydrogenated ricinoleic acid, glyceride monoester of lauric acid, glyceride monoester of stearic acid, glycerol diester of oleic acid, glycerol triester of 12-hydroxystearic acid, glycerol triester of ricinoleic acid, and the ethoxylated versions thereof containing 1 to 10 moles of ethylene oxide per mole of the basic emulsifier. Thus, any emulsifier can be utilized which will permit the formation of the initial emulsion and stabilize the emulsion during the polymerization reaction. Examples of emulsifying surfactants also include modified polyester surfactants, anhydride substituted ethylene copolymers, N,N-dialkanol substituted fatty amides, and tallow amine ethoxylates.

In an embodiment, the inverse emulsion or LP composition comprises from 0% to 5% by weight (e.g., from 0.05% to 5%, from 0.1% to 5%, or from 0.5% to 3% by weight) of the one or more emulsifying surfactants, based on the total weight of the composition. These emulsifying surfactants can be used alone or in mixtures. In some embodiments, the inverse emulsion or LP composition can comprise less than 5% by weight (e.g., less than 4% by weight, or less than 3% by weight) of the one or more emulsifying surfactants, based on the total weight of the composition.

Process Stabilizing Agents

In some embodiments, the LP composition can optionally include one or more process stabilizing agents. The process stabilizing agents aim at stabilizing the dispersion of the particles of polyacrylamide-(co)polymers in the organic, hydrophobic phase and optionally also at stabilizing the droplets of the aqueous monomer phase in the organic hydrophobic liquid before and in course of the polymerization or processing of the LP composition. The term "stabilizing" means in the usual manner that the agents prevent the dispersion from aggregation and flocculation.

The process stabilizing agents can be any stabilizing agents, including surfactants, which aim at such stabilization. In certain embodiments, the process stabilizing agents can be oligomeric or polymeric surfactants. Due to the fact that oligomeric and polymeric surfactants can have many anchor groups they absorb very strongly on the surface of the particles and furthermore oligomers/polymers are capable of forming a dense steric barrier on the surface of the particles which prevents aggregation. The number average molecular weight Mn of such oligomeric or polymeric surfactants may for example range from 500 to 60,000 g/mol (e.g., from 500 to 10,000 g/mol, or from 1,000 to 5,000 g/mol). Suitable oligomeric and/or polymeric surfactants for stabilizing polymer dispersions are known to the skilled artisan. Examples of such stabilizing polymers comprise amphiphilic block copolymers, comprising hydrophilic and hydrophobic blocks, amphiphilic copolymers comprising hydrophobic and hydrophilic monomers and amphiphilic comb polymers comprising a hydrophobic main chain and hydrophilic side chains or alternatively a hydrophilic main chain and hydrophobic side chains.

Examples of amphiphilic block copolymers comprise block copolymers comprising a hydrophobic block comprising alkylacrylates having longer alkyl chains, e.g., C6 to C22-alkyl chains, such as for instance hexyl(meth)acrylate, 2-ethylhexyl(meth)acrylate, octyl(meth)acrylate, do-decyl (meth)acrylate, hexadecyl(meth)acrylate or octadecyl(meth) acrylate. The hydrophilic block may comprise hydrophilic monomers such as acrylic acid, methacrylic acid or vinyl pyrrolidone.

Inverting Surfactants

In some embodiments, the LP composition optionally can include one or more inverting surfactants. In some embodiments, the one or more emulsifying surfactants are surfactants which can be used to accelerate the formation of an inverted composition (e.g., an inverted (co)polymer solution) after mixing the inverse emulsion or LP composition with an aqueous fluid.

Suitable inverting surfactants are known in the art, and include, for example, nonionic surfactants comprising a hydrocarbon group and a polyalkylenoxy group of sufficient hydrophilic nature. In some cases, nonionic surfactants defined by the general formula $R^1$—O—(CH($R^2$)—CH$_2$—O)$_n$H (I) can be used, wherein $R^1$ is a $C_8$-$C_{22}$-hydrocarbon group, such as an aliphatic $C_{10}$-$C_{18}$-hydrocarbon group, n is a number of ≥4, preferably ≥6, and $R^2$ is H, methyl or ethyl, with the proviso that at least 50% of the groups $R^2$ are H. Examples of such surfactants include polyethoxylates based on $C_{10}$-$C_{18}$-alcohols such as $C_{12/14}$-, $C_{14/18}$- or $C_{16/18}$-fatty alcohols, $C_{13}$- or $C_{13/15}$-oxoalcohols. The HLB-value can be adjusted by selecting the number of ethoxy groups. Specific examples include tridecylalcohol ethoxylates comprising from 4 to 14 ethylenoxy groups (e.g., tridecylalcohol-8 EO (HLB-value approx. 13-14)) or $C_{12/14}$ fatty alcohol ethoxylates (e.g., $C_{12/14.8}$ EO (HLB-value approx. 13)). Examples of emulsifying surfactants also include modified polyester surfactants, anhydride substituted ethylene copolymers, N,N-dialkanol substituted fatty amides, and tallow amine ethoxylates.

Other suitable inverting surfactants include anionic surfactants, such as, for example, surfactants comprising phosphate or phosphonic acid groups.

In some embodiments, the one or more inverting surfactants can comprise polyoxyethylene sorbitol tetraoleate, $C_{12-14}$ branched ethoxylated alcohol, polyethylene glycol monoleate. In certain embodiments, the one or more inverting surfactants can comprise from 1 to 20 mole % polyoxyethylene sorbitol tetraoleate, from 60 to 80 mole % $C_{12-14}$ branched ethoxylated alcohol and about 15 to about 25 mole % polyethylene glycol monoleate.

In some embodiments, the amount of the one or more inverting surfactants in the inverse emulsion or LP composition is from 1% to 10% (e.g., from 1% to 5%) by weight, based on the total amount of all components of the inverse emulsion or LP composition.

In certain embodiments, the one or more inverting surfactants can be added to the inverse emulsion or LP composition directly after preparation of the composition comprising the one or more acrylamide (co)polymers dispersed in one or more hydrophobic liquids, and optionally the one or more emulsifying surfactants (i.e., the inverse emulsion or liquid dispersion polymer composition which is transported from the location of manufacture to the location of use already comprises the one or more inverting surfactants). In another embodiment the one or more inverting surfactants may be added to the inverse emulsion or LP composition at the location of use (e.g., at an off-shore production site).

Other Components

Optional further components can be added to the inverse emulsion or LP composition. Examples of such components comprise radical scavengers, oxygen scavengers, chelating agents, biocides, stabilizers, or sacrificial agents.

Preparation of LP Compositions

LP compositions can be synthesized as according to the following procedures.

In a first step, an inverse emulsion (water-in-oil emulsion) of acrylamide-(co)polymers can be synthesized using procedures known to the skilled artisan. Such inverse emulsions can be obtained by polymerizing an aqueous solution of acrylamide and other comonomers, such as water-soluble ethylenically unsaturated comonomers, emulsified in a hydrophobic oil phase. In a following step, water within such inverse emulsions can be reduced to an amount of less than 10%, or less than 5%, by weight. Suitable techniques are described for instance in U.S. Pat. Nos. 4,052,353, 4,528,321, or DE 24 19 764 A1, each of which is incorporated herein by reference in its entirety.

For the polymerization, an aqueous monomer solution comprising acrylamide and optionally other comonomers can be prepared. Acrylamide is a solid at room temperature and aqueous solutions comprising around 50% by weight of acrylamide are commercially available. If comonomers with acidic groups such as acrylic acid are used the acidic groups may be neutralized by adding aqueous bases such as aqueous sodium hydroxide. The concentration of all monomers together in the aqueous solution should usually be from 10% to 60% by weight based on the total of all components of the monomer solution, or from 30% to 50%, or from 35% to 45% by weight.

The aqueous solution of acrylamide and comonomers can be emulsified in the one or more hydrophobic liquids using one or more emulsifying surfactants. The one or more emulsifying surfactants may be added to the mixture or may be added to the monomer solution or the hydrophobic liquid before mixing. Other surfactants may be used in addition to the one or more emulsifying surfactants, such as a stabilizing surfactant. Emulsifying may be done in the usual manner, e.g. by stirring the mixture.

After an emulsion has been formed polymerization may be initiated by adding oil- and/or water soluble initiators for radical polymerization to the emulsion. The initiators may be dissolved in water or water miscible organic solvents such as for instance alcohols. It may also be added as emulsion. Exemplary polymerization initiators comprise organic peroxides such as tert-butyl hydroperoxide, sodium sulfite, sodium disulfite or organic sulfites, ammonium- or sodium peroxodisulfate, iron(II) salts or azo groups comprising initiators such as AIBN.

In certain embodiments, one or more chain transfer agents may be added to the mixture during polymerization. Generally, chain transfer agents have at least one weak chemical bond, which therefore facilitates the chain transfer reaction. Any conventional chain transfer agent may be employed, such as propylene glycol, isopropanol, 2-mercaptoethanol, sodium hypophosphite, dodecyl mercaptan, thioglycolic acid, other thiols and halocarbons, such as carbon tetrachloride. The chain transfer agent is generally present in an amount of from 0.001 percent to 10 percent by weight of the total emulsion, though more may be used.

The polymerization temperature usually is from 30° C. to 100° C., or from 30° C. to 70° C., or from 35° C. to 60° C. Heating may be done by external sources of heat and/or heat may be generated—in particular when starting polymerization—by the polymerization reaction itself. Polymerization times may for example be from about 0.5 h to about 10 h.

The polymerization yields an inverse emulsion comprising an aqueous phase of the one or more acrylamide-(co)polymers dissolved or swollen in water wherein the aqueous phase is emulsified in an organic phase comprising the one or more hydrophobic liquids.

In order to convert the inverse emulsion obtained to the LP compositions to be used in the methods described herein, after the polymerization, some or all of the water is distilled off from the emulsion thus yielding particles of the one or more acrylamide-(co)polymers emulsified in the one or more hydrophobic liquids.

For the liquid polymer compositions, the water is at least removed to a level of less than 10%, or less than 7%, or less than 5%, or less than 3% by weight. In exemplary embodiments, the removal of water is carried out by any suitable means, for example, at reduced pressure, e.g. at a pressure of 30 hPa to 500 hPa, preferably 50 hPa to 250 hPa. The temperature in course of water removal may typically be from 70° C. to 100° C., although techniques which remove water at higher temperatures may be used. In certain embodiments, one or more of the hydrophobic liquids used in the inverse emulsion may be a low boiling liquid, which may distill off together with the water as a mixture.

After removal of the amount of water desired, the one or more inverting surfactants, and other optional components, can be added.

In some embodiments, the manufacture of the liquid polymer compositions is carried out in a chemical production plant.

Inverted Polymer Solutions

Also provided herein are inverted polymer solutions, as well as methods of preparing the inverted polymer solutions from the LP compositions described herein and methods for using the inverted polymer solutions in oil and gas operations.

Methods for preparing inverted polymer solutions from the LP compositions described herein can comprise inverting the LP composition in an aqueous fluid to provide an inverted polymer solution having a concentration of one or more synthetic (co)polymers (e.g., one or more acrylamide (co)polymers)of from 50 to 15,000 ppm.

In some embodiments, the inverted polymer solution can have a concentration of one or more synthetic (co)polymers (e.g., one or more acrylamide (co)polymers)of at least 50 ppm (e.g., at least 100 ppm, at least 250 ppm, at least 500 ppm, at least 750 ppm, at least 1000 ppm, at least 1500 ppm, at least 2000 ppm, at least 2500 ppm, at least 3000 ppm, at least 3500 ppm, at least 4000 ppm, at least 4500 ppm, at least 5000 ppm, at least 5500 ppm, at least 6000 ppm, at least 6500 ppm, at least 7000 ppm, at least 7500 ppm, at least 8000 ppm, at least 8500 ppm, at least 9000 ppm, at least 9500 ppm, at least 10,000 ppm, at least 10,500 ppm, at least 11,000 ppm, at least 11,500 ppm, at least 12,000 ppm, at least 12,500 ppm, at least 13,000 ppm, at least 13,500 ppm, at least 14,000 ppm, or at least 14,500 ppm).

In some embodiments, the inverted polymer solution can have a concentration of one or more synthetic (co)polymers (e.g., one or more acrylamide (co)polymers)of 15,000 ppm or less (e.g., 14,500 ppm or less, 14,000 ppm or less, 13,500 ppm or less, 13,000 ppm or less, 12,500 ppm or less, 12,000 ppm or less, 11,500 ppm or less, 11,000 ppm or less, 10,500 ppm or less, 10,000 ppm or less, 9,500 ppm or less, 9,000 ppm or less, 8,500 ppm or less, 8,000 ppm or less, 7,500 ppm or less, 7,000 ppm or less, 6,500 ppm or less, 6,000 ppm or less, 5,500 ppm or less, 5,000 ppm or less, 4500 ppm or less, 4000 ppm or less, 3500 ppm or less, 3000 ppm or less, 2500 ppm or less, 2000 ppm or less, 1500 ppm or less, 1000 ppm or less, 750 ppm or less, 500 ppm or less, 250 ppm or less, or 100 ppm or less).

The inverted polymer solution can have a concentration of one or more synthetic (co)polymers (e.g., one or more acrylamide (co)polymers)ranging from any of the minimum values described above to any of the maximum values described above. For example, in some embodiments, the inverted polymer solution can have a concentration of one or more synthetic (co)polymers (e.g., one or more acrylamide (co)polymers)of from 500 to 5000 ppm (e.g., from 500 to 3000 ppm, or from 500 to 1500 ppm).

In some embodiments, the inverted polymer solution can be an aqueous unstable colloidal suspension. In other embodiments, the inverted polymer solution can be an aqueous stable solution.

In some embodiments, the inverted polymer solution can have a filter ratio of 1.5 or less (e.g., 1.45 or less, 1.4 or less, 1.35 or less, 1.3 or less, 1.25 or less, 1.2 or less, 1.15 or less, 1.1 or less, or less than 1.05) at 15 psi using a 1.2 μm filter. In some embodiments, the inverted polymer solution can have a filter ratio of greater than 1 (e.g., at least 1.05, at least 1.1, at least 1.15, at least 1.2, at least 1.25, at least 1.3, at least 1.35, at least 1.4, or at least 1.45) at 15 psi using a 1.2 μm filter.

The inverted polymer solution can a filter ratio at 15 psi using a 1.2 μm filter ranging from any of the minimum values described above to any of the maximum values described above. For example, in some embodiments, the inverted polymer solution can have a filter ratio of from 1 to 1.5 (e.g., from 1.1 to 1.4, or from 1.1 to 1.3) at 15 psi using a 1.2 μm filter.

In certain embodiments, the inverted polymer solution can have a viscosity based on shear rate, temperature, salinity, polymer concentration, and polymer molecular weight. In some embodiments, the inverted polymer solution can have a viscosity of from 2 cP to 100 cP, where the 2 cP to 100 cP is an output using the ranges in the following table:

| | |
|---|---|
| Polymer viscosity (cP) | 2~100 |
| Shear rate (1/sec) | 0.1~1000 |
| Temperature (° C.) | 1~120 |
| Salinity (ppm) | 0~250,000 |
| Polymer concentration (ppm) | 50~15,000 |
| Polymer molecular weight (Dalton) | 2M~26M |

In some embodiments, the inverted polymer solution can have a viscosity of from 25 cP to 35 cP at 30° C. In some embodiments, the inverted polymer solution can have a viscosity of greater than 10 cP at 40° C. In certain embodiments, the inverted polymer solution can have a viscosity of from 20 cP to 30 cP at 40° C.

In some embodiments, when the LP composition is inverted in an aqueous fluid, providing an inverted polymer solution having from 50 to 15,000 ppm, from 500 to 5,000 ppm, or from 500 to 3000 ppm, active polymer, the inverted polymer solution has a viscosity of at least 20 cP at 40° C., and a filter ratio (FR) (1.2 micron filter) of 1.5 or less. In certain embodiments, when the LP composition is inverted in an aqueous fluid, providing an inverted polymer solution having from 50 to 15,000 ppm, from 500 to 5000 ppm, or from 500 to 3000 ppm, active polymer, the inverted polymer solution has a viscosity of at least 20 cP at 30° C., and a filter ratio (FR) (1.2 micron filter) of 1.5 or less. As used herein, "inverted" refers to the point at which the viscosity of the inverted polymer solution has substantially reached a consistent viscosity. In practice, this may be determined for example by measuring viscosity of the inverted polymer solution periodically over time and when three consecutive measurements are within the standard of error for the measurement, then the composition is considered inverted. In some embodiments, inversion of the LP forms the inverted polymer solution in 30 minutes or less (e.g., 15 minutes or less, 10 minutes or less, 5 minutes or less, or less).

As described above, methods for preparing an inverted polymer solution from the LP composition described herein can comprise inverting the LP composition in an aqueous fluid to provide an inverted polymer solution having a concentration of acrylamide (co)polymer of from 50 to 15,000 ppm. Inversion of the LP composition can be performed as a batch process or a continuous process. In certain embodiments, inversion of the LP composition can be performed as a continuous process. For example, inversion of the LP composition can be performed as a continuous process to produce a fluid stream for injection into a hydrocarbon-bearing formation. A continuous process is a process that can be effected without the need to be intermittently stopped or slowed. For example, continuous processes can meet one or more of the following criteria: (a) materials for forming the inverted polymer solution (e.g., the LP composition and the aqueous fluid) are fed into the system in which the inverted polymer solution is produced at the same rate as the inverted polymer solution is removed from the system; (b) the nature of the composition(s) introduced to the system in which the inverted polymer solution is produced is a function of the composition(s) position with the process as it flows from the point at which the composition(s) are introduced to the system to the point at which the inverted polymer solution is removed from the system; and/or (c) the quantity of inverted polymer solution produced is a function of (i) the duration for which the process is operated and (ii) the throughput rate of the process.

Inversion of the LP composition can comprise a single step, or a plurality of steps (i.e., two or more steps). In some embodiments, inversion of the LP composition can be performed in a single step. In these embodiments, the LP composition (e.g., a composition having at least 39% (e.g., 39% or more) by weight of one or more synthetic (co) polymers (e.g., one or more acrylamide (co)polymers) dispersed in a hydrophobic liquid, or a composition having up to 35% (e.g., less than 35%) by weight of one or more synthetic (co)polymers (e.g., one or more acrylamide (co) polymers) emulsified in a hydrophobic liquid) can be inverted in an aqueous fluid to provide an inverted polymer solution having a concentration of one or more synthetic (co)polymers (e.g., one or more acrylamide (co)polymers)of from 50 to 15,000 ppm.

The single inversion step can comprise diluting the LP composition in the aqueous fluid in an in-line mixer to provide the inverted polymer solution. For example, a polymer feed stream comprising the LP composition can be combined (e.g., in a fixed ratio) with an aqueous fluid stream upstream of an in-line mixer. The combined fluid stream can then pass through the in-line mixer, emerging as the inverted polymer solution. In some embodiments, the in-line mixer can have a mixer inlet and a mixer outlet, and the difference in pressure between the mixer inlet and the mixer outlet is from 15 psi to 400 psi (e.g., from 15 psi to 150 psi, from 15 psi to 100 psi, or from 15 psi to 75 psi).

An example system for inversion of LP compositions in a single step is illustrated schematically in FIG. 1. As shown in FIG. 1, a pump 102 can be used to inject a stream of the LP composition 104 into a line 106 carrying the aqueous fluid stream. The combined fluid stream can then pass through an in-line mixer 108 having a mixer inlet 110 and a mixer outlet 112, emerging as the inverted polymer solution. The pressure drop through the in-line mixer 108 (Δp) can be from 15 psi to 400 psi (e.g., from 15 psi to 150 psi, from 15 psi to 100 psi, or from 15 psi to 75 psi).

In other embodiments, inversion of the LP composition can be performed in two or more steps (e.g., an inversion step in which the LP composition is inverted in the aqueous fluid to form a concentrated polymer composition having a polymer concentration of up to 15,000 ppm; and one or more dilution steps in which the concentrated polymer composition is diluted in the aqueous fluid to provide the inverted polymer solution. For example, inversion of the LP composition can be performed in two, three, four, five, or more consecutive steps. In certain cases, inversion of the LP composition can be performed in two steps. In these embodiments, inversion of the LP can comprise as a first step, inverting the LP composition in an aqueous fluid in a first in-line mixer having a first mixer inlet and a first mixer outlet to provide an inverted polymer solution with a concentration of synthetic (co)polymer (e.g., acrylamide (co) polymer) that is up to 15,000 ppm (e.g., from 5,000 to 15,000 ppm); and as a second step, diluting the inverted polymer solution in the aqueous fluid in a second in-line mixer having a second mixer inlet and a second mixer outlet to provide the inverted polymer solution. For example, a polymer feed stream comprising the LP composition can be combined (e.g., in a fixed ratio) with an aqueous fluid stream upstream of a first in-line mixer. The combined fluid stream can then pass through the first in-line mixer, emerging as an inverted polymer solution with a concentration of synthetic (co)polymer (e.g., acrylamide (co)polymer) that is up to 15,000 ppm (e.g., from 5,000 to 15,000 ppm). The fluid stream can then be combined (e.g., in a fixed ratio) with a second aqueous fluid stream upstream of a second in-line mixer. The combined fluid stream can then pass through the second in-line mixer, emerging as the inverted polymer solution. In some embodiments, the first in-line mixer can have a first mixer inlet and a first mixer outlet, and the difference in pressure between the first mixer inlet and the first mixer outlet can be from 15 psi to 400 psi (e.g., from 15 psi to 150 psi, from 15 psi to 100 psi, or from 15 psi to 75 psi). In some embodiments, the second in-line mixer can have a second mixer inlet and a second mixer outlet, and the difference in pressure between the second mixer inlet and the second mixer outlet can be from 15 psi to 400 psi (e.g., from 15 psi to 150 psi, from 15 psi to 100 psi, or from 15 psi to 75 psi).

Figure 2:
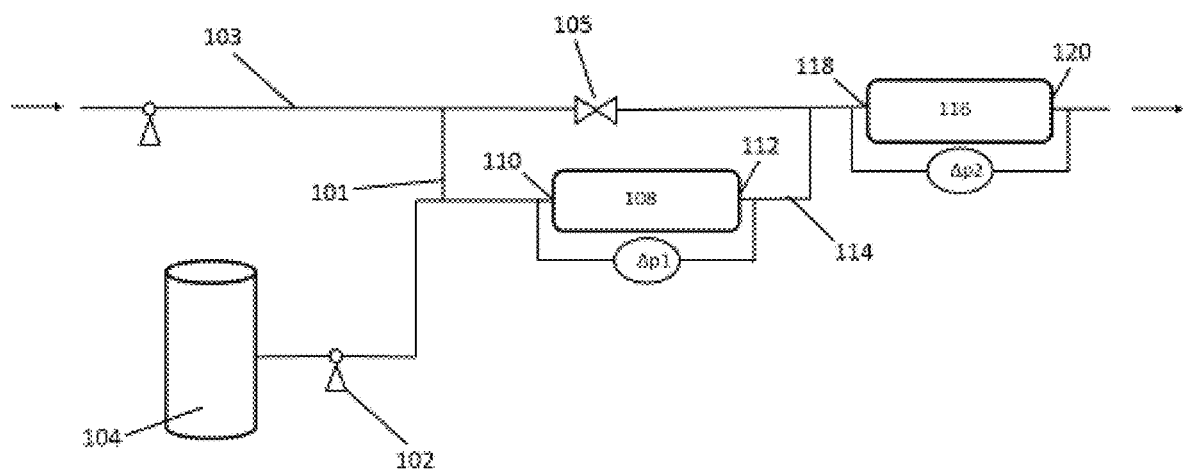
FIG. 2 is a process flow diagram illustrating a two-step process for preparing an inverted polymer solution.

An example system for inversion of LP compositions in two steps is illustrated schematically in FIG. 2. As shown in FIG. 2, a pump 102 can be used to inject a stream of the LP composition 104 into bypass 101 mounted on main line 103 carrying the aqueous fluid stream. A valve 105 positioned on main line 103 downstream of bypass 101 can be used to direct aqueous fluid flow through bypass 101. The combined fluid stream can then pass through a first in-line mixer 108 having a first mixer inlet 110 and a first mixer outlet 112, emerging as the inverted polymer solution with a concentration of synthetic (co)polymer (e.g., acrylamide (co)polymer) that is up to 15,000 ppm (e.g., from 5,000 to 15,000 ppm). The pressure drop through the first in-line mixer 108 ($\Delta 1$) can be from 15 psi to 400 psi (e.g., from 15 psi to 150 psi, from 15 psi to 100 psi, or from 15 psi to 75 psi). The inverted polymer fluid stream 114 can then be combined (e.g., in a fixed ratio) with the aqueous fluid stream in main line 103 upstream of a second in-line mixer 116. The combined fluid stream can then pass through a second in-line mixer 116 having a second mixer inlet 118 and a second mixer outlet 120, emerging as the inverted polymer solution. The pressure drop through the second in-line mixer 116 ($\Delta p2$) can be from 15 psi to 400 psi (e.g., from 15 psi to 150 psi, from 15 psi to 100 psi, or from 15 psi to 75 psi).

The LP compositions described herein can also be inverted using inversion methods and systems known in the art, such as those described in U.S. Pat. No. 8,383,560, which is hereby incorporated by reference in its entirety.

Figure 3A:
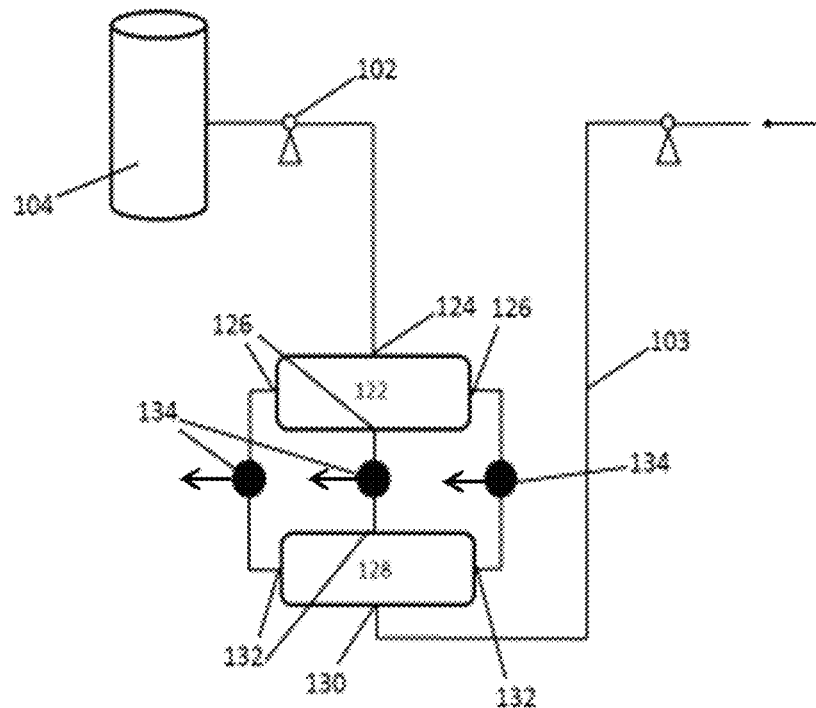
FIGS. 3A and 3B are process flow diagrams illustrating a plurality of processes for preparing inverted polymer solutions.
Figure 3B:
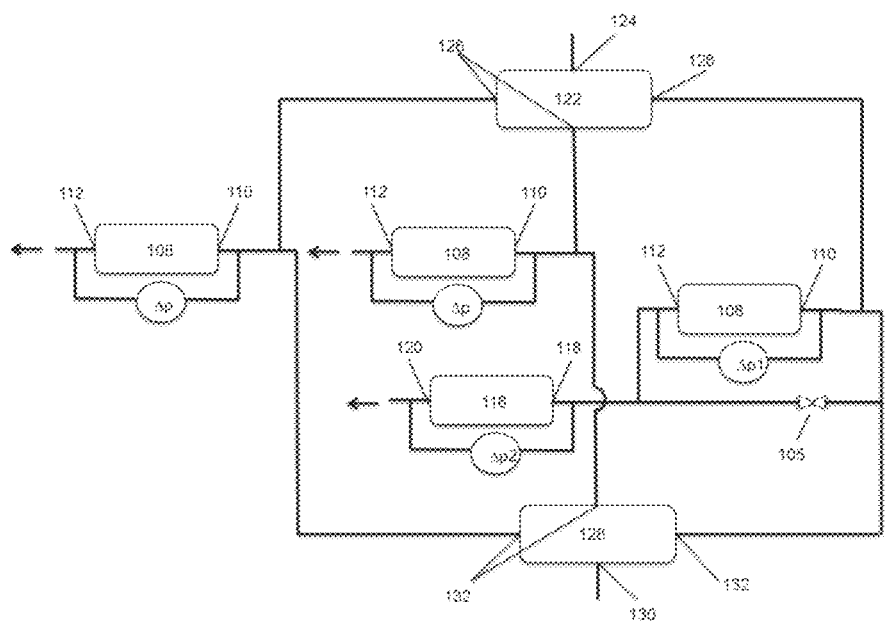

Another example system for inversion of LP compositions is illustrated schematically in FIG. 3. As shown in FIG. 3A, a pump 102 can be used to direct a stream of the LP composition 104 to LP manifold 122. LP manifold 122 can include an LP manifold inlet 124 through which the LP composition enters the LP manifold 122, and a plurality of LP manifold outlets 126 (in this example three manifold outlets) through which streams of the LP composition exit the LP manifold 122. The system can also include a main line 103 carrying an aqueous fluid stream to aqueous fluid manifold 128. The aqueous fluid manifold 128 can include an aqueous fluid manifold inlet 130 through which the aqueous fluid enters the aqueous fluid manifold 128, and a plurality of aqueous fluid manifold outlets 132 (in this example three manifold outlets) through which streams of the aqueous fluid exit the aqueous fluid manifold 128. Each stream of LP composition exiting LP manifold 122 can then be combined with a stream of aqueous fluid exiting the aqueous fluid manifold 128 in a different configuration of in-line mixers 134, thereby forming a plurality of streams of the inverted polymer solution in parallel. The configuration of in-line mixers 134 for inversion of the LP composition comprises parallel single steps, parallel multiple steps, or any combination thereof. FIG. 3B shows one example of configuration of the in-line mixers 134 comprises the combination of two single steps and one two-step of inversion process in parallel.

Any suitable in-line mixer(s) can be used in conjunction with the inversion methods described above. The in-line mixer can be a dynamic mixer or a static mixer. Suitable dynamic mixers, which involve mechanical agitation of one type or another, are known in the art, and include impeller mixers, turbine mixers, rotor-stator mixers, colloid mills, pumps, and pressure homogenizers. In certain embodiment, the in-line mixer(s) can comprise a dynamic mixer such as an electrical submersible pump, hydraulic submersible pump, or a progressive cavity pump. In certain embodiments, the in-line mixer(s) can comprise static mixers. Static mixers are mixers that mix fluids in flow without the use of moving parts. Static mixers are generally constructed from a series of stationary, rigid elements that form intersecting channels to split, rearrange and combine component streams resulting in one homogeneous fluid stream. Static mixers provide simple and efficient solutions to mixing and contacting problems. More affordable than dynamic agitator systems, static mixing units have a long life with minimal maintenance and low pressure drop. Static mixers can be fabricated from metals and/or plastics to fit pipes and vessels of virtually any size and shape. In some cases, the static mixer can comprise a region of pipe, for example a serpentine region of pipe that facilitates mixing.

The aqueous fluid used to invert the LP composition can comprise from 0 to 250,000 ppm; 15,000 to 160,000 ppm; from 15,000 to 100,000 ppm; from 10,000 to 50,000 ppm; from 15,000 to 50,000 ppm; from 30,000 to 40,000 ppm; from 10,000 to 25,000 ppm; from 10,000 to 20,000 ppm; or from 15,000 to 16,000 ppm total dissolved solids (tds). In an example embodiment, the aqueous fluid can comprise a brine having about 15,000 ppm tds. In one embodiment, the brine may be a synthetic seawater brine as illustrated in Table 1.

TABLE 1

Composition of an example synthetic seawater brine.

| Ions (ppm) | Synthetic seawater brine |
|---|---|
| Na+ | 10800 |
| K+ | 400 |
| Ca++ | 410 |

TABLE 1-continued

Composition of an example synthetic seawater brine.

| Ions (ppm) | Synthetic seawater brine |
|---|---|
| Mg++ | 1280 |
| Cl– | 19400 |
| TDS | 32290 |

The aqueous fluid used to invert the LP compositions can comprise produced reservoir brine, reservoir brine, sea water, fresh water, produced water, water, saltwater (e.g. water containing one or more salts dissolved therein), brine, synthetic brine, synthetic seawater brine, or any combination thereof. Generally, the aqueous fluid can comprise water from any readily available source, provided that it does not contain an excess of compounds that may adversely affect other components in the inverted polymer solution or render the inverted polymer solution unsuitable for its intended use (e.g., unsuitable for use in an oil and gas operation such as an EOR operation). If desired, aqueous fluids obtained from naturally occurring sources can be treated prior to use. For example, aqueous fluids can be softened (e.g., to reduce the concentration of divalent and trivalent ions in the aqueous fluid) or otherwise treated to adjust their salinity. In certain embodiments, the aqueous fluid can comprise soft brine or hard brine. In certain embodiments, the aqueous fluid can comprise produced reservoir brine, reservoir brine, sea water, or a combination thereof.

In one embodiment, seawater is used as the aqueous fluid, since off-shore production facilities tend to have an abundance of seawater available, limited storage space, and transportation costs to and from an off-shore site are typically high. If seawater is used as the aqueous fluid, it can be softened prior to the addition of the suspended polymer, thereby removing multivalent ions in the water (e.g., specifically $Mg^{2+}$ and $Ca^{2+}$).

In some embodiments, the aqueous fluid can have a temperature of from 1° C. to 120° C. In other embodiments, the aqueous fluid can have a temperature of from 45° ° C.to 95° C.

The inversion methods described herein can be specifically adapted for use in a particular oil and gas operation. For example, in some embodiments, inversion of the LP can be performed as a continuous process to produce a fluid stream for injection into a hydrocarbon-bearing formation.

In some cases, the in-line mixer (or one or more in-line mixers in the case of multistep inversion methods) can be arranged downstream from pumping equipment at the surface (e.g., on land, on a vessel, or on an offshore platform) that pumps the LP composition and the aqueous fluid. In certain embodiments, the in-line mixer (or one or more in-line mixers in the case of multistep inversion methods) can be positioned at or near the wellhead of a well. In certain embodiments, the in-line mixer can be arranged downhole. In certain embodiments, the in-line mixer (or one or more in-line mixers in the case of multistep inversion methods) can be positioned subsurface, subsea, or downhole.

In certain embodiments, the hydrocarbon-bearing formation can be a subsea reservoir. In these embodiments, the in-line mixer (or one or more in-line mixers in the case of multistep inversion methods) can be arranged downstream from pumping equipment at the surface (e.g., on shore, on a vessel, or on an offshore platform) that pumps the LP composition and/or the aqueous fluid. In certain embodiments, the in-line mixer (or one or more in-line mixers in the case of multistep inversion methods) can be positioned subsea. Thus, depending on the oil and gas operation, for example, an in-line mixer can be positioned on the surface, subsurface, subsea, or downhole.

Figure 4:
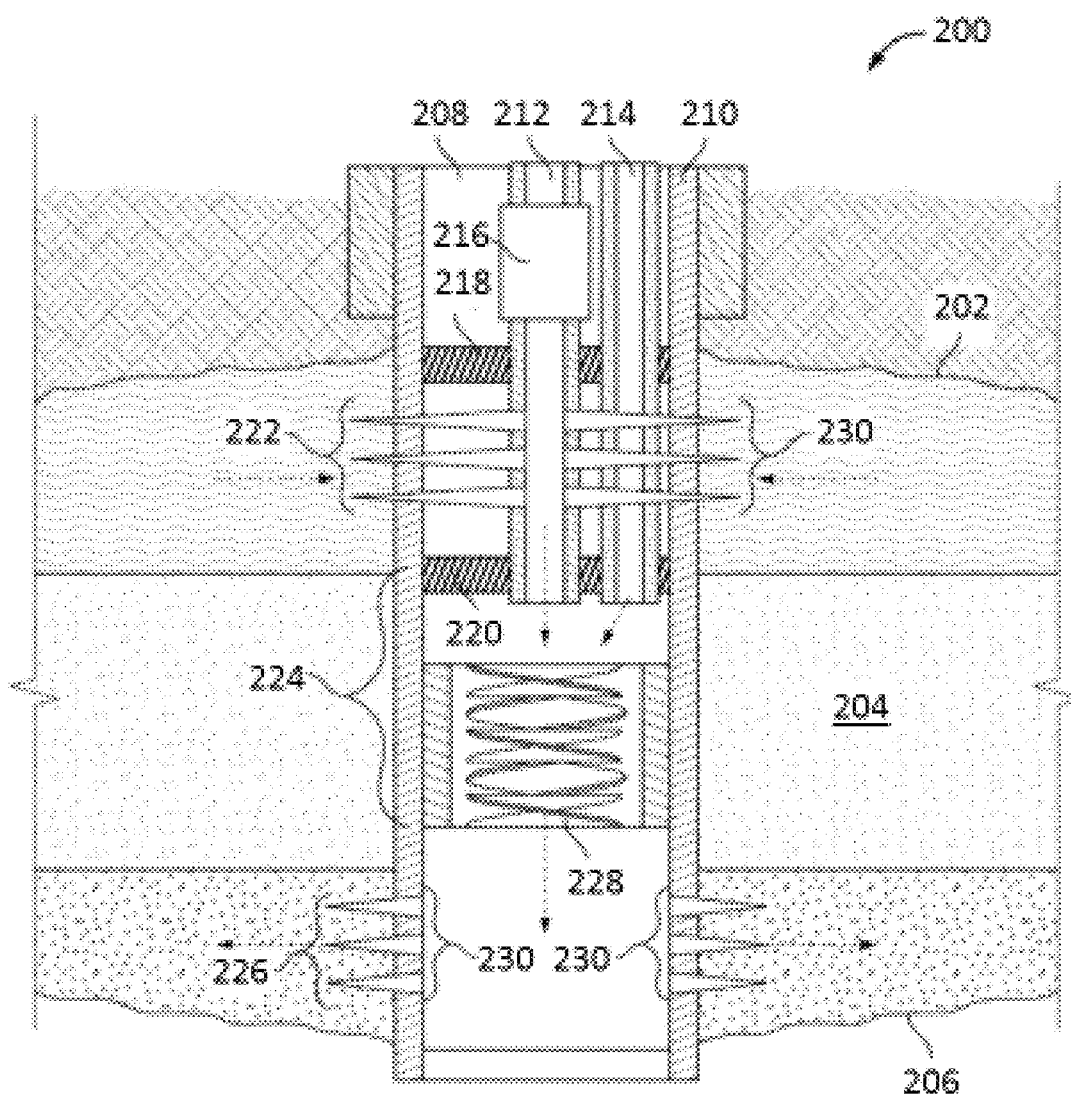
FIG. 4 illustrates an in-line injection system that can be used in conjunction with the compositions and methods described herein.

In some embodiments, the in-line mixer can be part of an in-line polymer dump flood injection system. Referring now to FIG. 4, in certain example embodiments, the in-line polymer dump flood injection system 200 can be used in a formation having a source reservoir layer 202, dividing or impermeable layers 204, and a target reservoir layer 206. The dividing or impermeable layers 204 can include shale, a combination of shales and smaller source reservoirs, gas reservoirs, or other oil reservoirs. In certain example embodiments, an injection well 208 is formed in an injection zone and completed with a casing 210. The injection well 208 is further completed by installing the injection system 200 therewithin. In certain example embodiments, the injection system 200 includes a water injection tubing 212 through which the aqueous fluid can be provided, a chemical injection tubing 214 through which LP composition can be provided, and a static mixer 228. Furthermore, in certain example embodiments, the injection well 208 is separated into a water collection zone 222, a mixing zone 224, and an injection zone 226. In certain example embodiments, the water collection zone 222 is substantially aligned with the source reservoir layer 202 of the formation, the injection zone 226 is substantially aligned with the target reservoir layer 206 of the formation, and the mixing zone 224 is disposed in between the water collection zone 222 and the injection zone 226.

In certain example embodiments, such as the example embodiment illustrated in FIG. 4, the water collection zone 222 is isolated between a first packer 218 disposed on top of the water collection zone 222 and a second packer 220 disposed between the water collection zone 222 and the mixing zone 224. In certain example embodiments, the water injection tubing 212 extends from the surface, where it is connected to a tubing string, and into the mixing zone 224, traversing the first packer 218 and the second packer 220. Accordingly, the tubing string is in fluid communication with the mixing zone 224. In certain example embodiments, the first packer 218 and second packer 220 are sealed around the water injection tubing 212. In certain example embodiments, the water injection tubing 212 and the casing 210 of the injection well 208 include a plurality of perforations 230, which put the water injection tubing 212 in fluid communication with the source reservoir layer 202. Water from the source reservoir layer 202 flows into the water collection zone through the perforations 230 in the casing 210 and then into the water injection tubing 212 through the perforations 230 in the water injection tubing 212. The water is then delivered into the mixing zone 224 via the water injection tubing 212. In certain example embodiments, the water injection tubing 212 is coupled to a pump 216, which facilitates the pulling of water out of the source reservoir layer 202 and the injection of water into the mixing zone 224. In certain example embodiments, the pump 216 controls the rate of water flow into the mixing zone 224.

In certain example embodiments, the chemical injection tubing 214 extends from the surface through to and terminating in the mixing zone 224. The chemical injection tubing 214 is coupled to a tubing string through which the LP composition can be delivered downhole and into the mixing zone 224. In certain example embodiments, the chemical injection tubing 214 traverses the first packer 218 and the second packer 220 such that the first packer 218 and the second packer 220 form a seal around the chemical injection tubing 214. In certain example embodiments, the chemical injection tubing 214 traverses the water collection zone 222 while the inside of the chemical injection tubing 214 is isolated from the water collection zone 222. In certain example embodiments, during operation, an LP composition is pumped into the mixing zone 224 from the surface via the chemical injection tubing 214. In certain example embodiments, the LP composition is pumped into the mixing zone 224 at a controlled rate. In certain example embodiments, the LP composition is pumped into the mixing zone 224 at a set ratio with respect to the water (i.e., the aqueous fluid) pumped into the mixing zone 224 via the water injection tubing 212, such that the LP composition is inverted in mixing zone 224, thereby forming an inverted polymer solution.

In certain example embodiments, when the water and the LP composition are injected into the mixing zone 224, the water and the LP composition are forced to travel through the static mixer 228. In certain example embodiments, the static mixer 228 provides a path having a plurality of obstacles which force fluid traveling therethrough to take a winding path. Thus, when water and LP composition are forced through the static mixer 228 together, the water and LP composition are mixed together, and exit the static mixer 228 as an inverted polymer solution.

In certain example embodiments, the inverted polymer solution is then injected into the injection zone 226 and ultimately injected into the surrounding target reservoir 206 via perforations 230 in the casing 210. The injection fluid injected into the target reservoir 206 increases the pressure in the target reservoir 206. This mobilizes hydrocarbons in the target reservoir and pushes the hydrocarbons towards a neighboring producing well, where the hydrocarbons are can be recovered.

Figure 5:
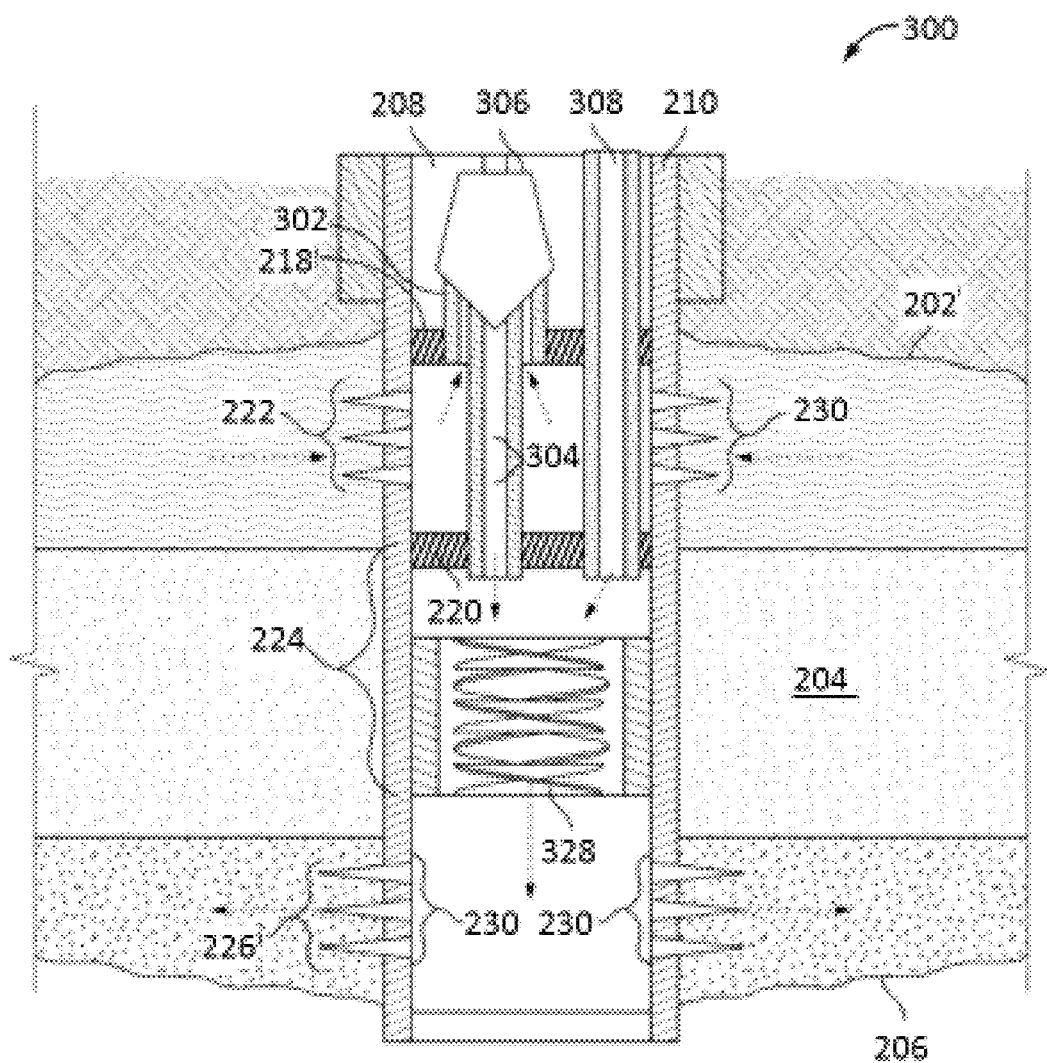
FIG. 5 illustrates an alternative in-line injection system that can be used in conjunction with the compositions and methods described herein.

FIG. 5 illustrates a second example embodiment of an in-line polymer dump flood injection system. Elements that are the same or comparable to the elements illustrated in the example shown in FIG. 4 are identified by the same reference number in FIGS. 4-9. Similar to the example illustrated in FIG. 4, the injection system 300 is installed within a cased injection well 208 having a source reservoir layer 202 and a target reservoir layer 206. In certain example embodiments, the injection well 208 is separated into the water collection zone 222, the mixing zone 224, and the injection zone 226. In certain example embodiments, the injection system 300 includes a water collection tubing 302, a water injection tubing 304, an electrical submersible pump (ESP) 306, a chemical injection tubing 308, and a static mixer 328. In certain example embodiments, the water collection zone 222 is isolated between a first packer 218 disposed on top of the water collection zone 222 and a second packer 220 disposed between the water collection zone 222 and the mixing zone 224. In certain example embodiments, the water collection tubing 302 extends from the water collection zone 222 to the ESP 306, which is located above the water collection zone 222. The water injection tubing 304 is disposed within the water collection tubing 302 and extends from the ESP 306 to the mixing zone 224, traversing the first packer 218 and the second packer 220. In certain example embodiments, water flows into the water collection zone 222 from the source reservoir 202 via a plurality of perforations 230 formed in the casing 210 of the injection well 208. The water is drawn into the ESP 306 through the water collection tubing 302, and then injected into the mixing zone 224 through the water injection tubing 304. The ESP 306 can be used to control the rate of water (i.e., aqueous fluid) injected into the mixing zone 224.

In certain example embodiments, the chemical injection tubing 308 extends from the surface through to and terminating in the mixing zone 224. The chemical injection tubing 308 is coupled to a tubing string through which an LP composition can be delivered downhole and into the mixing zone 224. In certain example embodiments, the chemical injection tubing 308 traverses the first packer 218 and the second packer 220 such that the first packer 218 and the second packer 220 form a seal around the chemical injection tubing 308. In certain example embodiments, the chemical injection tubing 308 traverses the water collection zone 222 while the inside of the chemical injection tubing 308 is isolated from the water collection zone 222. Thus, the LP composition is isolated from the ESP 306. In certain example embodiments, the LP composition is pumped into the mixing zone 224 at a controlled rate. In certain example embodiments, the LP composition is pumped into the mixing zone 224 at a set ratio with respect to the water (i.e., aqueous fluid) pumped into the mixing zone 224 via the water injection tubing 304 and ESP 306, such that the LP composition is inverted in mixing zone 224, thereby forming an inverted polymer solution.

In certain example embodiments, when the water and the LP composition are injected into the mixing zone 224, the water and the LP composition are forced to travel through the static mixer 328. When water and LP composition are forced through the static mixer 328 together, the water and LP composition are mixed together, and exit the static mixer 228 as an inverted polymer solution.

In certain example embodiments, the inverted polymer solution is then injected into the injection zone 226 and ultimately injected into the surrounding target reservoir 206 via perforations 230 in the casing 210. The injection fluid injected into the target reservoir 206 increases the pressure in the target reservoir 206. This mobilizes hydrocarbons in the target reservoir and pushes the hydrocarbons towards a neighboring producing well, where the hydrocarbons are can be recovered.

Figure 6:
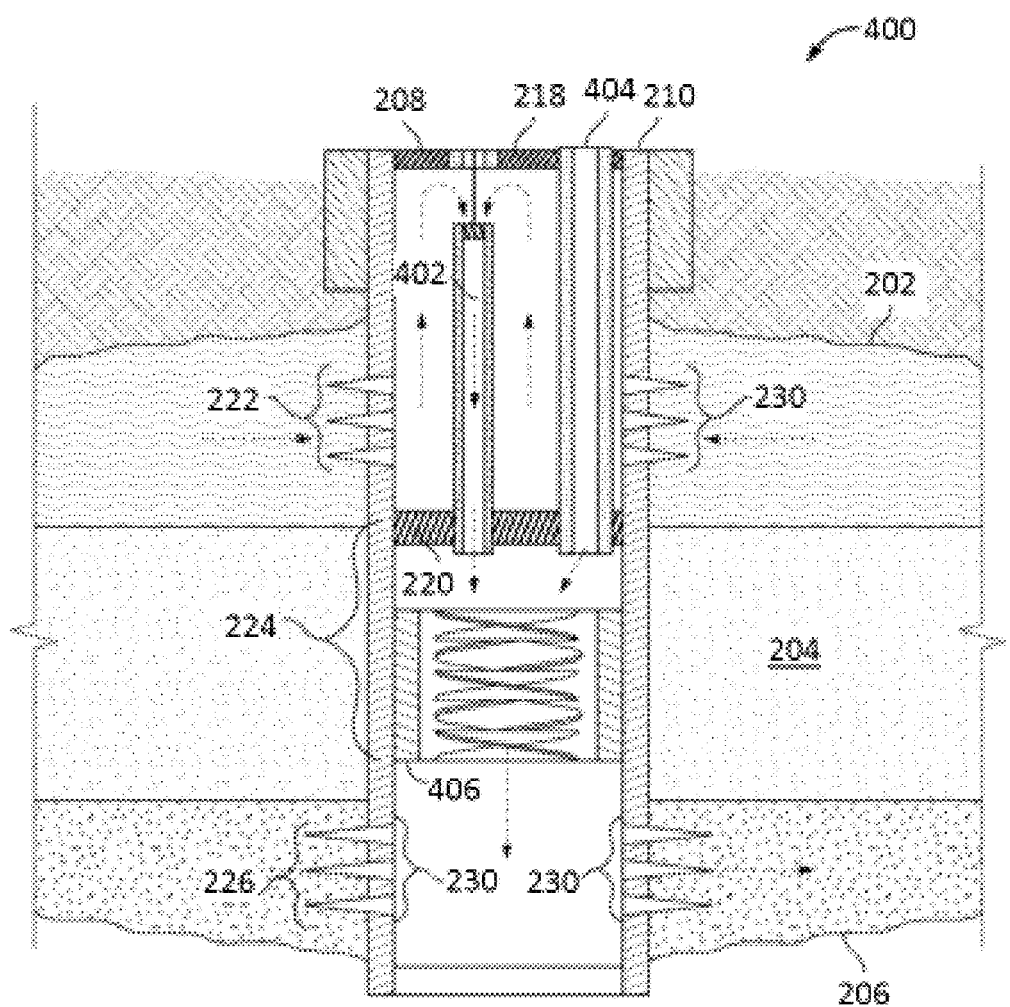
FIG. 6 illustrates an alternative in-line injection system that can be used in conjunction with the compositions and methods described herein.

FIG. 6 illustrates a third example embodiment of an in-line polymer dump flood injection system. In certain example embodiments, the injection system 400 includes a progressive cavity pump (PCP) 402, a chemical injection tubing 404, and a static mixer 406. In certain example embodiments, the water collection zone 222 is isolated between a first packer 218 disposed on top of the water collection zone 222 and a second packer 220 disposed between the water collection zone 222 and the mixing zone 224. In certain example embodiments, water flows into the water collection zone 222 from the source reservoir 202 via perforations 230 formed in the casing 210 of the injection well 208. The PCP 402 extends from the water collection zone 222 to the mixing zone 224, traversing the second packer 220. In certain example embodiments, the PCP 402 drives water from the water collection zone 222 into the mixing zone 224. The water collection zone 222 and the mixing zone 224 are otherwise isolated from each other. In one embodiment, the PCP 402 can include a stator and a drive rod, as well as an inlet towards the top of the PCP 402 and an outlet towards the bottom of the PCP 402. The water from the water collection zone 222 enters the PCP 402 through the inlet of the PCP 402 and the water exits through the outlet of the PCP 402. Thus, the PCP 402 can be used to control the rate of water (i.e., aqueous fluid) injected into the mixing zone 224.

In certain example embodiments, the chemical injection tubing 404 extends from the surface through to and terminating in the mixing zone 224. The chemical injection tubing 404 is coupled to a tubing string through which an LP composition is delivered downhole and into the mixing zone 224. In certain example embodiments, the chemical injection tubing 404 traverses the first packer 218 and the second packer 220 such that the first packer 218 and the second packer 220 form a seal around the chemical injection tubing 404. In certain example embodiments, the chemical injection tubing 404 traverses the water collection zone 222 while the inside of the chemical injection tubing 404 is isolated from the water collection zone 222. Thus, the LP composition is isolated from the PCP 402. In certain example embodiments, the LP composition is pumped into the mixing zone 224 at a controlled rate. In certain example embodiments, the LP composition is pumped into the mixing zone 224 at a set ratio with respect to the water (i.e., aqueous fluid) pumped into the mixing zone 224 via the PCP 402, such that the LP composition is inverted in mixing zone 224, thereby forming an inverted polymer solution.

In certain example embodiments, when the water and the LP composition are injected into the mixing zone 224, the water and the LP composition are forced to travel through the static mixer 406. When water and LP composition are forced through the static mixer 406 together, the water and LP composition are mixed together, and exit the static mixer 406 as an inverted polymer solution.

In certain example embodiments, the inverted polymer solution is then injected into the injection zone 226 and ultimately injected into the surrounding target reservoir 206 via perforations formed in the casing 210.

Figure 7:
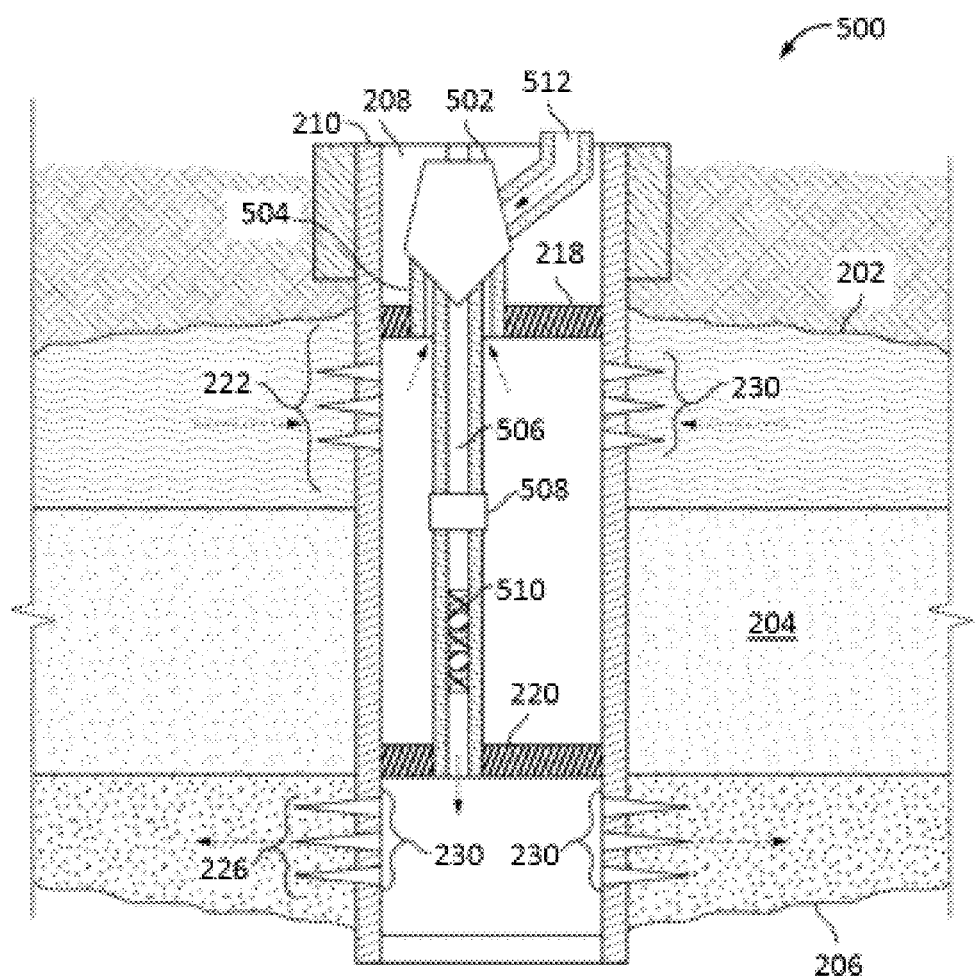
FIG. 7 illustrates an alternative in-line injection system that can be used in conjunction with the compositions and methods described herein.

FIG. 7 illustrates a fourth example embodiment of an in-line polymer dump flood injection system. In certain example embodiments, the injection system 500 is installed in an injection well 208 which is separated into a water collection zone 222 and an injection zone 226. In certain example embodiments, the water collection zone 222 is isolated between a first packer 218 disposed on top of the water collection zone 222 and a second packer 220 disposed between the water collection zone 222 and the injection zone 226. In certain example embodiments, the injection system 500 includes a water collection tubing 504, a water injection tubing 506, an ESP 502, a chemical injection tubing 512, and a static mixer 510. In certain example embodiments, the chemical injection tubing 512 extends from the surface to the ESP 502, and the chemical injection tubing 512 does not traverse the first packer 218. For example, the chemical injection tubing 512 is coupled to a tubing string through which an LP composition is delivered downhole and into the ESP 502. In certain example embodiments, water (i.e., aqueous fluid) flows into the water collection zone 222 from the source reservoir 202 via a plurality of perforations 230 formed in the casing 210 of the injection well 208. In certain example embodiments, the water collection tubing 504 extends from the water collection zone 222 to the ESP 502, which is located above the water collection zone 222. The water injection tubing 506 is disposed partially within the water collection tubing 504 and extends from the ESP 502 to the injection zone 226, traversing the first packer 218 and the second packer 220. The water (i.e., aqueous fluid) is drawn into the ESP 502 through the water collection tubing 504 and the LP composition is drawn into the ESP 502 through the chemical injection tubing 512, and then injected into the injection zone 226 through the water injection tubing 506. In certain example embodiments, a static mixer 510 is disposed within the water injection tubing 506, such that the water (i.e., aqueous fluid) and LP composition are mixed together as they travel through the water injection tubing 506 and into the injection zone 226, where they exit as an inverted polymer solution. The ESP 502 can be used to control the rate of water and LP composition injected into the injection zone 226. In certain example embodiments, the water injection tubing 506 includes a flow meter 508 which monitors flow rate. In certain example embodiments, the inverted polymer solution is then injected into the injection zone 226 and ultimately injected into the surrounding target reservoir 206 via perforations formed in the casing 210.

Figure 8:
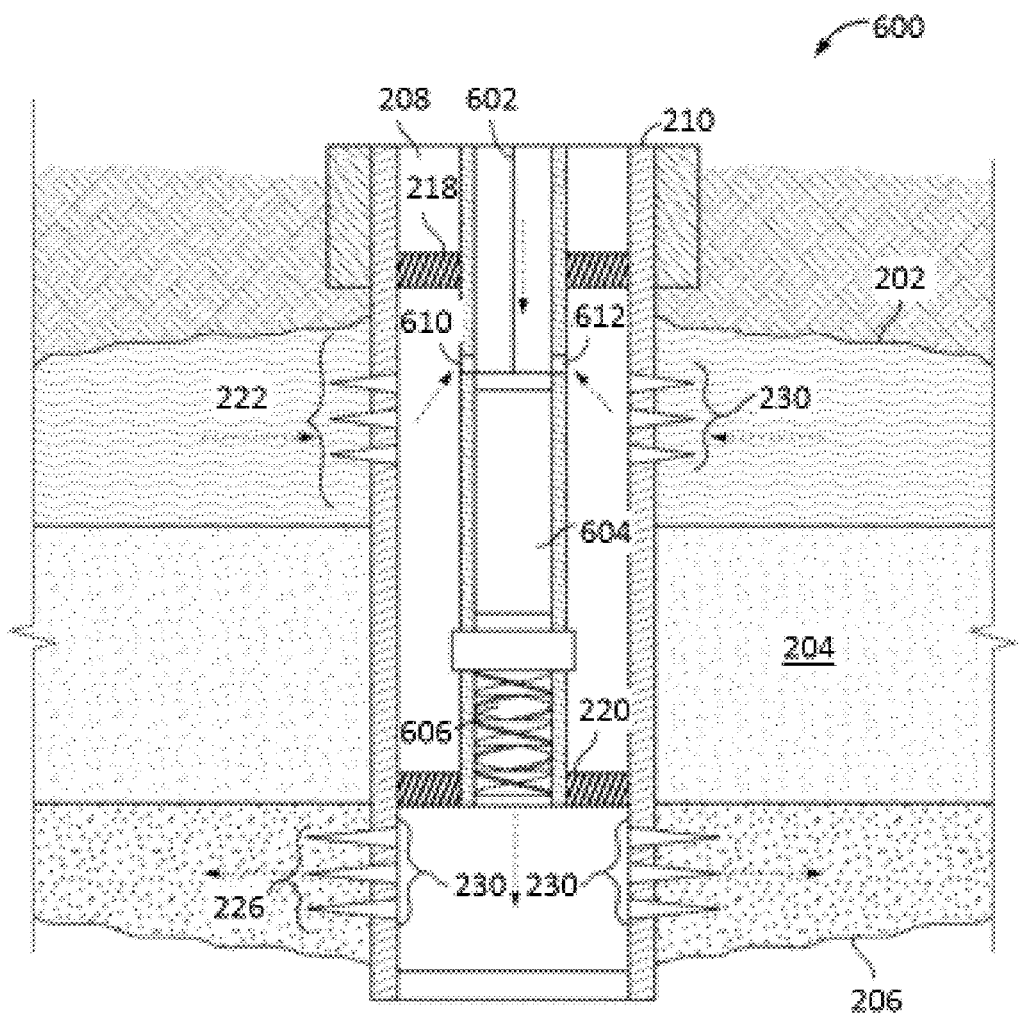
FIG. 8 illustrates an alternative in-line injection system that can be used in conjunction with the compositions and methods described herein.

FIG. 8 illustrates a fifth example embodiment of an in-line polymer dump flood injection system. In certain example embodiments, the injection system 600 is installed in an injection well 208 which is separated into a water collection zone 222 and an injection zone 226. In certain example embodiments, the water collection zone 222 is isolated between a first packer 218 disposed on top of the water collection zone 222 and a second packer 220 disposed between the water collection zone 222 and the injection zone 226. In certain example embodiments, the injection system 600 includes a chemical injection tubing 602, a PCP 604, and a static mixer 606. The PCP 604 can include a stator and a drive rod, as well as an inlet towards the top of the PCP 604 and an outlet towards the bottom of the PCP 604. In certain example embodiments, water (i.e., aqueous fluid) flows into the water collection zone 222 from the source reservoir 202 via perforations 230 formed in the casing 210 of the injection well 208. The chemical injection tubing 602 extends into the water collection zone 222 from the surface. The PCP 604 is coupled to the chemical injection tubing 602. In certain example embodiments, one way valves 610, 612 are disposed at the junction of the chemical injection tubing 602 and the PCP 604, and the one way valves 610, 612 allow water to enter the PCP 604 from the water collection zone 222. The one way valves 610, 612 are meant to allow water from the water collection zone 222 to pass through the one way valves 610, 612 (and towards the PCP 604), but the LP composition does not pass through the one way valves 610, 612 into the water collection zone 222. The water that passes through the one way valves 610, 612 and the LP composition from the chemical injection tubing 602 are pumped downward through the PCP 604. For example, the water from the water collection zone 222 and the LP composition from the chemical injection tubing 602 enter the PCP 604 through the inlet of the PCP 604 and exit through the outlet of the PCP 604 into the static mixer 606. The static mixer 606 is coupled to the PCP 604 opposite the chemical injection tubing 602. Thus, the water (i.e., aqueous fluid) and LP composition are driven into the static mixer 606 by the PCP 604, where they are mixed together, and exit the static mixer 606 as an inverted polymer solution.

In certain example embodiments, the inverted polymer solution is then injected into the injection zone 226 and ultimately injected into the surrounding target reservoir 206 via perforations 230 formed in the casing 210.

Figure 9:
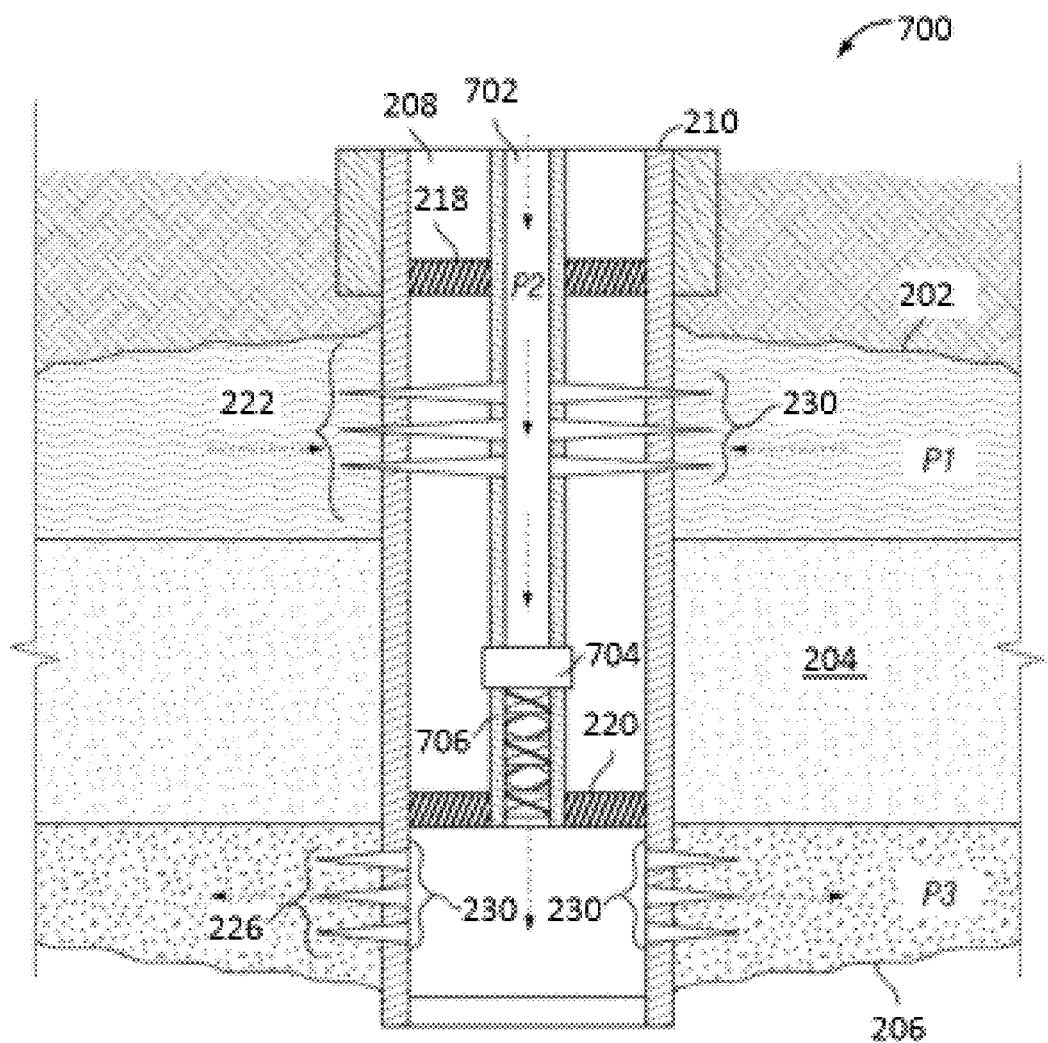
FIG. 9 illustrates an alternative in-line injection system that can be used in conjunction with the compositions and methods described herein.

FIG. 9 illustrates a sixth example embodiment of an inline chemical dump flood injection system. In certain example embodiments, the injection system 700 is installed in an injection well 208 which is separated into a water collection zone 222 and an injection zone 226. In certain example embodiments, the water collection zone 222 is isolated between a first packer 218 disposed on top of the water collection zone 222 and a second packer 220 disposed between the water collection zone 222 and the injection zone 226. In certain example embodiments, the injection system 700 includes a chemical injection tubing 702 and a static mixer 706. In certain example embodiments, the chemical injection tubing 702 also includes a flow meter for measuring flow rate. The chemical injection tubing 702 extends from the surface and into the injection zone 226. In certain example embodiments, water flows into the water collection zone 222 from the source reservoir 202 via perforations 230 formed in the casing 210 of the injection well 208. The source reservoir 202 has a particular pressure illustrated as P1. In certain example embodiments, the chemical injection tubing 702 also includes a plurality of perforations 230 which allows water to flow into the chemical injection tubing 702. A LP composition with a particular pressure illustrated as P2 is pumped into the chemical injection tubing 702 from the surface. The water (i.e., aqueous fluid) and the LP composition flow into the static mixer 706, where they are mixed together, and exit the static mixer 706 as an inverted polymer solution. The inverted polymer solution is then injected into the injection zone 226 and ultimately injected into the surrounding target reservoir 206 via perforations 230 formed in the casing 210. The target reservoir 206 has a particular pressure illustrated as P3. As explained further below, the pressure differences between P1, P2, and P3 drive the water, the LP composition, or both to their destinations.

In FIG. 9, the pressure differences between P1, P2, and P3 drive the water, the LP composition, or both to their destinations. For example, in some cases, the pressure of the source reservoir 202 is higher than the pressure of the LP composition, and the pressure of the composition is higher than the pressure of the target reservoir 206 (i.e., P1>P2>P3). The highest pressure of the source reservoir 202 causes the water to flow from the source reservoir 202 towards a region of lower pressure, that is, the water collection zone 222, the chemical injection tubing 702, and through the static mixer 706 to the target reservoir 206 with the lowest pressure. Similarly, the pressure of the LP composition causes it to flow towards a region of lower pressure, that is, through the static mixer 706 to the target reservoir 206 with the lowest pressure. As the pressure of the source reservoir 202 is higher than the pressure of the LP composition, the LP composition will not flow towards the source reservoir 202.

Like in FIG. 9, the pressure differences can drive the water, the LP composition, or both to their destinations in some of the other embodiments as well. Moreover, a pump (e.g., the pump 216, the ESP 306, 502 and the PCP 402, 604), a valve (e.g., the one way valves 610, 612), pressure differences, or any combination thereof can be used to drive the water, the LP composition, or both to their destinations. For example, in FIG. 7, (a) the highest pressure of the source reservoir 202 causes the water to flow from the source reservoir 202 towards a region of lower pressure such as the water collection zone 222, (b) the contents of the water collection zone 222 are drawn into the ESP 502 by the operation of the ESP 502, and (c) the contents in the ESP 502 travel through the water injection tubing 506 and into the injection zone 226 by the operation of the ESP 502.

As discussed above, the inverted polymer solutions described herein can be used oil and gas operations, such as EOR operations. For example, the inverted polymer solutions described above can be used in polymer flooding operations. In some cases, the inverted polymer solution further includes one or more additional agents to facilitate hydrocarbon recovery. For example, the inverted polymer solution can further include a surfactant, an alkalinity agent, a co-solvent, a chelating agent, or any combination thereof. As such, the inverted polymer solution can be used in polymer (P), alkaline-polymer (AP), surfactant-polymer (SP), and/or in alkaline-surfactant-polymer (ASP)-type EOR operations. When present, these additional components can be incorporated to the aqueous fluid used to invert the LP composition prior to inversion of the LP composition. Alternatively, these additional components can be incorporated to the inverted polymer solutions following inversion of the LP composition.

For chemical enhanced oil recovery (CEOR) operations, the LP composition can be dispersed into an aqueous stream in a sufficient amount for an injection stream with a target hydrated polymer concentration and particle size. The target concentration varies according to the type of polymer employed, as well as the characteristics of the reservoir, e.g., petrophysical rock properties, reservoir fluid properties, reservoir conditions such as temperature, permeability, water compositions, mineralogy and/or reservoir location, etc. In some cases, the inverted polymer solutions described herein are suitable for use in reservoirs with a permeability of from 10 millidarcy to 40,000 millidarcy.

The hydrated polymer molecules in the inverted polymer solution can have a particle size (radius of gyration) ranging from 0.01 to 10 µm in one embodiment. One reservoir characteristic is the median pore throats, which correspond to the permeability of the reservoirs. Depending on the reservoir, the median pore throats in reservoirs may range from 0.01 µm to several hundred micrometers. Since the size of hydrated polymers in water range from 0.01 micrometer to several micrometers depending on the species, molecules, and reservoir conditions, in one embodiment, appropriate polymers are selected for LP composition to afford an inverted polymer solution where the particle size of the hydrated polymer is <10% of the median pore throat parameters. This can allow the hydrated polymer particles to flow through the porous medium in an uninhibited manner. In another embodiment, the hydrated polymer particles have an average particle size ranging from 2 to 8% of the median pore throat size.

Surfactants can be included to lower the interfacial tension between the oil and water phase to less than about 10-2 dyne/cm (for example) and thereby recover additional oil by mobilizing and solubilizing oil trapped by capillary forces. Examples of surfactants that can be utilized include, but are not limited to, anionic surfactants, cationic surfactants, amphoteric surfactants, non-ionic surfactants, or a combination thereof. Anionic surfactants can include sulfates, sulfonates, phosphates, or carboxylates. Such anionic surfactants are known and described in the art in, for example, U.S. Pat. No. 7,770,641, incorporated herein by reference in its entirety. Examples of specific anionic surfactants include internal olefin sulfonates, isomerized olefin sulfonates, alkyl aryl sulfonates, medium alcohol (C10 to C17) alkoxy sulfates, alcohol ether [alkoxy] carboxylates, and alcohol ether [alkoxy] sulfates. Example cationic surfactants include primary, secondary, or tertiary amines, or quaternary ammonium cations. Example amphoteric surfactants include cationic surfactants that are linked to a terminal sulfonate or carboxylate group. Example non-ionic surfactants include alcohol alkoxylates such as alkylaryl alkoxy alcohols or alkyl alkoxy alcohols. Other non-ionic surfactants can include alkyl alkoxylated esters and alkyl polyglycosides. In some embodiments, multiple non-ionic surfactants such as non-ionic alcohols or non-ionic esters are combined. As a skilled artisan may appreciate, the surfactant(s) selection may vary depending upon such factors as salinity, temperature, and clay content in the reservoir.

Suitable alkalinity agents include basic, ionic salts of alkali metals or alkaline earth metals. Alkalinity agents can be capable of reacting with an unrefined petroleum acid (e.g. the acid or its precursor in crude oil (reactive oil)) to form soap (a surfactant which is a salt of a fatty acid) in situ. These in situ generated soaps can serve as a source of surfactants causing a reduction of the interfacial tension of the oil in water emulsion, thereby reducing the viscosity of the emulsion. Examples of alkali agents include alkali metal hydroxides, carbonates, or bicarbonates, including, but not limited to, sodium carbonate, sodium bicarbonate, sodium hydroxide, potassium hydroxide, sodium silicate, tetrasodium EDTA, sodium metaborate, sodium citrate, and sodium tetraborate. In some cases, the alkalinity agent can be present in the inverted polymer solution in an amount of from 0.3 to 5.0 weight percent of the solution, such as 0.5 to 3 weight percent.

The inverted polymer solution can optionally include a co-solvent. A "co-solvent" refers to a compound having the ability to increase the solubility of a solute in the presence of an unrefined petroleum acid. In embodiments, the co-solvents provided herein have a hydrophobic portion (alkyl or aryl chain), a hydrophilic portion (e.g. an alcohol) and optionally an alkoxy portion. Co-solvents as provided herein include alcohols (e.g. $C_1$-$C_6$ alcohols, $C_1$-$C_6$ diols), alkoxy alcohols (e.g. $C_1$-$C_6$ alkoxy alcohols, $C_1$-$C_6$ alkoxy diols, and phenyl alkoxy alcohols), glycol ether, glycol and glycerol. The term "alcohol" is used according to its ordinary meaning and refers to an organic compound containing an —OH groups attached to a carbon atom. The term "diol" is used according to its ordinary meaning and refers to an organic compound containing two —OH groups attached to two different carbon atoms. The term "alkoxy alcohol" is used according to its ordinary meaning and refers to an organic compound containing an alkoxy linker attached to a —OH group.

The inverted polymer solution can optionally include a chelant or chelating agent. Chelants may be used to complex with the alkali metal and soften brines. If desired, the salinity of the inverted polymer solution may be optimized for a particular subterranean reservoir by adjusting a number of chelating ligands in the chelating agent, such as alkoxylate groups if the chelant is EDTA ("ethylenediaminetetraacetic acid"). EDTA is just one example of a suitable chelant, another example of a chelant is MGDA ("methylglycinediacetic acid").

If desired, other additives can also be included in inverted polymer solutions described herein, such as biocides, oxygen scavengers, and corrosion inhibitors.

Methods of Use

The inverted polymer solutions described herein can be used in a variety of oil and gas operations, including an EOR operation (e.g., an improved oil recovery (IOR) operation, a polymer flooding operation, an AP flooding operation, a SP flooding operation, an ASP flooding operation, a conformance control operation, or any combination thereof). Moreover, the inverted polymer solutions described herein can be used in a variety of oil and gas operations, including a hydraulic fracturing operation, as a drag reducer that reduces friction during transportation of a fluid in a pipeline, or any combination thereof. Transportation of a fluid in a pipeline can refer to any movement of a fluid through a conduit or pipe. As such, transportation of a fluid in a pipeline includes, for example, the pipeline transport of fluids as well as passage of fluids through pipes such as wellbores during the course of an oil recovery operation. The inverted polymer solutions can even be used in water treatment operations associated with oil and gas operations.

In one embodiment, the inverted polymer solution can be used as an injection fluid. In another embodiment, the inverted polymer solution can be included in an injection fluid. In another embodiment, the inverted polymer solution can be used as a hydraulic fracturing fluid. In another embodiment, the inverted polymer solution can be included in a hydraulic fracturing fluid. In another embodiment, the inverted polymer solution can be used as a drag reducer that reduces friction during transportation of a fluid in a pipeline. In another embodiment, the inverted polymer solution can be included in a drag reducer that reduces friction during transportation of a fluid in a pipeline. In short, in certain embodiments, the inverted polymer solutions described herein can be used in hydrocarbon recovery.

Methods of hydrocarbon recovery can comprise providing a subsurface reservoir containing hydrocarbons therewithin; providing a wellbore in fluid communication with the subsurface reservoir; preparing an inverted polymer solution using the methods described above; and injecting the inverted polymer solution through the wellbore into the subsurface reservoir. For example, the subsurface reservoir can be a subsea reservoir and/or the subsurface reservoir can have a permeability of from 10 millidarcy to 40,000 millidarcy.

The wellbore in the second step can be an injection wellbore associated with an injection well, and the method can further comprise providing a production well spaced-apart from the injection well a predetermined distance and having a production wellbore in fluid communication with the subsurface reservoir. In these embodiments, injection of the inverted polymer solution can increase the flow of hydrocarbons to the production wellbore.

In some embodiments, methods of hydrocarbon recovery can further include a recycling step. For example, in some embodiments, methods of hydrocarbon recovery can further comprise producing production fluid from the production well, the production fluid including at least a portion of the injected inverted polymer solution; and using the production fluid to invert additional LP composition, for example, to for form a second inverted polymer solution. The second inverted polymer solution can be injected into at least one wellbore (e.g., an injection well, the same wellbore discussed in the second step or a different wellbore, etc.). Thus, in some embodiments, the inverted polymer solution is included in an injection fluid.

The wellbore in the second step can be a wellbore for hydraulic fracturing that is in fluid communication with the subsurface reservoir. Thus, in one embodiment, the inverted polymer solution injected in the fourth step functions as a drag reducer that reduces friction during injection in the fourth step. By doing so, the inverted polymer solution is used as a drag reducer that reduces friction during transportation of a fluid (e.g., the hydraulic fracturing fluid) in a pipeline (e.g., the wellbore or components thereof). In another embodiment, the inverted polymer solution is included in a hydraulic fracturing fluid.

By way of non-limiting illustration, examples of certain embodiments of the present disclosure are given below.

EXAMPLES

Methods and Materials

A synthetic brine was used as base brine. The synthetic brine included the following: $Na^+$, $Ca^{2+}$, $Mg^{2+}$, $Cl^-$, and a TDS of about 15,000 ppm. Since the neat liquid polymer (LP) was provided as an oil-continuous polymer dispersion with an activity of 50%, the LP polymer was inverted and diluted to target concentration of 2000 ppm in the synthetic brine by mixing at 500 rpm using an overhead mixer. In the laboratory, 50% neat liquid polymer was inverted to 1% LP solution in the synthetic brine using the overhead mixer at 500 rpm for 2 hours. Then, the 1% inverted LP solution was diluted to the targeted 0.2% LP solution in the synthetic brine using the overhead mixer at 500 rpm for 2 hours to 24 hours. 50% neat liquid polymer was also directly inverted to the target concentration of 0.2% LP polymer in the synthetic brine using the overhead mixer for 3 hours to 24 hours.

Since the neat liquid polymer (LP) was provided as an oil-continuous polymer dispersion with an activity of 50%, the LP polymer was inverted and diluted to target concentration of 2000 ppm in synthetic brine by mixing at 500 rpm using an overhead mixer. In the laboratory, 50% neat liquid polymer was inverted to 1% LP solution in synthetic brine using the overhead mixer at 500 rpm for 2 hours. Then, the 1% inverted LP solution was diluted to the targeted 0.2% LP solution in synthetic brine using the overhead mixer at 500 rpm for 2 hours to 24 hours. 50% neat liquid polymer was also directly inverted to the target concentration of 0.2% LP polymer in synthetic brine using the overhead mixer for 3 hours to 24 hours.

The filter ratio (FR) of the inverted polymer solutions was determined using the standard procedure described, for example, in Koh, H. *Experimental Investigation of the Effect of Polymers on Residual Oil Saturation*. Ph.D. Dissertation, University of Texas at Austin, 2015; Levitt, D. *The Optimal Use of Enhanced Oil Recovery Polymers Under Hostile Conditions*. Ph.D. Dissertation, University of Texas at Austin, 2009; and Magbagbeola, O. A. Quantification of the Viscoelastic Behavior of High Molecular Weight Polymers used for Chemical Enhanced Oil Recovery. M.S. Thesis, University of Texas at Austin, 2008, each of which is hereby incorporated by reference in its entirety. Briefly, a 300 ml solution of 2000 ppm inverted LP solution in synthetic brine was filtered through a 5.0 μm and 1.2 μm ISOPORE™ polycarbonate filter with a diameter of 47 mm at 15 psi (plus or minus 10% of 15 psi) pressure and ambient temperature (25° C.). As expressed in the formula below, the FR was calculated as the ratio of the time for 180 to 200 ml of the polymer solution to filter divided by the time for 60 to 80 ml of the polymer solution to filter.

$$FR = \frac{t_{200\ ml} - t_{180\ ml}}{t_{80\ ml} - t_{60\ ml}}$$

For the composition to qualify for further testing, the composition was required to exhibit a FR of less than or equal to 1.2 through both filters. As the 1.2 FR was a strict laboratory requirement for polymer qualification, clean, laboratory-grade filtered water was used when necessary.

Steady-state shear viscosities were measured in the range of 0.1 s−1 to 1000 s−1 at 25° C., and 31° C. using double-wall couette geometry with a TA Instruments ARES-G2 rheometer.

Polymer injectivity tests were performed separately using 2000 ppm LP in a 2000 mD Bentheimer sandstone at 31° C. The flow rate was set at 0.5 mL/min, corresponding to ~6 ft/day. The differential pressure drop between inlet and outlet was measured using Rosemount differential pressure transducers.

Oil recovery experiments were performed using 2000 ppm LP using an approximately 5000 mD unconsolidated-sand pack at 31° C. The flow rate was set at 0.5 mL/min, corresponding to ~4 ft/day. The differential pressure drop between inlet and outlet was measured using Rosemount differential transducers. A viscous crude oil (80 cP at 31° C.) was selected in this experiment.

Results and Discussion

Figure 11:
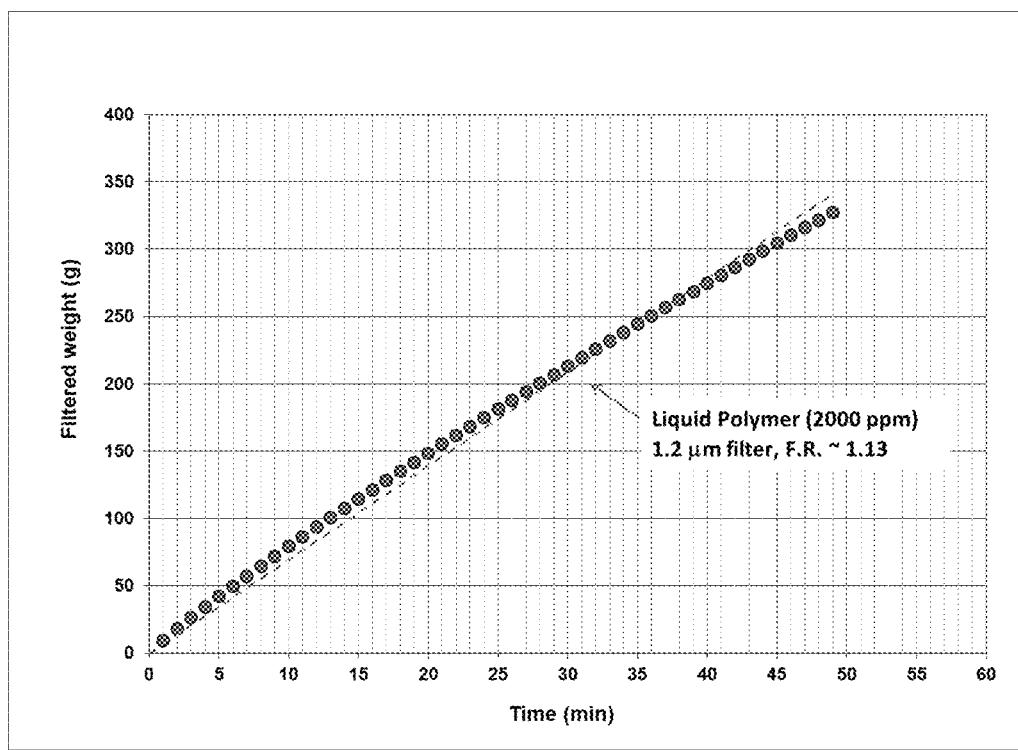
FIG. 11 is a plot of the filtration ratio test performed using a 1.2 micron filter for an inverted polymer solution. The inverted polymer solution (2000 ppm polymer) passes through 1.2 micron filter with a filter ratio of less than 1.2, which shows improved filterability of the inverted polymer solution.

FR test: FIG. 11 shows a plot of the FR test performed for an inverted polymer solution using a 1.2 micron filter with a diameter of 47 mm at 15 psi pressure and 25° C. temperature. As shown in FIG. 11 and Table 2, the inverted LP solution (2000 ppm polymer) passes through 1.2 micron filter with a FR of less than or equal to 1.5. More specifically, FIG. 11 illustrates a FR of 1.2 or less. Even more specifically, FIG. 11 illustrates a FR of 1.13. This result indicates the improved filterability of the inverted polymer solution.

Figure 12:
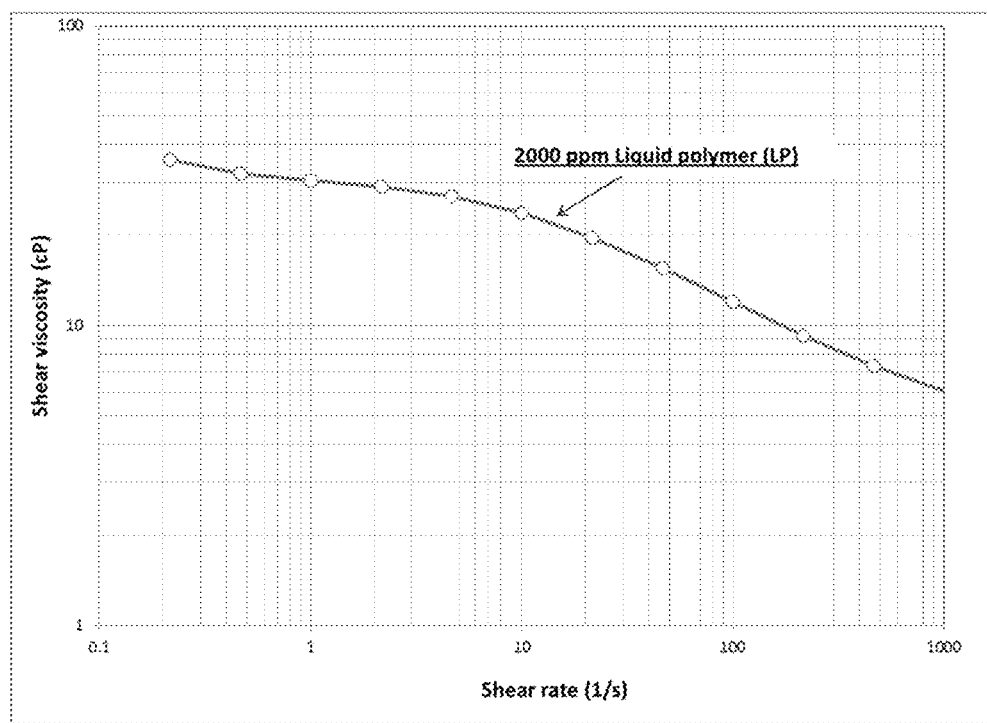
FIG. 12 is a viscosity plot in the wide range of shear rate for an inverted polymer solution (2000 ppm polymer in synthetic brine, measured at 31° C.). The viscosity of the inverted polymer solution shows a typical shear-thinning behavior in the wide range of shear rate. The viscosity is measured as 24 cP at 10 s−1 and 31° C.
Figure 13:
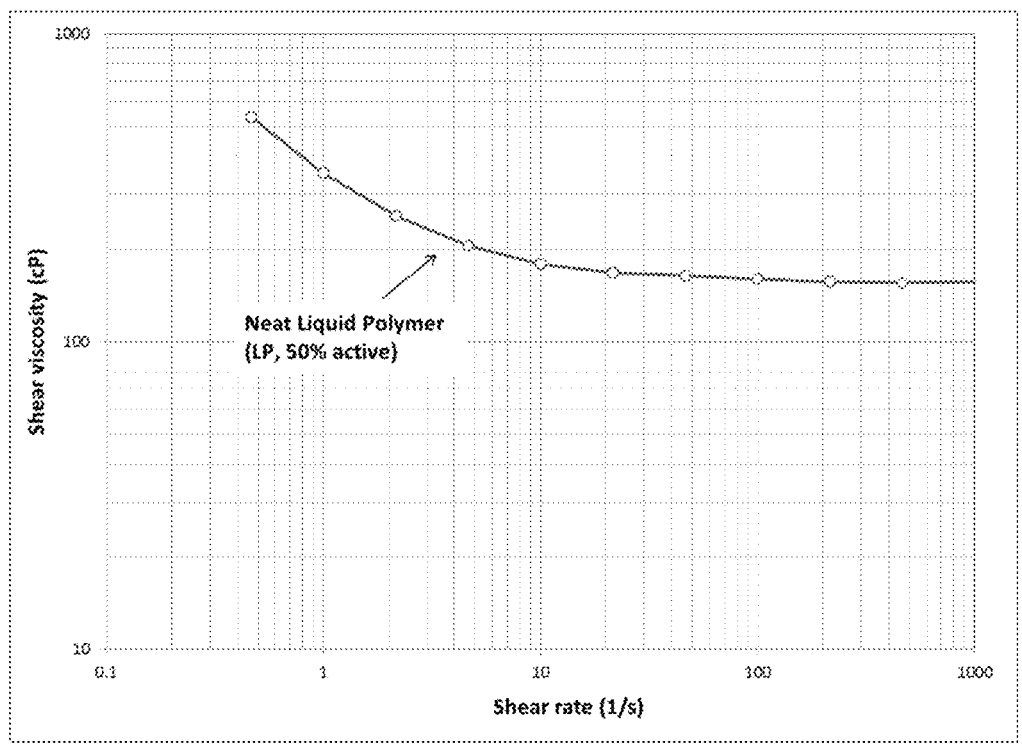
FIG. 13 is a viscosity plot in the wide range of shear rate for neat LP composition activity of the neat LP composition test here is 50% and the viscosity of LP is measured at 180 cP at 10 $s^{-1}$ and 25° C. Low viscosity with high activity makes the LP composition easy to handle in the field.

Viscosity measurement: FIG. 12 shows a viscosity plot for a wide range of shear rates for an inverted polymer solution (2000 ppm polymer in synthetic brine, measured at 31° C.). The viscosity of the inverted polymer solution illustrates a typical shear-thinning behavior in the wide range of shear rate. The viscosity is measured as 24 cP at 10 s−1 and 31° C.

Figure 10:
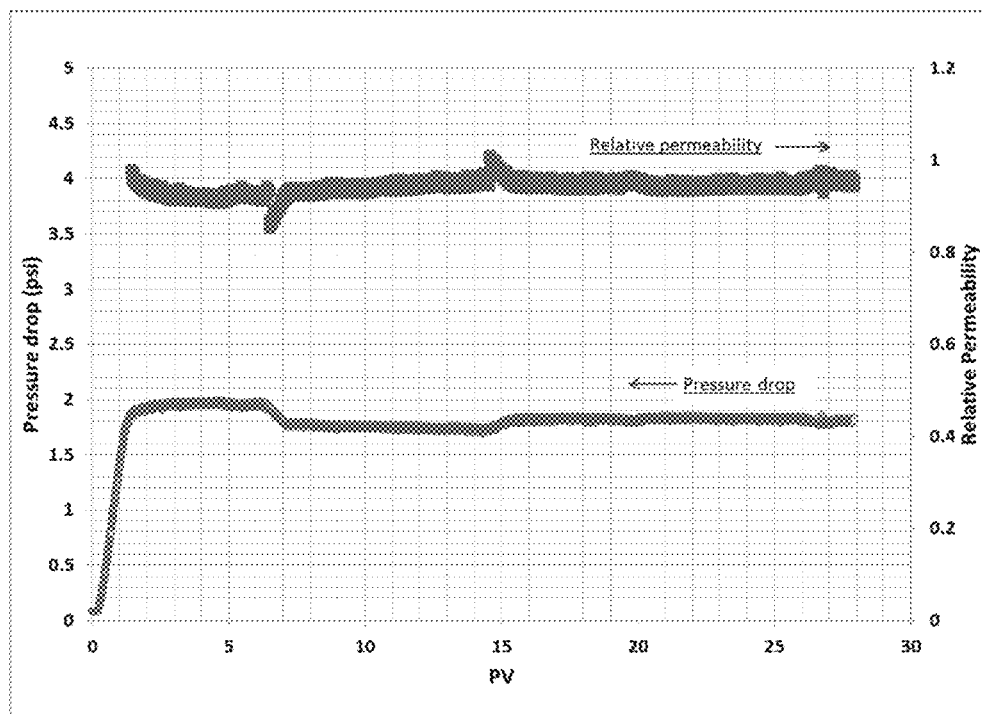
FIG. 10 is a plot of the pressure drop and relative permeability upon injection of an inverted polymer solution in a sandstone core. The steady pressure drop and steady relative permeability observed upon injection of the inverted polymer solution are consistent with no plugging of the sandstone core.

Injectivity Test: The inverted polymer solution was injected into outcrop Bentheimer sandstones. The purpose of the polymer injection was to evaluate the injectivity of the inverted polymer solution in the porous medium. Around 30 PV of 2000 ppm LP polymer in synthetic brine was injected into Bentheimer sandstone at flow rate of 0.5 ml/min corresponding to 6 ft./day at the temperature of 31° C. As shown in FIG. 10, the pressure drop for the inverted polymer solution reaches steady-state after 2 pore volume (PV) which indicates no plugging. The corresponding relative permeability history is also plotted in FIG. 10. The relative permeability of the inverted polymer solution after 28 PV was ~1 which confirms core plugging.

Figure 14:
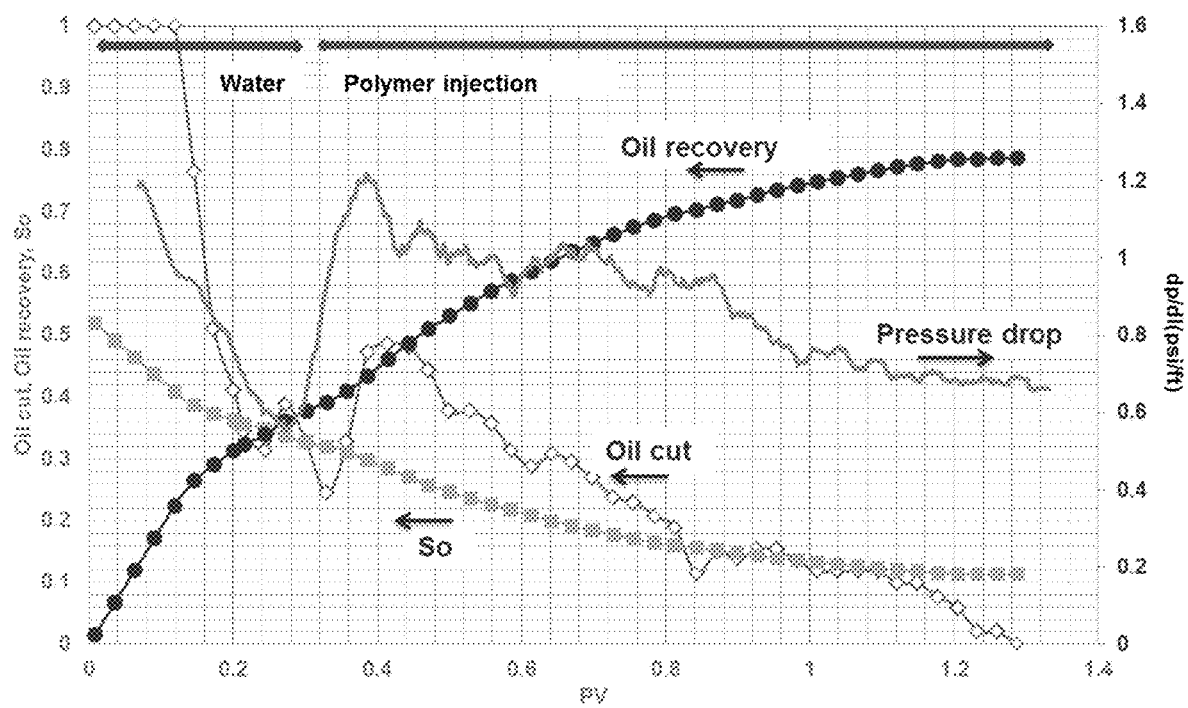
FIG. 14 is an oil recovery and pressure drop plot for an inverted LP solution (2000 ppm polymer) in unconsolidated-sand pack. Oil recovery increases as the inverted LP is injected while pressure drop for LP injection shows steady-state and low at the end of the experiment. The steady-state low pressure drop from LP at the end of the experiment indicates improved behavior as the LP solutions do not plug the core during oil recovery.

Oil Recovery experiment: The ability of the inverted polymer solution to displace oil and improve recovery was tested in Bentheimer sandstone in the presence of crude oil. A viscous crude oil (80 cP at 31° C.) was chosen for the test. The inverted polymer solution was injected at the end of water flooding in separate core flooding experiments. The oil recovery and pressure drop is plotted in FIG. 14. As seen in Figures, oil recovery improves as the inverted LP solution is injected while pressure drop for LP injection shows steady-state and low at the end of the experiment. The steady-state low pressure drop for LP solution at the end of the experiment indicates improved behavior as the LP solution do not plug the core during oil recovery

TABLE 2

Summary of properties of inverted LP composition.

| Polymer | Polymer Concentration (ppm) | 5 μm filter (15 psi, 25° C.) | | 1.2 μm filter (15 psi, 25 C.) | | Viscosity (cP) @ 31° C. 10 s⁻¹ |
|---|---|---|---|---|---|---|
| | | F.R | Time to 200 g (min) | F.R | Time to 200 g (min) | |
| LP | 2000 | 1.00 | 5.0 | 1.13 | 27 | 22 |
| | 2000 | 1.01 | 4.4 | 1.19 | 25 | 21 |
| | 2000 | 1.04 | 5.7 | 1.18 | 24 | 25 |

Validation of filtration test and viscosity measurements using pilot-scale LP samples: Additional filtration ratio test and viscosity measurements were performed using larger-scale produced samples. These include pilot-scale and commercial field-scale samples compared with previous lab-scale manufactured samples. The results of filtration ratio and viscosity measurement have been summarized in Table 3.

Figure 15:
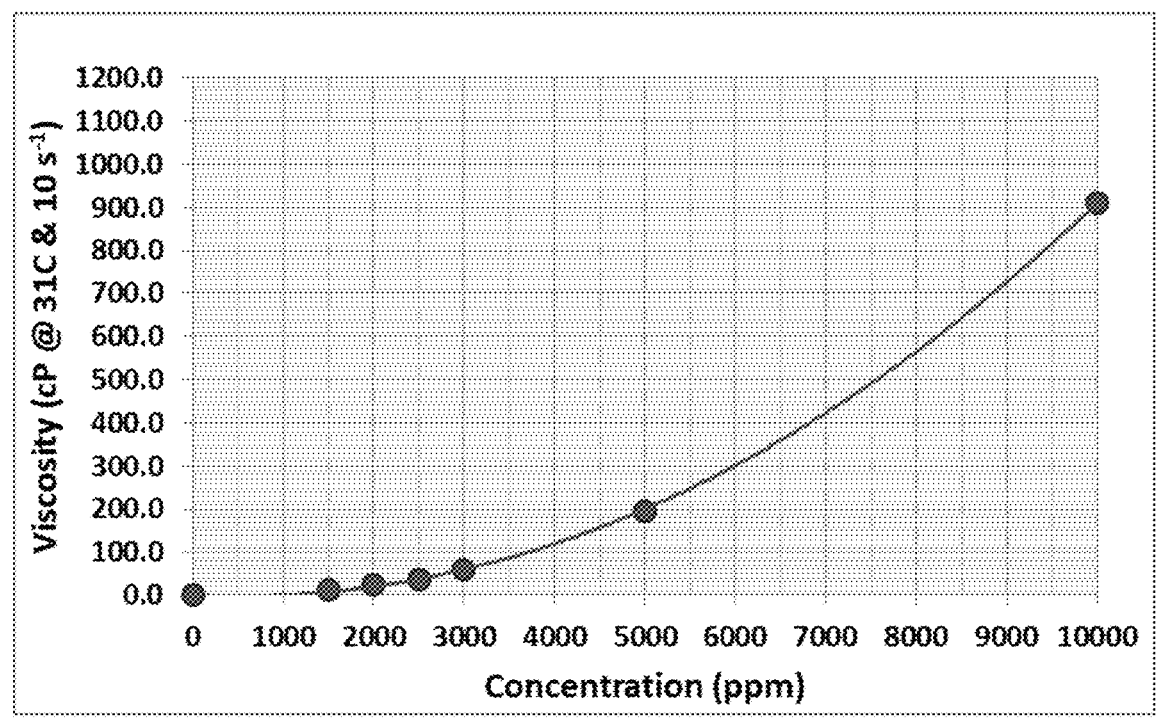
FIG. 15 is a plot showing the LP viscosity as a function of concentration at a temperature of 31° C. and shear rate of 10 sec−1.
Figure 16:
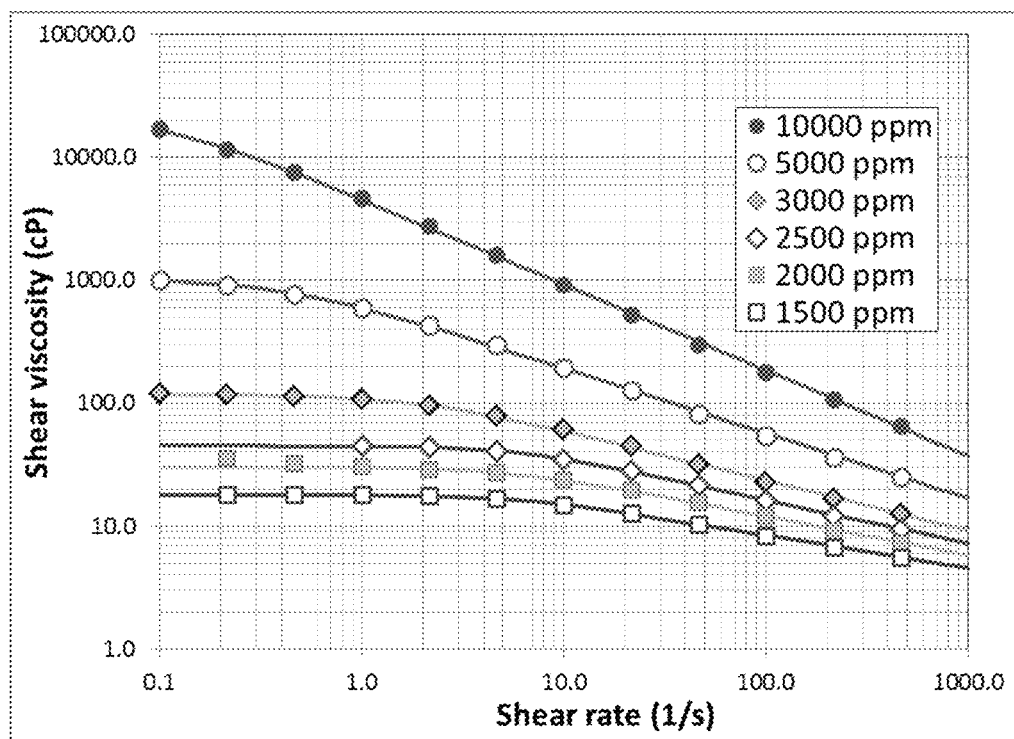
FIG. 16 is a plot of LP shear viscosities as a function of shear rate at a temperature of 31° C.

The viscosity yield as a function of concentration of polymer used was measured at 31° C. FIG. 15 shows the viscosity yield curve as a function of concentration. Mother solution of 10,000 ppm concentrate was prepared from 52% active neat polymer. From this mother solution, appropriate dilutions were made and viscosities measured between 0.1 sec$^{-1}$ and 1000 sec$^{-1}$. The viscosity values in FIG. 15 correspond to a shear rate of 10 sec$^{-1}$. At a concentration of 2000 ppm inverted polymer solution, the viscosity is about 23 cP and the viscosity yield of 10,000 ppm inverted polymer solution is approximately 900 cP. FIG. 16 shows the polymer viscosity as a function of shear rate. As shown in FIG. 16 shear thinning behavior of polymer solutions was observed. As the polymer concentrations increased, the shear thinning behavior changed from less shear thinning to more shear thinning.

Figure 19A:
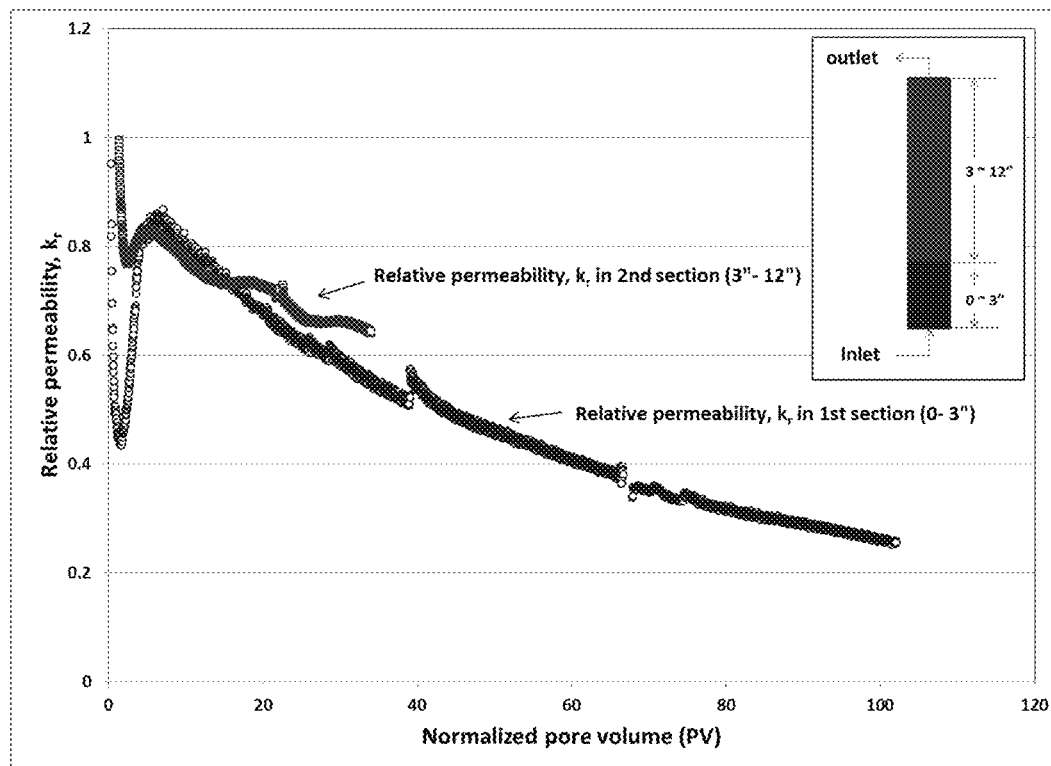
FIG. 19A is a plot of the normalized permeability reduction of an inverted conventional liquid polymer LP#1 (2000 ppm) in a sandstone with a pressure tap (3") showing face plugging at the inlet.
Figure 19B:
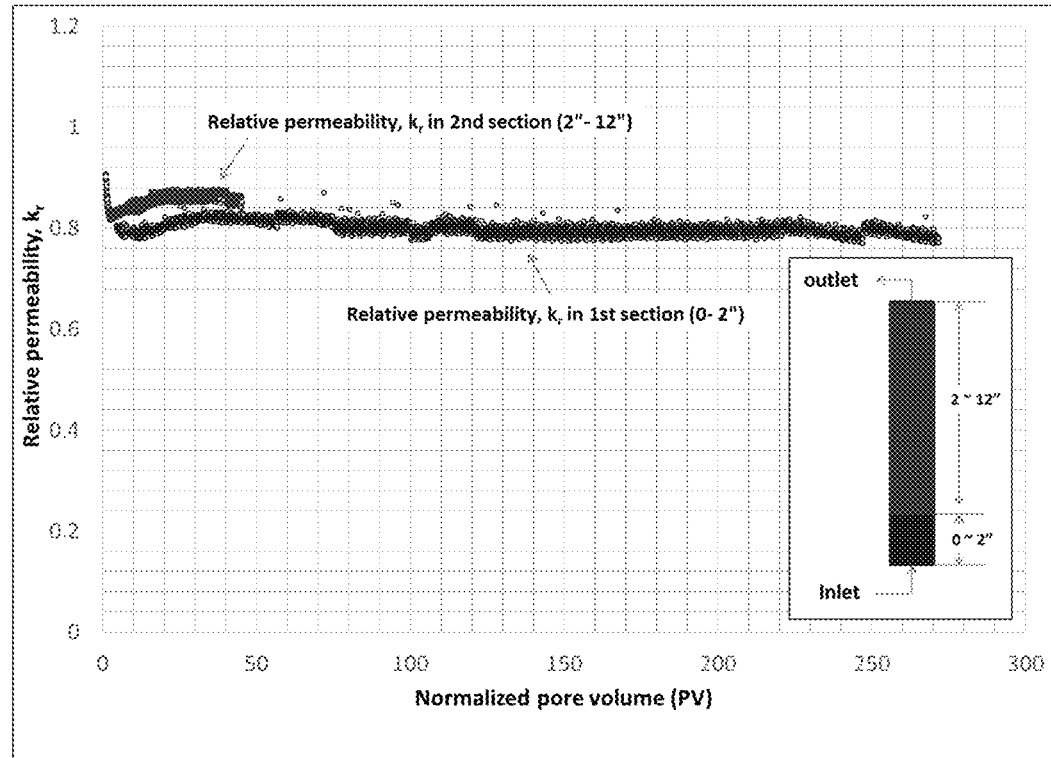
FIG. 19B is a plot of the normalized permeability reduction of the inverted LP composition (2000 ppm) in a sandstone with a pressure tap (2") showing no significant plugging above 250 PV of injection at inlet.

To verify the long-term injectivity performance of the inverted LP solutions, the relative permeability of the single phase polymer flood was normalized using methods known in the art (see SPE 179657, SPE IOR symposium at Tulsa 2016, which is incorporated herein by reference in its entirety). FIG. 19A shows the relative plugging when the results are normalized for each section with total pore volumes injected for a conventional emulsion polymer. These results indicate that the plugging rate is faster near the injection face compared to subsequent sections of the core. In contrast, as shown in FIG. 19B, the inverted LP solutions do not exhibit any significant signs of plugging.

Figure 20:
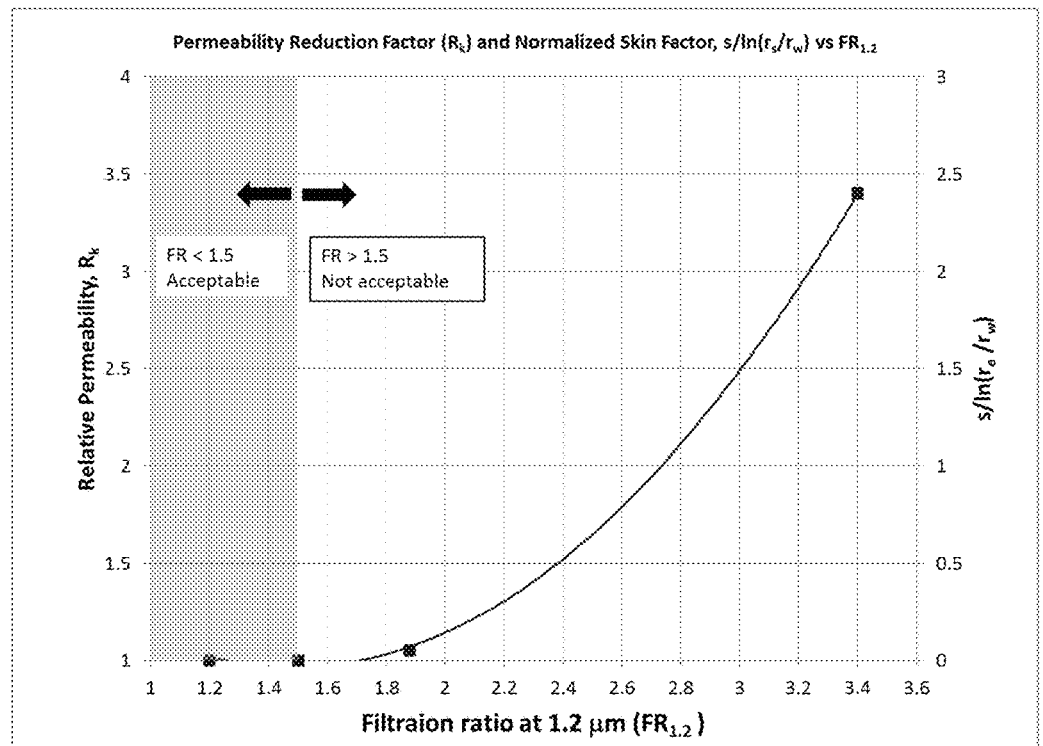
FIG. 20 is a plot of the Permeability Reduction Factor ($R_k$) and Normalized Skin Factor, s/ln($r_s/r_w$) as a function of the filtration ratio at 1.2 μm ($FR_{1.2}$). $R_k$ and skin factor were calculated at 25 PV of injection into sandstone core.

FIG. 20 shows the permeability Reduction Factor (Rk) and Normalized Skin Factor, $s/\ln(r_s/r_w)$ vs. filtration ratio at 1.2 μm (FR 1.2). As shown in FIG. 20, Rk and skin factor both increase when FR is greater than 1.5. These results suggest that injection of a polymer solution with a FR greater than 1.5 plugs the core, while injection of a polymer solution with a FR of 1.5 or less causes no plugs to the core.

Polymer loop yard tests: With polymer mixing and performance in laboratory conditions validated, the next step was to evaluate the mixing efficiency of the neat solution in brine to a final 2000 ppm polymer concentration in larger scale yard tests. The goal of the yard tests was to demonstrate that acceptable viscosity yield and filtration ratio could be achieved using single step configuration mixers and multi-step configuration mixers (with and without dynamic mixers) as described in FIGS. 1 and 2.

Experimental results using a single step mixer configuration are summarized in Table 3 and experimental results using a multi-step mixer configuration are summarized in Table 4. Each experiment was performed using different size static mixer elements and different configurations including dynamic mixer, different flow rate and different ratio of neat polymer and brine. The samples were collected after each run, and filtration tests and viscosity measurements were performed to verify the hydration of the LP including inversion and dilution through the designed mixing system.

TABLE 3

Summary of filtration and viscosity data using pilot-scale samples.

| | | Viscosity (cP) @ 10 s$^{-1}$ | | Filtration Ration Test @ 15 psi, 25 C. | | | |
| --- | --- | --- | --- | --- | --- | --- | --- |
| Sample | Activity | Neat (25 C.) | 2k ppm (31 C.) | F.R. (5 um) | Time to 200 g (m) | F.R. (1.2 um) | Time to 200 g (m) |
| S-1 | 52.4% | 179 | 25 | 1.04 | 5.7 | 1.18 | 24 |
| | | | 22 | 1 | 5 | 1.13 | 27 |
| | | | 21 | 1.01 | 4.4 | 1.19 | 25 |
| M-1 | 52.1% | 152 | 26 | 1.05 | 6.2 | 1.32 | 28.4 |
| | | | | 1.03 | 6.0 | 1.22 | 25.2 |
| | | | | | | 1.43 | 30.0 |
| M-2 | 51.8% | 128 | 25 | 1.04 | 6.1 | 1.44 | 30.8 |
| M3 | 50.3% | 104 | 24 | 1.04 | 6.3 | 1.24 | 29.4 |
| | | | | | | 1.31 | 27.4 |
| | | | 16 | | | 1.34 | 13.2 |
| | | | 20 | | | 1.50 | 21.0 |
| M-5 | 50.5% | 101 | 21 | 1.04 | 5.0 | 1.24 | 24.0 |
| | | | | | | 1.39 | 26.2 |
| | | | 19 | | | 1.22 | 14.4 |
| | | | 19 | | | 1.30 | 16.5 |
| M-6 | 51.2% | 107 | 21 | 1.03 | 4.8 | 1.31 | 26.0 |
| | | | | | | 1.37 | 27.8 |
| | | | 18 | | | 1.21 | 16.0 |
| PL#5 | 50.0% | 241 | 22 | | | 1.13 | 16.0 |
| PL#6 | 50.0% | 252 | 20 | | | 1.27 | 16.0 |
| TL#2 | 50.0% | 599 | 24 | | | 1.24 | 20.5 |
| Mean | | 207 | 21 | 1.04 | 5.51 | 1.28 | 23.1 |
| Std. Dev | | 148 | 3 | 0.02 | 0.66 | 0.10 | 5.5 |

Figure 17A:
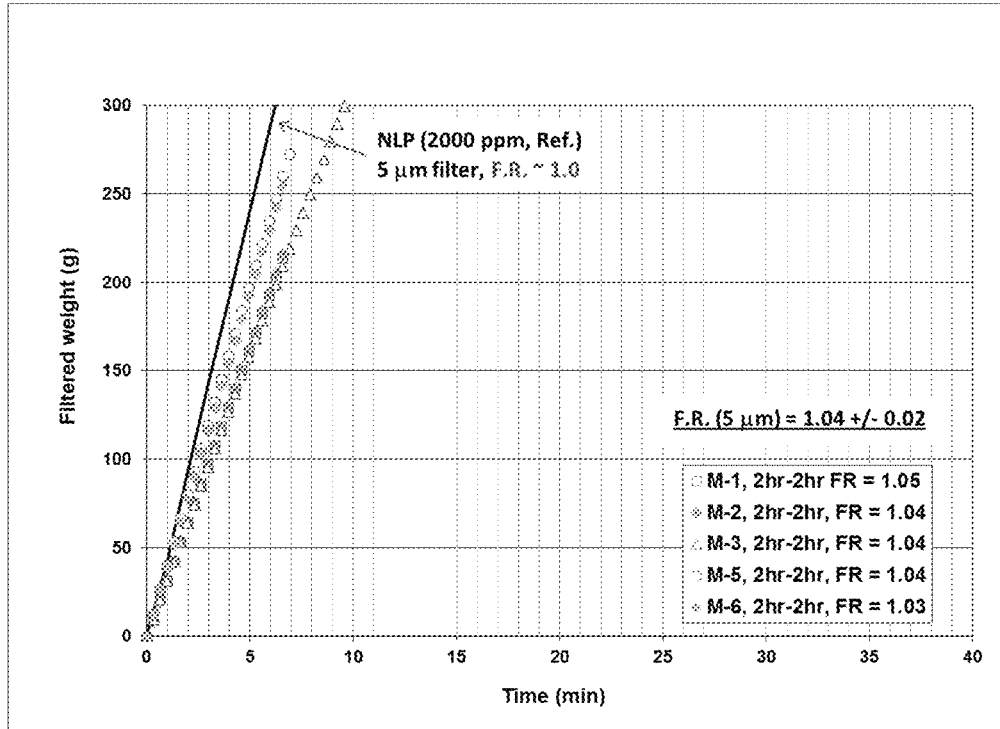
FIGS. 17A and 17B are plots of filtration ratio tests performed using a 5 micron filter (FIG. 17A) and 1.2 micron filter (FIG. 17B) for inverted polymer solutions M1-M6. The inverted polymer solution (2000 ppm polymer) passes through 1.2 micron filter with a filter ratio of less than 1.5, which shows improved filterability of the inverted polymer solution.
Figure 17B:
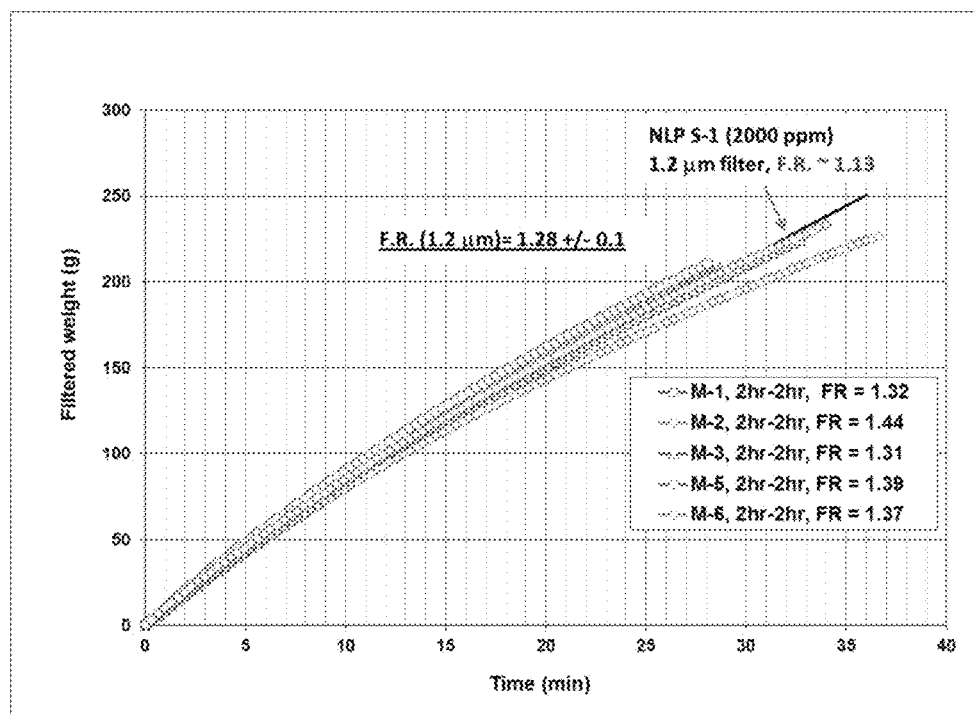

2000 ppm inverted polymer solutions were prepared using different pilot-scale batches of LP solutions (M1 through M5) and filtration tests were performed as described above. FIGS. 17A and 17B show the results of filtration ratio tests performed with different pilot-scale batches of LP solutions using a 5 micron filter (FIG. 17A) and 1.2 micron filter (FIG. 17B) at 15 psi. As shown in FIGS. 17A and 17B, the LP solutions produce a FR of 1.04 +/−0.02 for a 5 micron filter and 1.28 +/−0.1 for a 1.2 micron filter.

Figure 18:
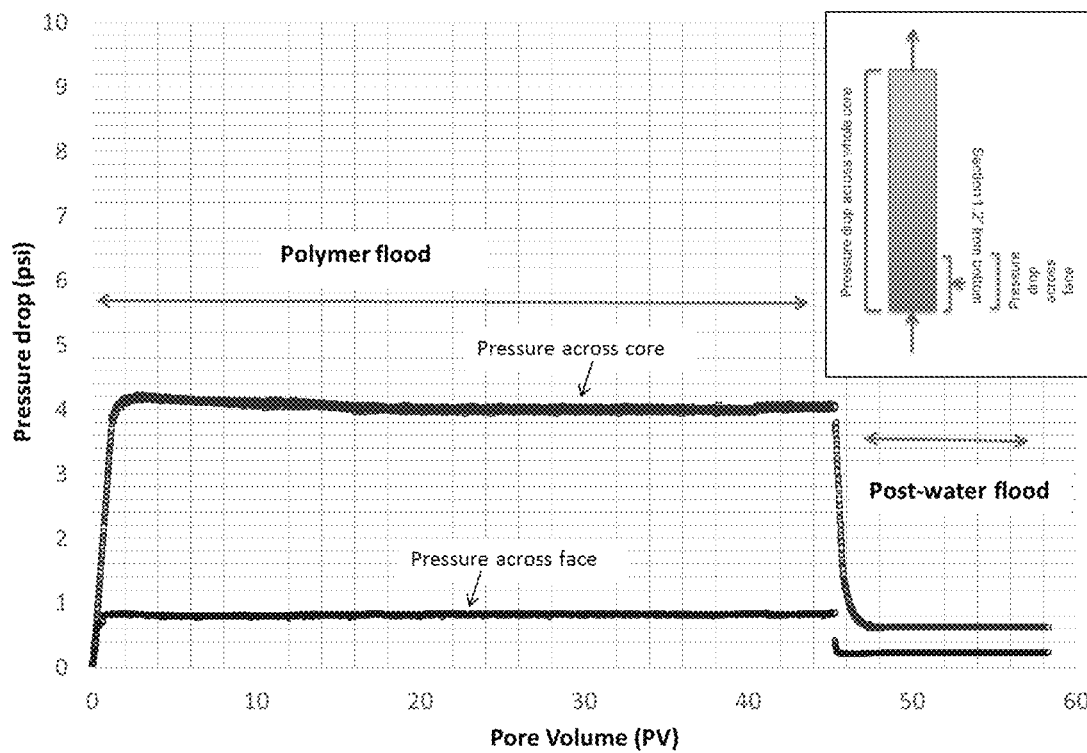
FIG. 18 is a plot of the pressure drop upon injection of an inverted polymer solution (2000 ppm) in a sandstone core (1.2 D) with a pressure tab attached at 2" from the inlet to monitor face plugging. The steady pressure drop observed upon injection of the inverted polymer solution in both whole and $1^{st}$ section in the core are consistent with no significant plugging of the sandstone core. The inverted polymer was injected up to 45 PV followed by post-water flood. The pressure drop during the post-water flood also showed that injection of the inverted polymer solution did not plug the core.

FIG. 18 shows a long-term injectivity test of single phase inverted polymer solution in a core. The core included a pressure tap two inches from the face, providing a pressure differential across the injection face of the core. As shown in FIG. 18, the steady-state pressure drop showed no significant signal consistent with plugging of the sandstone core. Analysis of the pressure drop during the post-water flood also showed no plugging.

TABLE 4

Summary of polymer loop yard test - example of single step mixing.

| | | Mixer | | Flow | | | Viscosity (cP, 31 C.) | | Filtration | | Pressure |
| | | | | | | | | | FR | time | across the |
| | Mixing | 1$^{st}$ stage | 2$^{nd}$ stage | rate | Velocity | Dynamic | | | (1.2 | (min, | mixer |
| Run# | Scheme | (Inversion) | (Dilution) | gpm | (m/s) | mixer | 7.3 s$^{-1}$ | 10 s$^{-1}$ | μm) | 200 g) | (psi) |
|---|---|---|---|---|---|---|---|---|---|---|---|
| S-1 | Single step | 1"Φ: 15 elements | | 30 | 3.7 | Y | 21.7 | 18.8 | 1 | 120 | 120 |
| S-2 | Single step | 1"Φ: 15 elements | | 30 | 3.7 | N | 21.2 | 19.5 | 1.14 | 83 | 125 |
| S-3 | Single step | 2"Φ: 15 elements | | 95 | 3 | Y | 26.7 | 23.3 | 1 | 120 | 120 |
| S-4 | Single step | 2"Φ: 15 elements | | 95-100 | 3.1 | N | 26.7 | 23.6 | 1.07 | 100 | 180 |

TABLE 5

Summary of polymer loop yard test - example of multistep mixing.

| | | Mixer | | Flow | | | Viscosity (cP, 31 C.) | | Filtration | | Pressure |
| | | | | | | | | | FR | time | across the |
| | Mixing | 1$^{st}$ stage | 2$^{nd}$ stage | rate | Velocity | Dynamic | | | (1.2 | (min, | mixer |
| Run# | Scheme | (Inversion) | (Dilution) | gpm | (m/s) | mixer | 7.3 s$^{-1}$ | 10 s$^{-1}$ | μm) | 200 g) | (psi) |
|---|---|---|---|---|---|---|---|---|---|---|---|
| M-1 | Two step | 1"Φ: 15 elements | 2"Φ: 15 elements | 125-130 | 3.4/3.9 | N | 26.2 | 23 | 1.3 | 95 | 140 |
| M-2 | Two step | 1"Φ: 15 elements | 2"Φ: 15 elements | 125 | 3.4/3.9 | Y | 23 | 20.1 | 1.13 | 99 | 145 |
| M-3 | Two step | 1"Φ: 15 elements | 2"Φ: 15 elements | 100 | 2.5/3.1 | Y | 23 | 20 | 1.2 | 85 | 100 |

Figure 21:
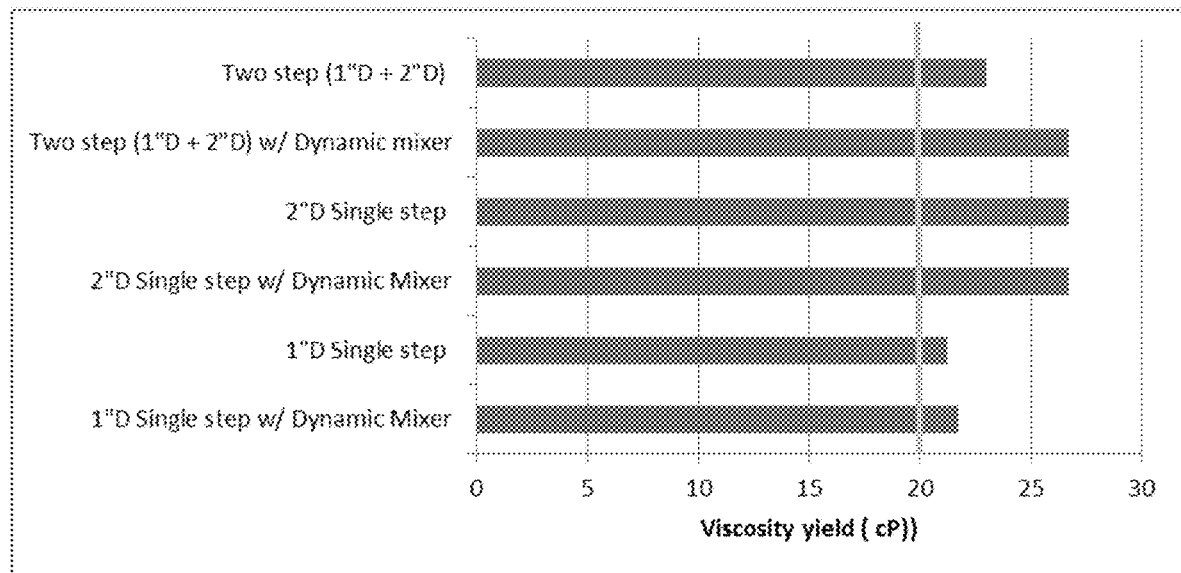
FIG. 21 is a bar graph illustrating the viscosity yield achieving using multi-step (two) mixing configurations and single step mixing configurations with and without a dynamic mixer.
Figure 22A:
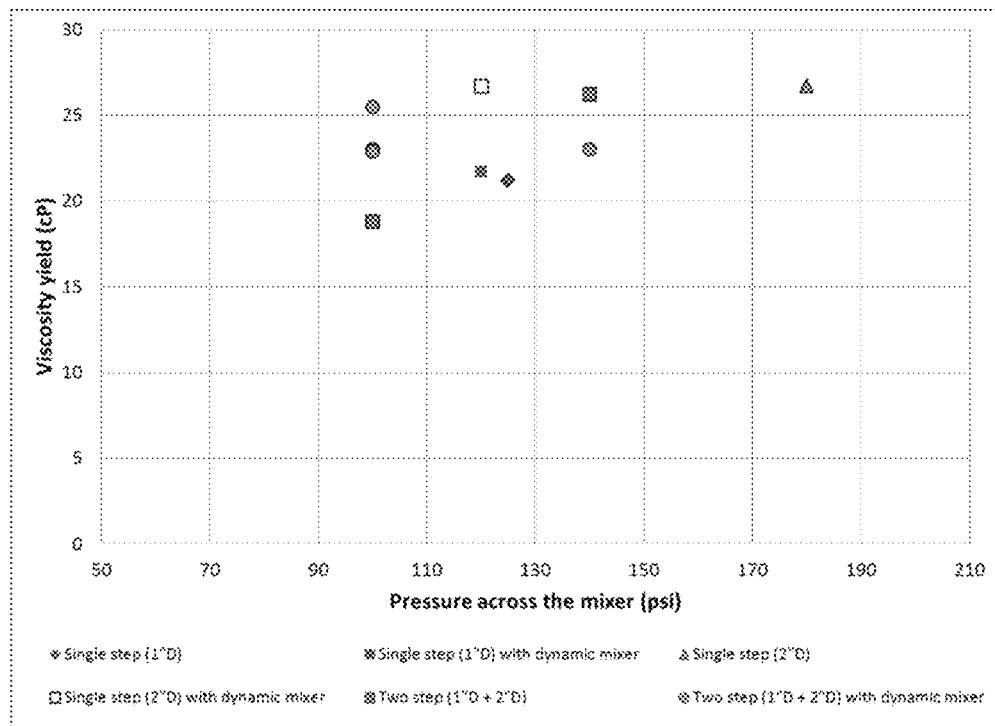
FIG. 22A is a plot of the viscosity yield as a function of the pressure drop across the static mixer(s).
Figure 22B:
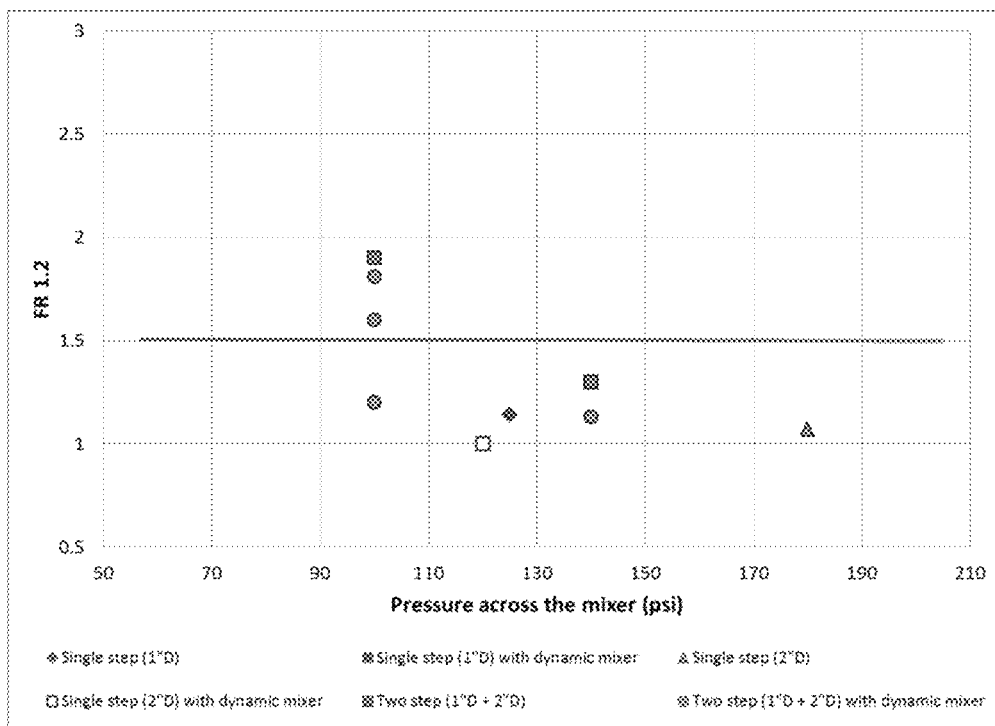
FIG. 22B is a plot of the filtration ration as a function of the pressure drop across the static mixer(s).

As shown in FIG. 21, viscosity yields were measured above 20 cP in both multi-step (two) mixing configuration and single step mixing configuration with and without the dynamic mixer. This shows that the LP properly hydrates through the static mixers in both a single-step or in multi-step configuration. FIGS. 22A and 22B show the viscosity yield as a function of pressure drop across the static mixers (FIG. 22A) and filtration ratio as a function of pressure drop across the static mixers (FIG. 22B). To hydrate the LP and provide a suitable viscosity yield and filterability, a FR of 1.5 or less at 1.2 micron should be used.

Overall, the polymer loop yard tests demonstrate that successful viscosity yields can be achieved with a suitable filtration ratio using either a single step or multi-step mixing process. Furthermore, injectivity experiments through surrogate rock showed no appreciable plugging behavior.

The compositions and methods of the appended claims are not limited in scope by the specific compositions and methods described herein, which are intended as illustrations of a few aspects of the claims. Any compositions and methods that are functionally equivalent are intended to fall within the scope of the claims. Various modifications of the compositions and methods in addition to those shown and described herein are intended to fall within the scope of the appended claims. Further, while only certain representative compositions and method steps disclosed herein are specifically described, other combinations of the compositions and method steps also are intended to fall within the scope of the appended claims, even if not specifically recited. Thus, a combination of steps, elements, components, or constituents may be explicitly mentioned herein or less, however, other combinations of steps, elements, components, and constituents are included, even though not explicitly stated.

The term "comprising" and variations thereof as used herein is used synonymously with the term "including" and variations thereof and are open, non-limiting terms. Although the terms "comprising" and "including" have been used herein to describe various embodiments, the terms "consisting essentially of" and "consisting of" can be used in place of "comprising" and "including" to provide for more specific embodiments of the invention and are also disclosed. Other than where noted, all numbers expressing geometries, dimensions, and so forth used in the specification and claims are to be understood at the very least, and not as an attempt to limit the application of the doctrine of equivalents to the scope of the claims, to be construed in light of the number of significant digits and ordinary rounding approaches.

It is understood that when combinations, subsets, groups, etc. of elements are disclosed (e.g., combinations of components in a composition, or combinations of steps in a method), that while specific reference of each of the various individual and collective combinations and permutations of these elements may not be explicitly disclosed, each is specifically contemplated and described herein. By way of example, if a composition is described herein as including a component of type A, a component of type B, a component of type C, or any combination thereof, it is understood that this phrase describes all of the various individual and collective combinations and permutations of these components. For example, in some embodiments, the composition described by this phrase could include only a component of type A. In some embodiments, the composition described by this phrase could include only a component of type B. In some embodiments, the composition described by this phrase could include only a component of type C. In some embodiments, the composition described by this phrase could include a component of type A and a component of type B. In some embodiments, the composition described by this phrase could include a component of type A and a component of type C. In some embodiments, the composition described by this phrase could include a component of type B and a component of type C. In some embodiments, the composition described by this phrase could include a component of type A, a component of type B, and a component of type C. In some embodiments, the composition described by this phrase could include two or more components of type A (e.g., A1 and A2). In some embodiments, the composition described by this phrase could include two or more components of type B (e.g., B1 and B2). In some embodiments, the composition described by this phrase could include two or more components of type C (e.g., C1 and C2). In some embodiments, the composition described by this phrase could include two or more of a first component (e.g., two or more components of type A (A1 and A2)), optionally one or more of a second component (e.g., optionally one or more components of type B), and optionally one or more of a third component (e.g., optionally one or more components of type C). In some embodiments, the composition described by this phrase could include two or more of a first component (e.g., two or more components of type B (B1 and B2)), optionally one or more of a second component (e.g., optionally one or more components of type A), and optionally one or more of a third component (e.g., optionally one or more components of type C). In some embodiments, the composition described by this phrase could include two or more of a first component (e.g., two or more components of type C (C1 and C2)), optionally one or more of a second component (e.g., optionally one or more components of type A), and optionally one or more of a third component (e.g., optionally one or more components of type B).

This application relates to the subject matter of U.S. Provisional Application No. 62/264,772, filed Dec. 8, 2015; U.S. Provisional Application No. 62/264,700, filed Dec. 8, 2015; U.S. Provisional Application No. 62/264,701, filed Dec. 8, 2015; and U.S. Provisional Application No. 62/264,703, filed Dec. 8, 2015; each of which is hereby incorporated herein by reference in its entirety.

Unless defined otherwise, all technical and scientific terms used herein have the same meanings as commonly understood by one of skill in the art to which the disclosed invention belongs. Publications cited herein and the materials for which they are cited are specifically incorporated by reference.

What is claimed is:

1. A method for mixing an inverted polymer solution for use in the recovery of hydrocarbons from a subsurface reservoir containing the hydrocarbons therewithin; the method comprising:
   providing a liquid polymer (LP) composition comprising:
      one or more synthetic (co) polymers having a molecular weight of from 15,000,000 g/mol to 30,000,000 g/mol;
      one or more hydrophobic liquids;
      one or more emulsifier surfactants; and
      one or more inverting surfactants;
   mixing the LP composition in an in-line mixer with an aqueous fluid in a single step to generate an inverted polymer solution having a concentration of synthetic (co) polymer of from 50 to 15,000 ppm;
   wherein the inverted polymer solution does not exhibit signs of plugging in an injectivity test performed using surrogate rock for the subsurface reservoir,
   wherein the injectivity test comprises a core flooding experiment performed using surrogate rock for the subsurface reservoir in which the inverted polymer solution is injected into a core comprising the surrogate rock for the subsurface reservoir at a flow rate of 0.5 mL/min at a temperature of 31° C.; and
   wherein the inverted polymer solution exhibits a relative permeability of approximately 1 after 28 pore volumes of the inverted polymer solution are injected into the core during the core flooding experiment.

2. The method of claim 1, wherein when two pore volumes of the inverted polymer solution are injected into the core comprising the surrogate rock for the subsurface reservoir at a flow rate of 0.5 mL/min at a temperature of 31° C., a pressure drop for the inverted polymer solution reaches a steady state.

3. The method of claim 1, wherein the core comprising the surrogate rock for the subsurface reservoir is a Bentheimer sandstone core.

4. The method of claim 1, wherein the injectivity test comprises a polymer loop yard test.

5. The method of claim 1, wherein the method further comprises injecting the inverted polymer solution into the subsurface reservoir.

6. The method of claim 5, wherein the inverted polymer solution is used in an enhanced oil recovery (EOR) operation.

7. The method of claim 1, wherein the liquid polymer (LP) composition comprises at least 39% by weight of the one or more water soluble (co) polymers.

8. The method of claim 1, wherein the liquid polymer (LP) composition comprises an inverse emulsion comprising up to 38% by weight of the one or more water soluble (co) polymers.

9. The method of claim 1, wherein the one or more synthetic (co) polymers comprise polyacrylamide, a partially hydrolyzed polyacrylamide, acrylamide tertiary butyl sulfonic acid, 2-acrylamido-2-methylpropane sulfonic acid, a blend thereof, or a copolymer thereof.

10. The method of claim 1, wherein the one or more synthetic (co) polymers have a molecular weight of from 15,000,000 g/mol to 25,000,000 g/mol.

11. The method of claim 1, wherein the inverted polymer solution has a filter ratio of 1.5 or less at 15 psi using a 1.2 μm filter.

12. The method of claim 11, wherein the inverted polymer solution has a filter ratio of from 1.1 to 1.3 at 15 psi using the 1.2 μm filter.

13. The method of claim 1, wherein the inversion of the LP composition forms the inverted polymer solution in 30 minutes or less.

14. The method of claim 1, wherein the inversion of the LP composition comprises a continuous process.

15. The method of claim 1, wherein the in-line mixer comprises a mixer inlet and a mixer outlet, and the pressure difference between the mixer inlet and the mixer outlet is from 15 psi to 400 psi.

16. The method of claim 1, wherein the in-line mixer comprises a static mixer.

17. The method of claim 1, wherein the in-line mixer comprises a dynamic mixer.

18. The method of claim 17, wherein the dynamic mixer comprises an impeller mixer, a turbine mixer, a rotor-stator mixer, a colloid mill, pump, or a pressure homogenizer.

19. The method of claim 17, wherein the dynamic mixer comprises an electrical submersible pump, hydraulic submersible pump or a progressive cavity pump.

20. The method of claim 1, wherein the in-line mixer is positioned on the surface, subsurface, subsea, or downhole.

21. The method of claim 1, wherein the aqueous fluid comprises soft brine or hard brine.

22. The method of claim 1, wherein the aqueous fluid comprises produced reservoir brine, reservoir brine, sea water, fresh water, produced water, water, saltwater, brine, synthetic brine, synthetic seawater brine, or any combination thereof.

23. The method of claim 1, wherein the aqueous fluid comprises from 15,000 ppm to 100,000 ppm total dissolved solids (tds).

24. The method of claim 1, wherein the aqueous fluid further comprises a surfactant, an alkalinity agent, a co-solvent, a chelating agent, or any combination thereof.

25. The method of claim 1, wherein the liquid polymer (LP) composition comprises an inverse emulsion comprising up to 35% by weight of the one or more synthetic (co) polymers.

26. The method of claim 1, wherein the one or more hydrophobic liquids have a boiling point of at least 100° C.

27. A method for hydrocarbon recovery; the method comprising:
(a) providing a subsurface reservoir containing hydrocarbons therewithin;
(b) providing a wellbore in fluid communication with the subsurface reservoir;
(c) providing a liquid polymer (LP) composition comprising:
one or more synthetic (co) polymers having a molecular weight of from 15,000,000 g/mol to 30,000,000 g/mol;
one or more hydrophobic liquids;
one or more emulsifier surfactants; and
one or more inverting surfactants;
(d) mixing the LP composition in an in-line mixer with an aqueous fluid in a single step to generate an inverted polymer solution having a concentration of (co) polymer of from 50 to 15,000 ppm, wherein the inverted polymer solution does not exhibit signs of plugging in an injectivity test performed using surrogate rock for the subsurface reservoir; and
(e) injecting the inverted polymer solution through the wellbore into the subsurface reservoir;
wherein the injectivity test comprises a core flooding experiment performed using surrogate rock for the subsurface reservoir in which the inverted polymer solution is injected into a core comprising the surrogate rock for the subsurface reservoir at a flow rate of 0.5 mL/min at a temperature of 31° C.; and
wherein the inverted polymer solution exhibits a relative permeability of approximately 1 after 28 pore volumes of the inverted polymer solution are injected into the core during the core flooding experiment.

* * * * *